US012659290B2

(12) United States Patent
Tonesi et al.

(10) Patent No.: US 12,659,290 B2
(45) Date of Patent: Jun. 16, 2026

(54) DOMAIN NAME SYSTEM QUERY HANDLING FOR AN EDGE APPLICATION SERVICE

(71) Applicant: QUALCOMM Incorporated, San Diego, CA (US)

(72) Inventors: Dario Serafino Tonesi, San Diego, CA (US); Haris Zisimopoulos, London (GB); Alan Soloway, Frederick, CO (US); Sunghoon Kim, San Diego, CA (US); Ajith Tom Payyappilly, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/279,587

(22) PCT Filed: May 10, 2022

(86) PCT No.: PCT/US2022/028626
§ 371 (c)(1),
(2) Date: Aug. 30, 2023

(87) PCT Pub. No.: WO2022/240900
PCT Pub. Date: Nov. 17, 2022

(65) Prior Publication Data
US 2024/0154931 A1 May 9, 2024

(30) Foreign Application Priority Data
May 10, 2021 (GR) .............................. 20210100316

(51) Int. Cl.
*H04L 61/4511* (2022.01)

(52) U.S. Cl.
CPC ................................ *H04L 61/4511* (2022.05)

(58) Field of Classification Search
CPC ............. H04L 61/4511; H04L 61/4541; H04L 67/1001; H04L 67/1021; H04L 67/34; H04L 67/51
See application file for complete search history.

(56) References Cited

U.S. PATENT DOCUMENTS

2013/0148572 A1* 6/2013 Delorme ................. H04W 8/26
370/328
2021/0281537 A1* 9/2021 Zhang ................. H04L 61/4511
(Continued)

FOREIGN PATENT DOCUMENTS

CN 111385369 A 7/2020
CN 115022866 A * 9/2022 ............ H04W 24/02
WO WO-2021052080 A1 3/2021

OTHER PUBLICATIONS

Backman et al., WO 2022/229938 A1, Nov. 3, 2022, WIPO, H04L 61/4511 (Year: 2022).*
(Continued)

*Primary Examiner* — Nicholas P Celani
*Assistant Examiner* — William C McBeth
(74) *Attorney, Agent, or Firm* — Procopio, Cory, Hargreaves & Savitch

(57) ABSTRACT

A UE transmits an indication of a capability for at least one of determining a domain name system (DNS) parameter for a DNS query that is different than a DNS setting from a network and redirecting the DNS query based on the DNS setting from the network. The UE receives, from the network, an instruction to monitor DNS queries based on the capability of the UE and enforcing the DNS settings from the network. An SMF receives, from a UE, an indication of a capability for at least one of determining a DNS parameter for a DNS query that is different than a DNS setting from a network and redirecting the DNS query based on the DNS setting from the network. The apparatus transmits, to the (Continued)

UE, an instruction to monitor DNS queries and to enforce the DNS settings from the network based on the capability of the UE.

26 Claims, 26 Drawing Sheets

(56)                    References Cited

U.S. PATENT DOCUMENTS

| 2022/0191100 | A1* | 6/2022 | Kim | ..................... | H04L 61/4511 |
|---|---|---|---|---|---|
| 2022/0191165 | A1* | 6/2022 | Zhu | ..................... | H04L 61/4511 |
| 2022/0321475 | A1* | 10/2022 | Thiebaut | ............. | H04L 61/4511 |
| 2022/0345442 | A1* | 10/2022 | Lee | ..................... | H04L 61/4511 |
| 2022/0377046 | A1* | 11/2022 | Zhang | ................. | H04L 61/4511 |
| 2023/0138033 | A1* | 5/2023 | Rajadurai | ........... | H04L 61/4511 |
| | | | | | 713/168 |
| 2024/0031856 | A1* | 1/2024 | Lv | ........................ | H04L 61/4511 |
| 2024/0171936 | A1* | 5/2024 | Alnås | .................. | H04L 61/4511 |
| 2024/0244032 | A1* | 7/2024 | Wei | ..................... | H04L 61/4511 |
| 2024/0414119 | A1* | 12/2024 | Shen | ................... | H04L 61/4511 |

OTHER PUBLICATIONS

Shetty, Rajaneesh Sudhakar, and Rajaneesh Sudhakar Shetty. "Multi-Access Edge Computing in 5G." 5G Mobile Core Network: Design, Deployment, Automation, and Testing Strategies (2021): 69-102. (Year: 2021).*

International Search Report and Written Opinion—PCT/US2022/028626—ISA/EPO—Aug. 23, 2022.
Qualcomm Incorporated et al: "3GPP Layer Based DNS Query Redirection", S2-2100745, SA WG2 Meeting #143E e-meeting, 3rd Generation Partnership Project (3GPP), Mobile Competence Centre, 650, Route Des Lucioles, F-06921 Sophia-Antipolis Cedex, France, vol. SA WG2, No. Elbonia, e-meeting, Feb. 24, 2021-Mar. 9, 2021, Feb. 18, 2021, XP052173070, pp. 1-6, paragraphs [1.2.2] , [6.2.1].
Qualcomm Incorporated., et al., "EAS rediscovery: DNS Setting Enforcement and Notification of Change of DNS settings", SA WG2 Meeting #145E e-meeting, S2-2104675, 3rd Generation Partnership Project (3GPP), Mobile Competence Centre, 650, Route Des Lucioles, F-06921 Sophia-Antipolis Cedex, France, vol. SA WG2, No. e-meeting, Elbonia, May 17, 2021-May 28, 2021, May 10, 2021, XP052004972, 3 Pages, Paragraphs [0001], [6.2.1A].
Qualcomm Incorporated: "Issues with DNS Based EAS (re-)Discovery: Solution", S2-2102680, SA WG2 Meeting #144E e-meeting, 3rd Generation Partnership Project (3GPP), Mobile Competence Centre, 650, Route Des Lucioles, F-06921 Sophia-Antipolis Cedex, France, vol. SA WG2, No. Elbonia, e-meeting, Apr. 12, 2021-Apr. 16, 2021, Apr. 6, 2021, XP051994054, pp. 1-2, paragraph [6.2.1].
Qualcomm Incorporated, et al., "3GPP Layer Based DNS Query Redirection", S2-2100745, SA WG2 Meeting #143E e-meeting, Elbonia, e-meeting, Feb. 24, 2021-Mar. 9, 2021, Feb. 19, 2021, pp. 1-6.

* cited by examiner

1600

1602 transmit an indication of a capability for at least one of determining a DNS parameter for a DNS query that is different than a DNS setting from a network or directing the DNS query based on the DNS setting from the network

1604 receive an instruction to direct DNS queries based on the capability of the UE

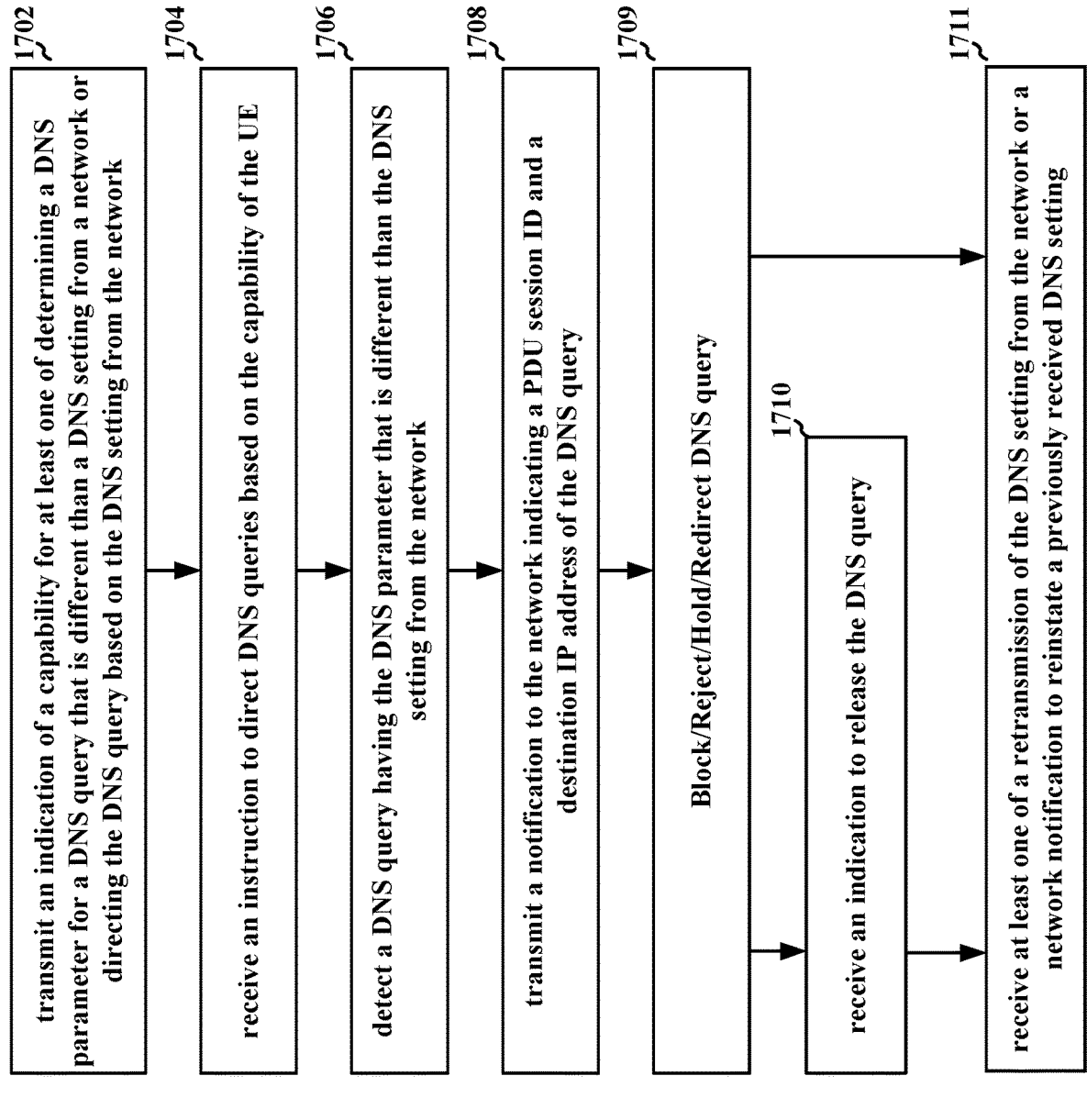

1700

1702 transmit an indication of a capability for at least one of determining a DNS parameter for a DNS query that is different than a DNS setting from a network or directing the DNS query based on the DNS setting from the network 1704 receive an instruction to direct DNS queries based on the capability of the UE 1706 detect a DNS query having the DNS parameter that is different than the DNS setting from the network 1708 transmit a notification to the network indicating a PDU session ID and a destination IP address of the DNS query 1709 Block/Reject/Hold/Redirect DNS query 1710 receive an indication to release the DNS query 1711 receive at least one of a retransmission of the DNS setting from the network or a network notification to reinstate a previously received DNS setting

1802 obtain an indication of a capability for at least one of determining a DNS parameter for a DNS query that is different than a DNS setting from a network or directing the DNS query based on the DNS setting from the network

1804 output an instruction to direct DNS queries based on the capability of the UE

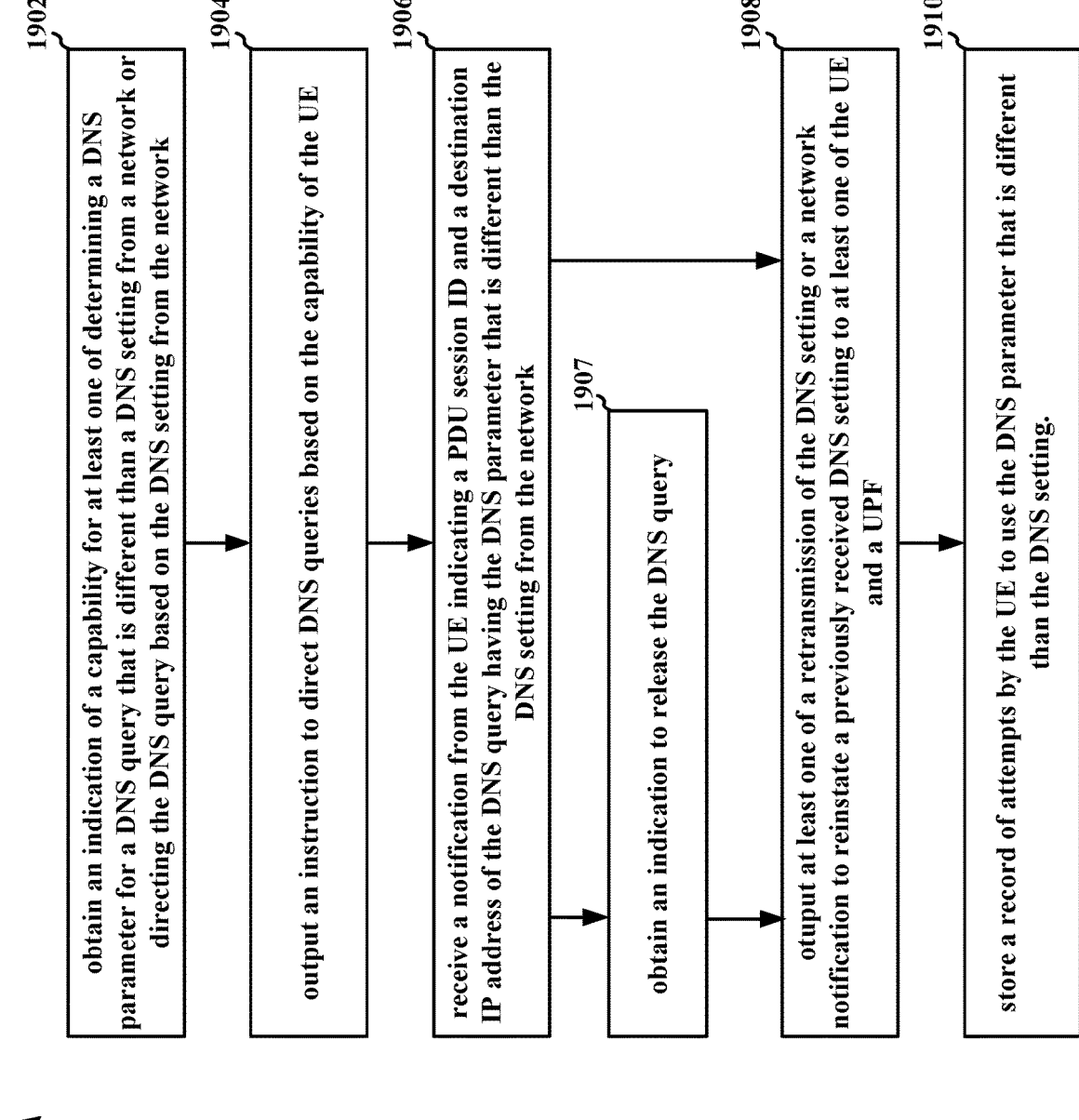

1900

1902
obtain an indication of a capability for at least one of determining a DNS parameter for a DNS query that is different than a DNS setting from a network or directing the DNS query based on the DNS setting from the network 1904
output an instruction to direct DNS queries based on the capability of the UE 1906
receive a notification from the UE indicating a PDU session ID and a destination IP address of the DNS query having the DNS parameter that is different than the DNS setting from the network 1907
obtain an indication to release the DNS query 1908
otuput at least one of a retransmission of the DNS setting or a network notification to reinstate a previously received DNS setting to at least one of the UE and a UPF 1910
store a record of attempts by the UE to use the DNS parameter that is different than the DNS setting.

FIG. 19

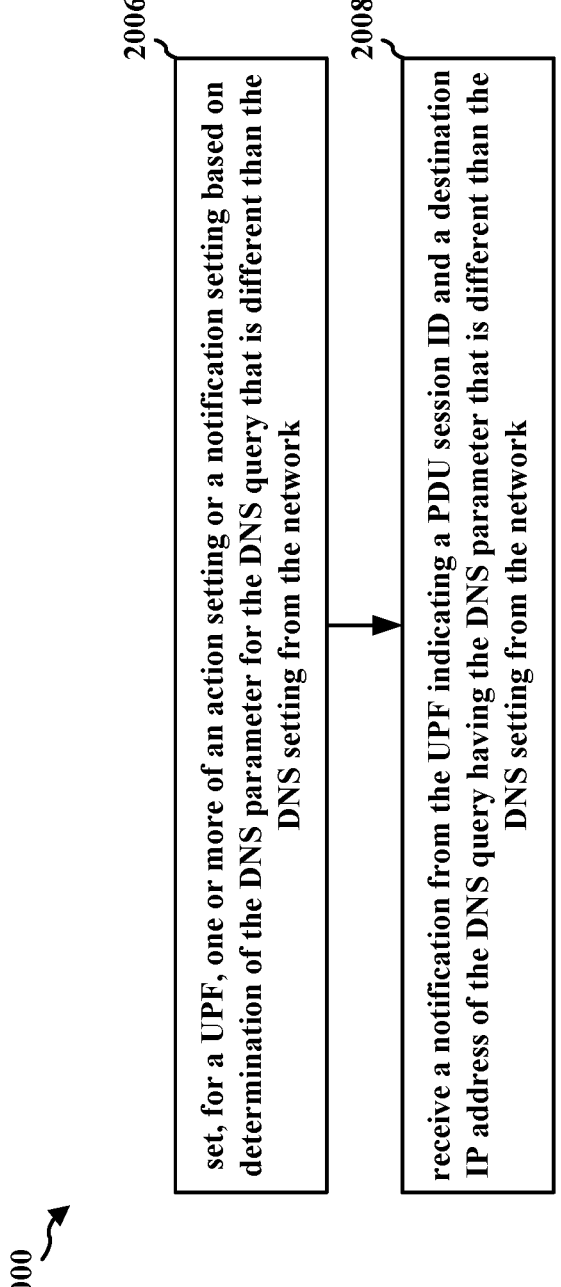

set, for a UPF, one or more of an action setting or a notification setting based on determination of the DNS parameter for the DNS query that is different than the DNS setting from the network

2006 receive a notification from the UPF indicating a PDU session ID and a destination IP address of the DNS query having the DNS parameter that is different than the DNS setting from the network

2102 receive a notification setting from a SMF for detection of a DNS parameter for a DNS query that is different than a DNS setting from a network 2104 detect the DNS parameter for the DNS query that is different than the DNS setting from the network 2106 block the DNS query or reject DNS query 2108 transmit a notification to the SMF based on the notification setting

2100

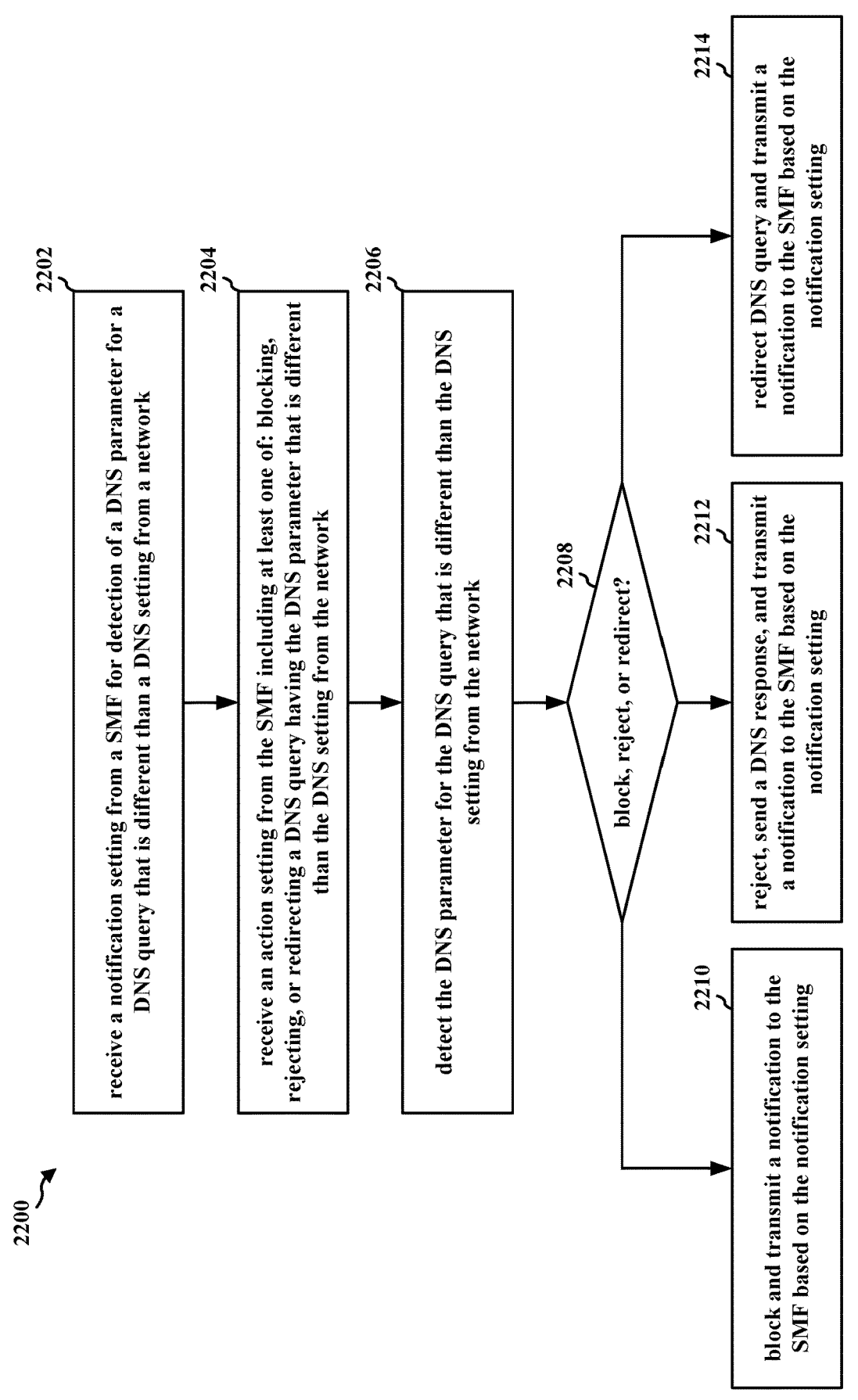

2200

2202 receive a notification setting from a SMF for detection of a DNS parameter for a DNS query that is different than a DNS setting from a network 2204 receive an action setting from the SMF including at least one of: blocking, rejecting, or redirecting a DNS query having the DNS parameter that is different than the DNS setting from the network 2206 detect the DNS parameter for the DNS query that is different than the DNS setting from the network 2208 block, reject, or redirect?

2210 block and transmit a notification to the SMF based on the notification setting 2212 reject, send a DNS response, and transmit a notification to the SMF based on the notification setting 2214 redirect DNS query and transmit a notification to the SMF based on the notification setting

FIG. 22

DOMAIN NAME SYSTEM QUERY HANDLING FOR AN EDGE APPLICATION SERVICE

CROSS REFERENCE TO RELATED APPLICATION(S)

This application claims the benefit of and priority to Greek Application No. 20210100316, entitled "DOMAIN NAME SYSTEM QUERY HANDLING FOR AN EDGE APPLICATION SERVICE" and filed on May 10, 2021, which is expressly incorporated by reference herein in its entirety.

TECHNICAL FIELD

The present disclosure relates generally to communication systems, and more particularly, to wireless communication including a domain name system (DNS) query.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus transmits an indication of a capability for at least one of determining, e.g., detecting, a domain name system (DNS) parameter for a DNS query that is different than a DNS setting from a network and redirecting the DNS query based on the DNS setting from the network. The apparatus receives, from the network, an instruction to monitor DNS queries based on the capability of the UE. The instructions to monitor the DNS queries may include one or more of an action or a notification setting based on the capability of the UE.

In another aspect of the disclosure, a method, a computer-readable medium, and an apparatus are provided for wireless communication at a network entity. In some aspects, the network entity may comprise a session management function (SMF). The apparatus receives, from a UE, an indication of a capability for at least one of determining, e.g., detecting, a DNS parameter for a DNS query that is different than a DNS setting from a network and redirecting the DNS query based on the DNS setting from the network. The apparatus transmits, to the UE, an instruction to monitor DNS queries based on the capability of the UE. The instructions to monitor the DNS queries may include one or more of an action or a notification setting based on the capability of the UE.

In another aspect of the disclosure, a method, a computer-readable medium, and an apparatus are provided for wireless communication at a user plane function. The apparatus receives a notification setting from an SMF, for detection of a DNS parameter for a DNS query that is different than a DNS setting from a network. The apparatus detects the DNS parameter for the DNS query that is different than the DNS setting from the network. The apparatus blocks the DNS query or rejects the DNS query and transmits a notification to the SMF based on the notification setting.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 17 is a flowchart of a method of wireless communication at a UE.

FIG. 19 is a flowchart of a method of wireless communication at a network entity, such as an SMF.

FIG. 20 is a flowchart of a method of wireless communication at a network entity, such as an SMF.

FIG. 22 is a flowchart of a method of wireless communication at a UPF.

DETAILED DESCRIPTION

Figure 1:
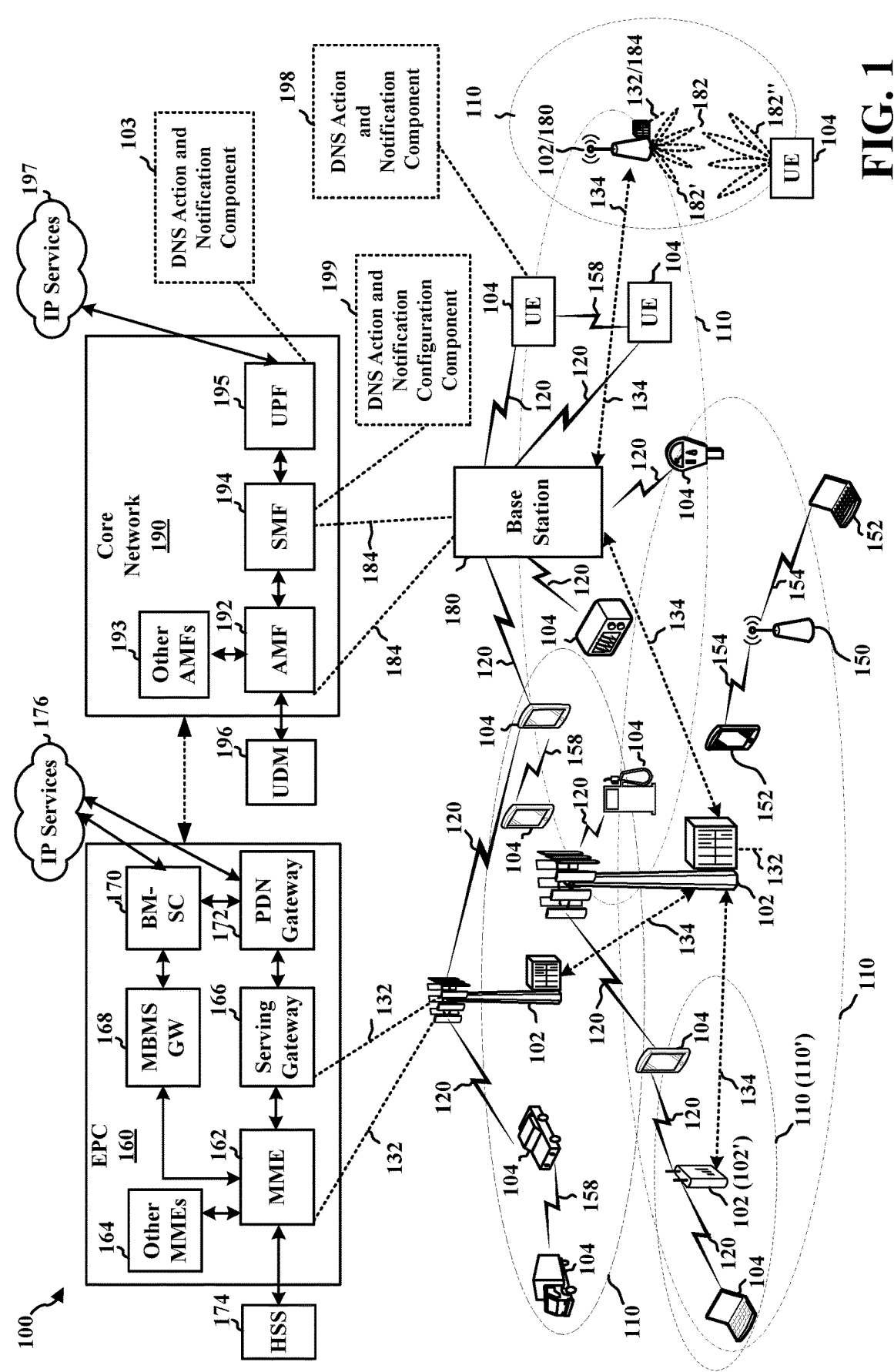
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software or a combination of hardware and software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. In an example, the code may be available via a communication link, for instance from a network.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-modulecomponent based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

Edge Computing enables operator and third-party services to be hosted closer to the UE's access point of attachment, in order to provide an efficient service delivery through the reduced end-to-end latency and load on the transport network. In general, the term Edge Computing refers to an architecture rather than a specific technology and may be used to describe a distributed computing paradigm that brings computation and data storage closer to the sources of data. Edge Computing may be insofar considered as a topology- and location-sensitive form of distributed computing. This may improve response times and save bandwidth. The UE may perform an Edge Application Server (EAS) discovery procedure to discover an internet protocol (IP) address of a suitable EAS. The UE transmits a DNS query to the wireless network in order to discover the EAS IP address. In order to obtain EAS IP addresses that are closer to the UE, the DNS query is sent to an Edge Application Server Discovery Function (EASDF) indicated by a home public land mobile network (HPLMN) for the UE. For example, the wireless network serving the UE may transmit a set of one or more DNS settings for the UE to use when transmitting DNS queries. An example of a DNS setting is the EASDF IP address to which the UE is to direct the DNS query. If the UE uses the DNS settings, the wireless network serving the UE receives the DNS query and provides the query to the EASDF, which determines an EAS that is closer to the UE. The wireless network provides the EAS IP address for the determined EAS to the UE.

However, at times, a UE may change the target IP address for the DNS query and may not use the EASDF IP address indicated by the network. For example, a UE operating system or a user interface at the UE may adjust one or more of the DNS query settings. If the DNS query is sent to a different DNS resolver than the one indicated by the network serving the UE, the UE may not be provided with an EAS IP address that is closer to the UE. Aspects presented herein provide for DNS query handling that addresses the potential for a UE to initiate a DNS query based on different settings than those provided by the network. In some examples, the network may determine whether the UE supports detection of DNS query changes, e.g., by an operating system or application. The network may also determine whether the UE is capable of enforcing DNS settings provided by the network. Based on the capabilities supported by the UE, the network may configure the UE to perform an action and/or to provide a notification to the network upon detecting a DNS query that has different DNS settings than those provided by the network. The network may also configure a UPF to perform an action and/or notification in response to detection of a DNS query having different DNS settings than those provided by the network.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) or multicast broadcast service (MBS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop)

and for collecting evolved multimedia broadcast and multicast services (eMBMS) or multicast broadcast services (MB S) related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 may provide an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a DNS action and notification component 198 configured to transmit an indication of a capability for at least one of detecting a DNS parameter for a DNS query that is different than a DNS setting from a network and redirecting the DNS query based on the DNS setting from the network. The DNS action and notification component 198 may be further configured to receive, from the network, an instruction to monitor DNS queries based on the capability of the UE. The instructions to monitor the DNS queries may include one or more of an action or a notification setting based on the capability of the UE. The SMF 194 may include DNS action and notification component 199 configured to receive, from the UE 104, an indication of a capability for at least one of detecting a DNS parameter for a DNS query that is different than a DNS setting from a network and redirecting the DNS query based on the DNS setting from the network and to transmit, to the UE 104, an instruction to monitor DNS queries based on the capability of the UE. The instructions to monitor the DNS queries may include one or more of an action or a notification setting based on the capability of the UE. The UPF 195 may include a DNS action and notification component 103 configured to receive a notification setting from an SMF 194, for detection of a DNS parameter for a DNS query from a UE 104 that is different than a DNS setting from a network. If the UPF detects the DNS parameter for the DNS query that is different than the DNS setting from the network, the DNS action and notification component 103 may be configured to block the DNS query or reject the DNS query and transmits a notification to the SMF based on the notification setting. The DNS action and notification component 103 may be further configured to send a notification based on the configuration received from the SMF 194. Although the following description may be focused on 5G NR, the concepts described herein may be applicable to other similar areas, such as LTE, LTE-A, CDMA, GSM, and other wireless technologies.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 26:
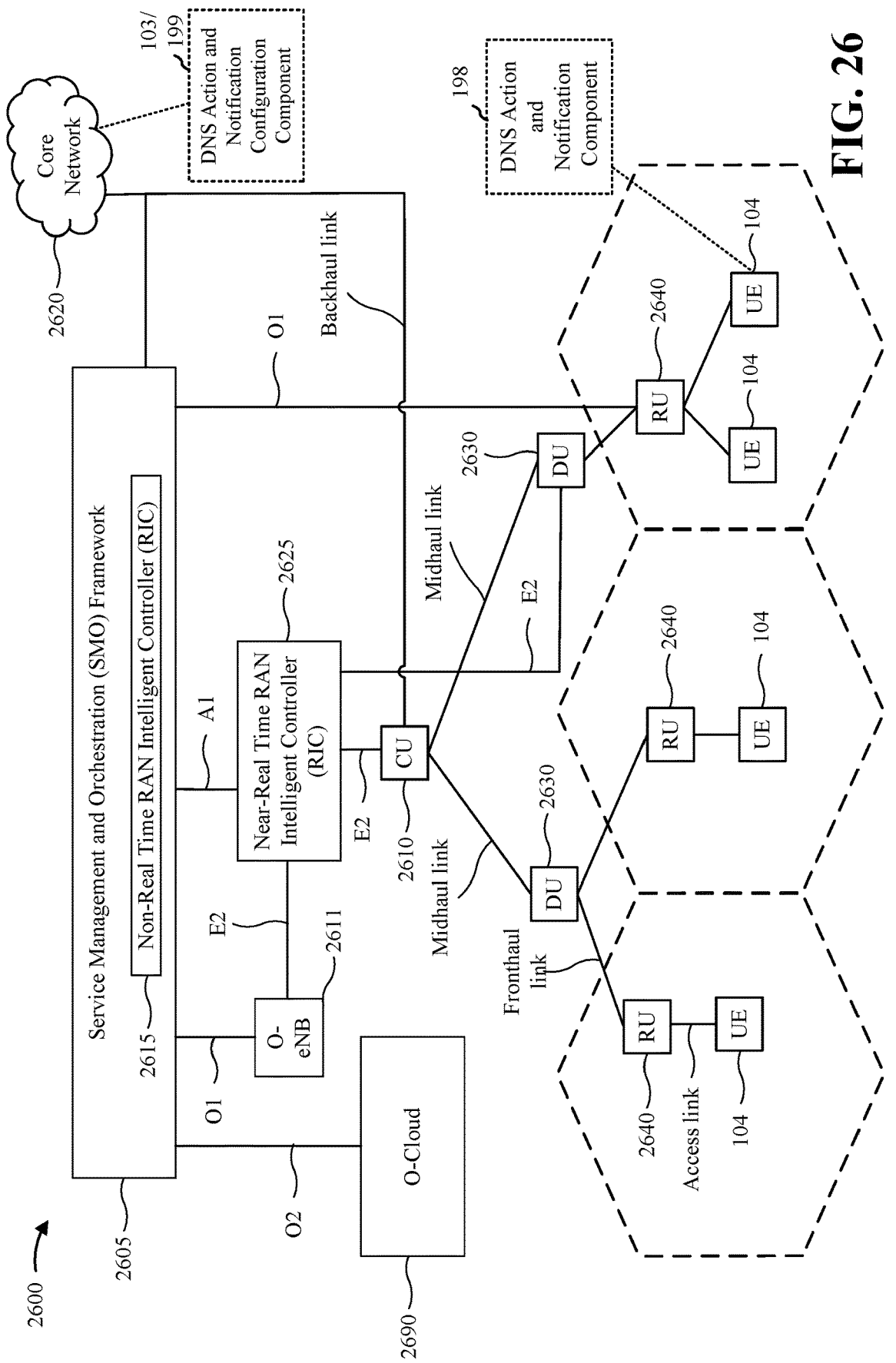
FIG. 26 is a diagram illustrating an example disaggregated base station architecture.

FIG. 26 shows a diagram illustrating an example disaggregated base station 2600 architecture. The disaggregated base station 2600 architecture may include one or more central units (CUs) 2610 that can communicate directly with a core network 2620 via a backhaul link, or indirectly with the core network 2620 through one or more disaggregated base station units (such as a Near-Real Time (Near-RT)

RAN Intelligent Controller (RIC) 2625 via an E2 link, or a Non-Real Time (Non-RT) RIC 2615 associated with a Service Management and Orchestration (SMO) Framework 2605, or both). A CU 2610 may communicate with one or more distributed units (DUs) 2630 via respective midhaul links, such as an F1 interface. The DUs 2630 may communicate with one or more radio units (RUs) 2640 via respective fronthaul links. The RUs 2640 may communicate with respective UEs 104 via one or more radio frequency (RF) access links. In some implementations, the UE 104 may be simultaneously served by multiple RUs 2640.

Each of the units, i.e., the CUs 2610, the DUs 2630, the RUs 2640, as well as the Near-RT RICs 2625, the Non-RT RICs 2615 and the SMO Framework 2605, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 2610 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2610. The CU 2610 may be configured to handle user plane functionality (i.e., Central Unit—User Plane (CU-UP)), control plane functionality (i.e., Central Unit—Control Plane (CU-CP)), or a combination thereof. In some implementations, the CU 2610 can be logically split into one or more CU-UP units and one or more CU-CP units. The CU-UP unit can communicate bidirectionally with the CU-CP unit via an interface, such as the E1 interface when implemented in an O-RAN configuration. The CU 2610 can be implemented to communicate with the DU 2630, as necessary, for network control and signaling.

The DU 2630 may correspond to a logical unit that includes one or more base station functions to control the operation of one or more RUs 2640. In some aspects, the DU 2630 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 2630 may further host one or more low PHY layers. Each layer (or module) can be implemented with an interface configured to communicate signals with other layers (and modules) hosted by the DU 2630, or with the control functions hosted by the CU 2610.

Lower-layer functionality can be implemented by one or more RUs 2640. In some deployments, an RU 2640, controlled by a DU 2630, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2640 can be implemented to handle over the air (OTA) communication with one or more UEs 104. In some implementations, real-time and non-real-time aspects of control and user plane communication with the RU(s) 2640 can be controlled by the corresponding DU 2630. In some scenarios, this configuration can enable the DU(s) 2630 and the CU 2610 to be implemented in a cloud-based RAN architecture, such as a vRAN architecture.

The SMO Framework 2605 may be configured to support RAN deployment and provisioning of non-virtualized and virtualized network elements. For non-virtualized network elements, the SMO Framework 2605 may be configured to support the deployment of dedicated physical resources for RAN coverage requirements which may be managed via an operations and maintenance interface (such as an O1 interface). For virtualized network elements, the SMO Framework 2605 may be configured to interact with a cloud computing platform (such as an open cloud (O-Cloud) 2690) to perform network element life cycle management (such as to instantiate virtualized network elements) via a cloud computing platform interface (such as an O2 interface). Such virtualized network elements can include, but are not limited to, CUs 2610, DUs 2630, RUs 2640 and Near-RT RICs 2625. In some implementations, the SMO Framework 2605 can communicate with a hardware aspect of a 4G RAN, such as an open eNB (O-eNB) 2611, via an O1 interface. Additionally, in some implementations, the SMO Framework 2605 can communicate directly with one or more RUs 2640 via an O1 interface. The SMO Framework 2605 also may include a Non-RT RIC 2615 configured to support functionality of the SMO Framework 2605.

The Non-RT RIC 2615 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2625. The Non-RT RIC 2615 may be coupled to or communicate with (such as via an A1 interface) the Near-RT RIC 2625. The Near-RT RIC 2625 may be configured to include a logical function that enables near-real-time control and optimization of RAN elements and resources via data collection and actions over an interface (such as via an E2 interface) connecting one or more CUs 2610, one or more DUs 2630, or both, as well as an O-eNB, with the Near-RT RIC 2625.

In some implementations, to generate AI/ML models to be deployed in the Near-RT RIC 2625, the Non-RT RIC 2615 may receive parameters or external enrichment information from external servers. Such information may be utilized by the Near-RT RIC 2625 and may be received at the SMO Framework 2605 or the Non-RT RIC 2615 from non-network data sources or from network functions. In some examples, the Non-RT MC 2615 or the Near-RT MC 2625 may be configured to tune RAN behavior or performance. For example, the Non-RT MC 2615 may monitor long-term trends and patterns for performance and employ AI/ML models to perform corrective actions through the SMO Framework 2605 (such as reconfiguration via O1) or via creation of RAN management policies (such as A1 policies).

Figures 2A, 2B, 2C, 2D:
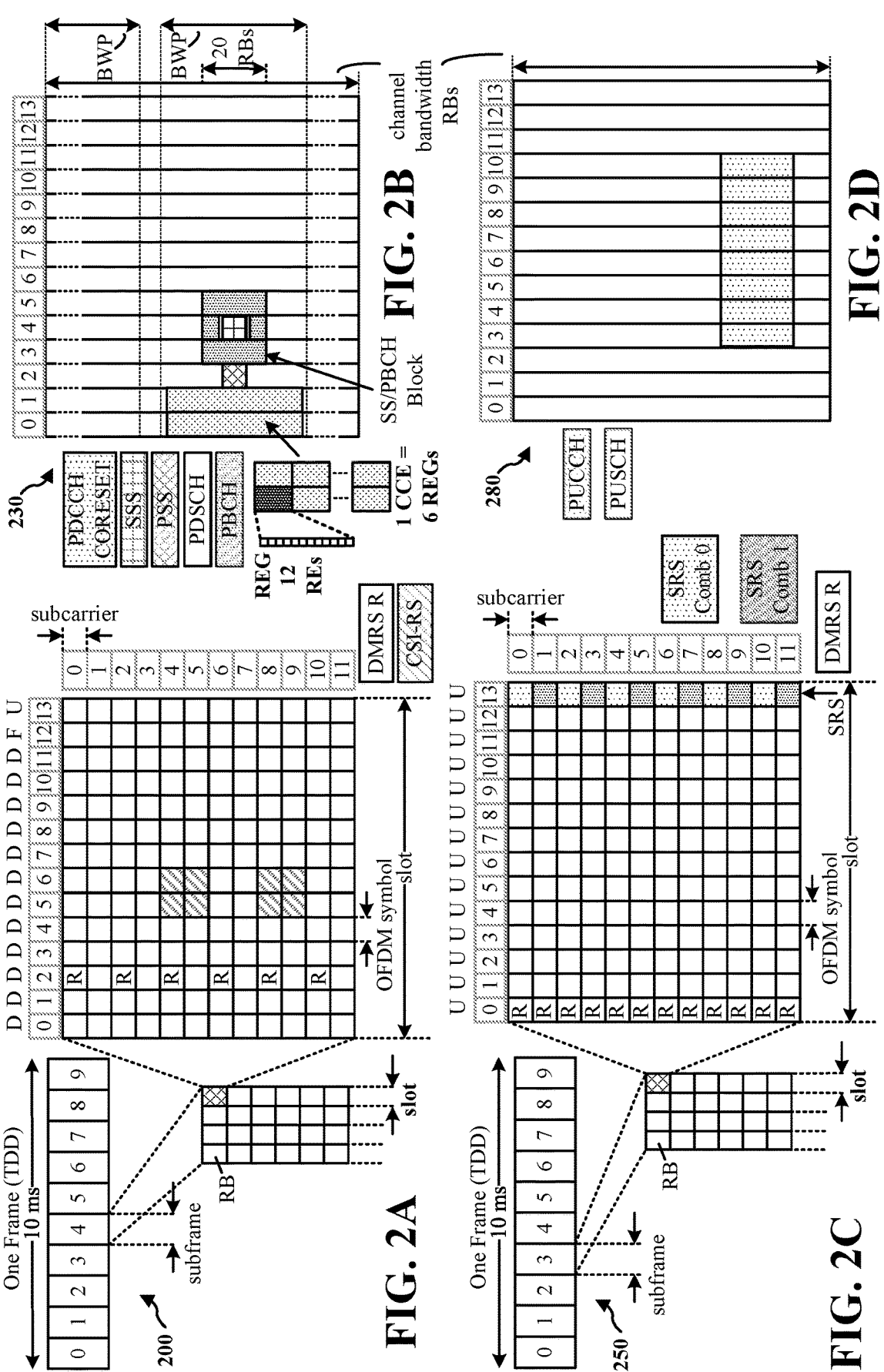
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate an example frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs may carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) may carry DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE may be configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS may be used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB may provide a number of RBs in the system bandwidth and a system frame number (SFN). The physical downlink shared channel (PDSCH) may carry user data, broadcast system information not transmitted through the PBCH such as system information blocks (SIBs), and paging messages.

As illustrated in FIG. 2C, some of the REs may carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH may carry uplink control information (UCI), such as scheduling requests, a channel quality indicator (CQI), a precoding matrix indicator (PMI), a rank indicator (RI), and/or hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
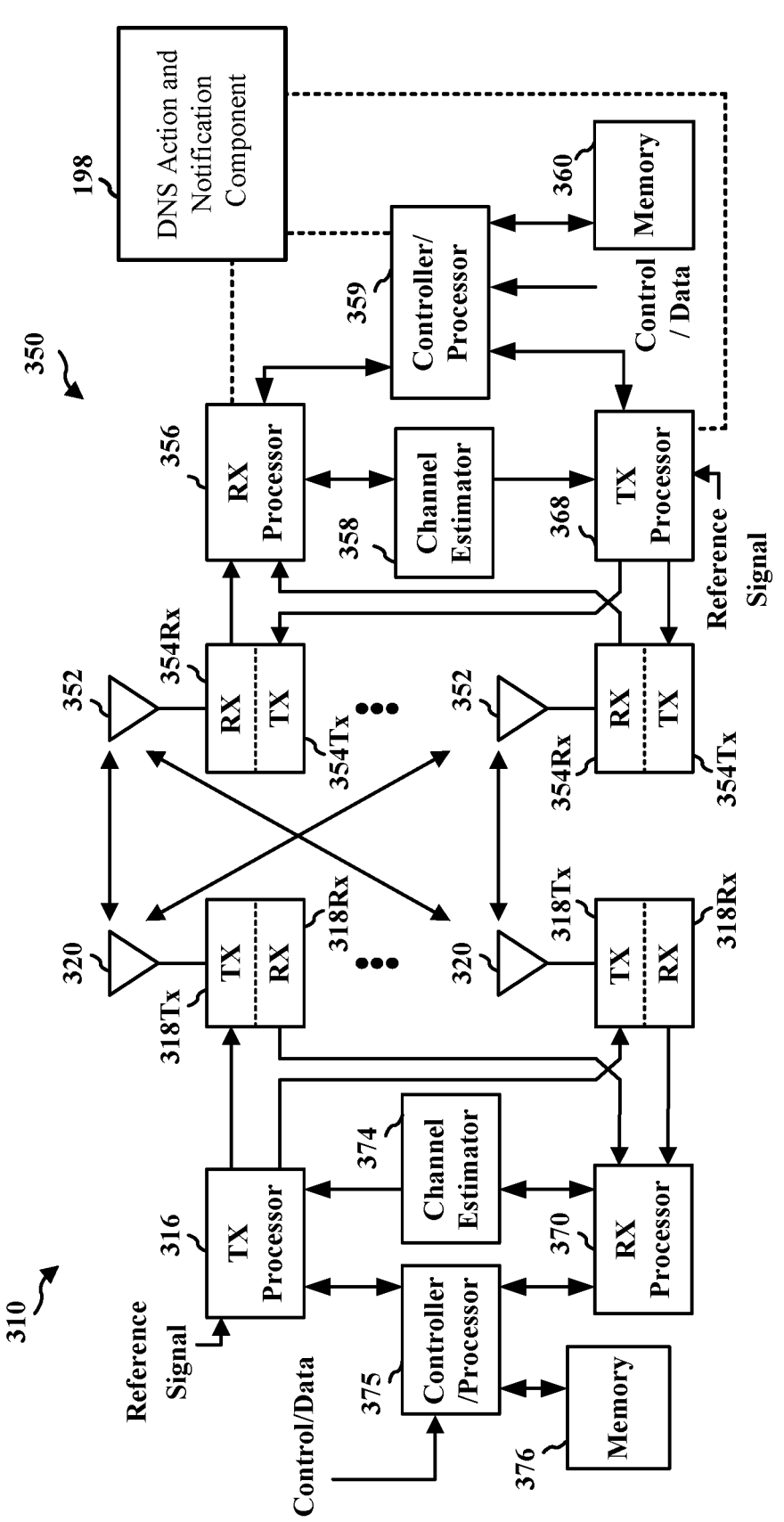
FIG. 3 is a diagram illustrating an example of a base station and user equipment (UE) in an access network.

FIG. 3 is a block diagram of an example base station 310 in communication with a UE 350 in an access network. In the DL, IP packets from the EPC 160 may be provided to a controller/processor 375. The controller/processor 375 may implement layer 3 and layer 2 functionality. Layer 3 may include a radio resource control (RRC) layer, and layer 2 may include a service data adaptation protocol (SDAP) layer, a packet data convergence protocol (PDCP) layer, a radio link control (RLC) layer, and/or a medium access control (MAC) layer. The controller/processor 375 may provide RRC layer functionality associated with broadcasting of system information (e.g., MIB, SIB s), RRC connection control (e.g., RRC connection paging, RRC connection establishment, RRC connection modification, and/or RRC connection release), inter radio access technology (RAT) mobility, and/or measurement configuration for UE measurement reporting; PDCP layer functionality associated with header compression/decompression, security (ciphering, deciphering, integrity protection, integrity verification), and/or handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and/or reordering of RLC data PDUs; and/or MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and/or logical channel prioritization.

The transmit (TX) processor 316 and the receive (RX) processor 370 may implement layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and/or MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK) or/and M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx may receive a signal through its respective antenna 352. Each receiver 354Rx may recover information modulated onto an RF carrier and provide the information to the receive (RX) processor 356. The TX processor 368 and the RX processor 356 may implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 may then convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, may be recovered and demodulated by determining the most likely signal constellation points transmitted by the base station 310. These soft decisions may be based on channel estimates computed by the channel estimator 358. The soft decisions may then be decoded and deinterleaved to recover the data and control signals that were originally transmitted by the base station 310 on the physical channel. The data and control signals may then be provided to the controller/processor 359, which may implement layer 3 and layer 2 functionality.

The controller/processor 359 can be associated with a memory 360 that may store program codes and data. The memory 360 may be referred to as a computer-readable medium. In the UL, the controller/processor 359 may provide demultiplexing between transport and logical channels, packet reassembly, deciphering, header decompression, and/or control signal processing to recover IP packets from the EPC 160. The controller/processor 359 may be also responsible for error detection using an ACK and/or NACK protocol to support HARQ operations.

Similar to the functionality described in connection with the DL transmission by the base station 310, the controller/processor 359 may provide RRC layer functionality associated with system information (e.g., MIB, SIBs) acquisition, RRC connections, and/or measurement reporting; PDCP layer functionality associated with header compression/decompression, and/or security (ciphering, deciphering, integrity protection and/or integrity verification); RLC layer functionality associated with the transfer of upper layer PDUs, error correction through ARQ, concatenation, segmentation, and/or reassembly of RLC SDUs, re-segmentation of RLC data PDUs, and/or reordering of RLC data PDUs; and/or MAC layer functionality associated with mapping between logical channels and transport channels, multiplexing of MAC SDUs onto TBs, demultiplexing of MAC SDUs from TBs, scheduling information reporting, error correction through HARQ, priority handling, and/or logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission may be processed at the base station 310 in a manner similar to that described in connection with the receiver function at the UE 350. Each receiver 318Rx may receive a signal through its respective antenna 320. Each receiver 318Rx may recover information modulated onto an RF carrier and provide the information to a RX processor 370.

The controller/processor 375 can be associated with a memory 376 that may store program codes and data. The memory 376 may be referred to as a computer-readable medium. In the UL, the controller/processor 375 may provide demultiplexing between transport and logical channels, packet reassembly, deciphering, header decompression and/or control signal processing to recover IP packets from the UE 350. IP packets from the controller/processor 375 may be provided to the EPC 160. The controller/processor 375 may be also responsible for error detection using an ACK and/or NACK protocol to support HARQ operations.

At least one of the TX processor 368, the RX processor 356, and the controller/processor 359 may be configured to perform aspects in connection with the DNS action and notification component 198 of FIG. 1.

Edge computing may enable operator and third party services to be hosted closer to the UE's access point of attachment, in order to provide an efficient service delivery through the reduced end-to-end latency and load on the transport network. A wireless network may support an Edge Hosting Environment (EHE) deployed in the data network (DN) beyond the protocol data unit (PDU) session anchor (PSA) user plane function (UPF). An EHE may provide support for Edge application servers (EASs). An EHE may be under the control of either the operator or 3rd parties. The local part of the DN in which EHE is deployed may have user plane connectivity with both a centrally deployed PSA and locally deployed PSA of same data network name (DNN). Local routing and traffic steering, session and service continuity, and AF influenced traffic routing, may help to enable edge computing. A local part of a DN may refer to the set of network entities of a DN that are deployed locally. The local access to the DN may provide access to the local part of DN.

Figure 4:
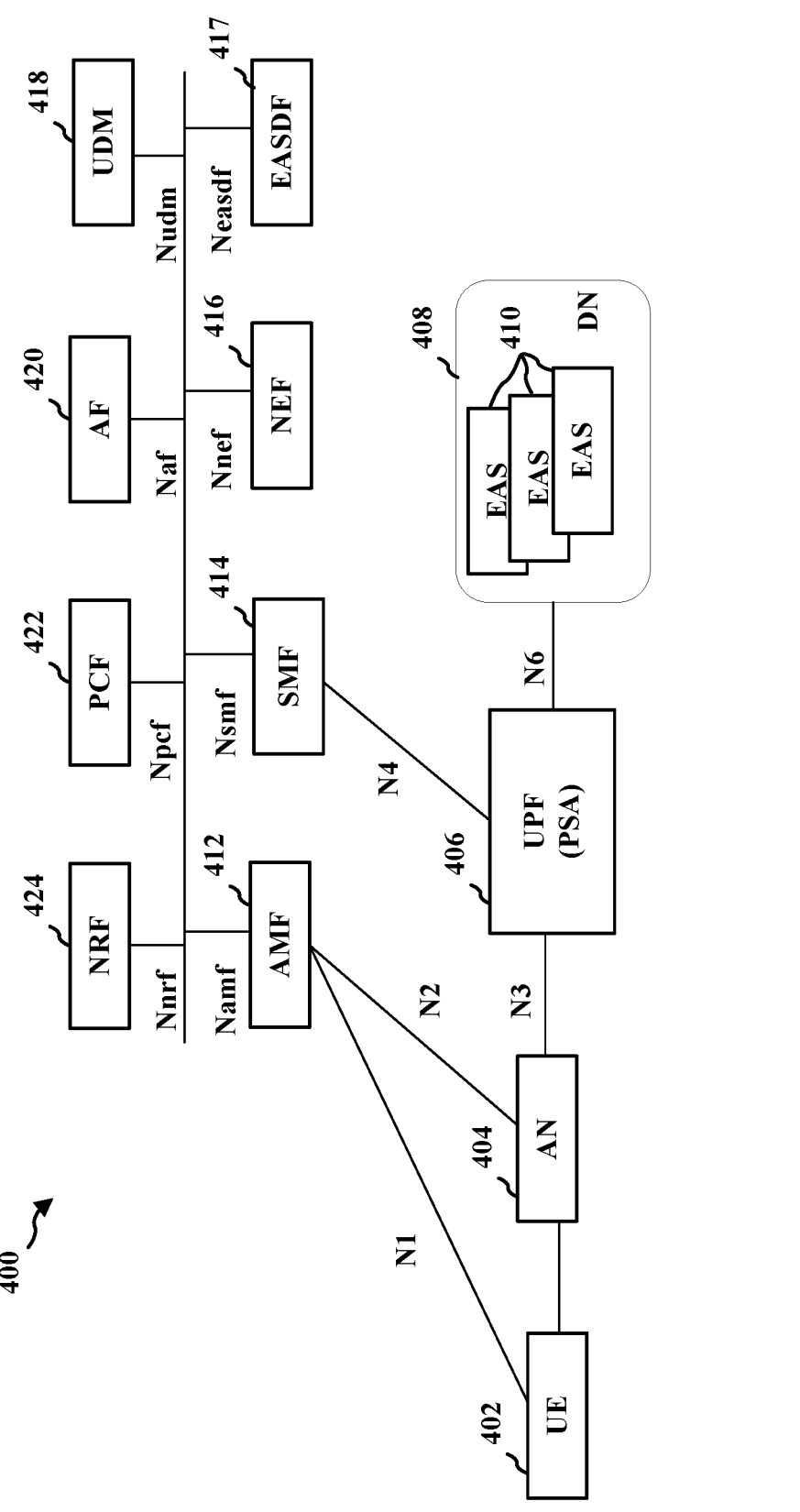
FIG. 4 illustrates an example network architecture for a network supporting Edge computing.

FIG. 4 illustrates an example network architecture 400 supporting Edge computing for a UE 402 via an access network (AN) 404 and AMF 412, the example network architecture shown in FIG. 4 being based on 3GPP TS 23.548. However, other communication technologies may be applied as well. An Edge Application Server Discovery Function (EASDF) 417 may include one or more of the following functionalities: registering to network repository function (NRF) 424 for EASDF discovery and/or selection, handling the DNS messages according to the instruction from the SMF 414, receiving DNS message handling rules from the SMF 414, exchanging DNS messages from the UE 402, forwarding DNS messages to a DNS server/resolver for DNS query (although not illustrated, the DNS messages may be forwarded to a central DNS (C-DNS) or local DNS (L-DNS) server/resolver), adding ECS option into DNS query for a fully qualified domain name (FQDN), notifying EASDF related information to the SMF 414, and/or terminating the DNS security. The network architecture may further include a policy control function (PCF) 422, an application function (AF) 420, a network exposure function (NEF) 416, and UDM 418. The EASDF 417 may have user plane connectivity with the PSA UPF 406 over N6 for the transmission of DNS signalling exchanged with the UE 402. Although a single EASDF 417 is illustrated, multiple EASDF instances may be deployed within a PLMN. The interactions between a core network (CN) network functions NF(s) and the EASDF 417 may take place within a PLMN.

In Edge computing, an application service may be served by multiple Edge Application Servers (EASs) 410 of a DN 408, which may be deployed in different sites. These multiple EASs 410 that host an application service may use a single IP address (which may be referred to as an anycast address) or may use different IP addresses. To start an Edge application service, the UE 402 may obtain the IP address(es) of the EAS(s) 410 serving the application service. The UE 402 performs discovery to receive the IP address(es) of a suitable EAS 410 (e.g. the one located closest to the UE), so that the traffic from the UE 402 can be locally routed to the EAS 410 in order to optimize service latency, traffic routing path and user service experience.

EAS Discovery is the procedure by which a UE 402 may discover the IP address(es) of a suitable EAS(s) 410 using a DNS query. EAS Re-discovery is an EAS Discovery procedure that may take place when the previously discovered EAS cannot be used or may have become non-optimal (e.g. at edge relocation).

In order to provide a translation of the FQDN of an EAS into the address of an EAS as topologically as close as possible to the UE, the DNS may use the following information: the source IP address of the incoming DNS Query; and/or an extension mechanism for DNS (EDNS) Client Subnet (ECS) option. The DNS queries generated by the UE 402 may be sent to the EASDF 417 as a DNS resolver indicated by the SMF 414, e.g., by an HPLMN. The network may attempt to provide the UE with a translation of the FQDN of an address of an EAS that is as close as possible to the UE 402. Closeness, as used herein, may relate to an IP forwarding distance. For example, the network may attempt to provide the UE with the address of the EAS that has the lowest IP forwarding distance for the UE. In some aspects, the lowest IP forwarding distance may be based on the UE topological location in a network topology.

Figure 5:
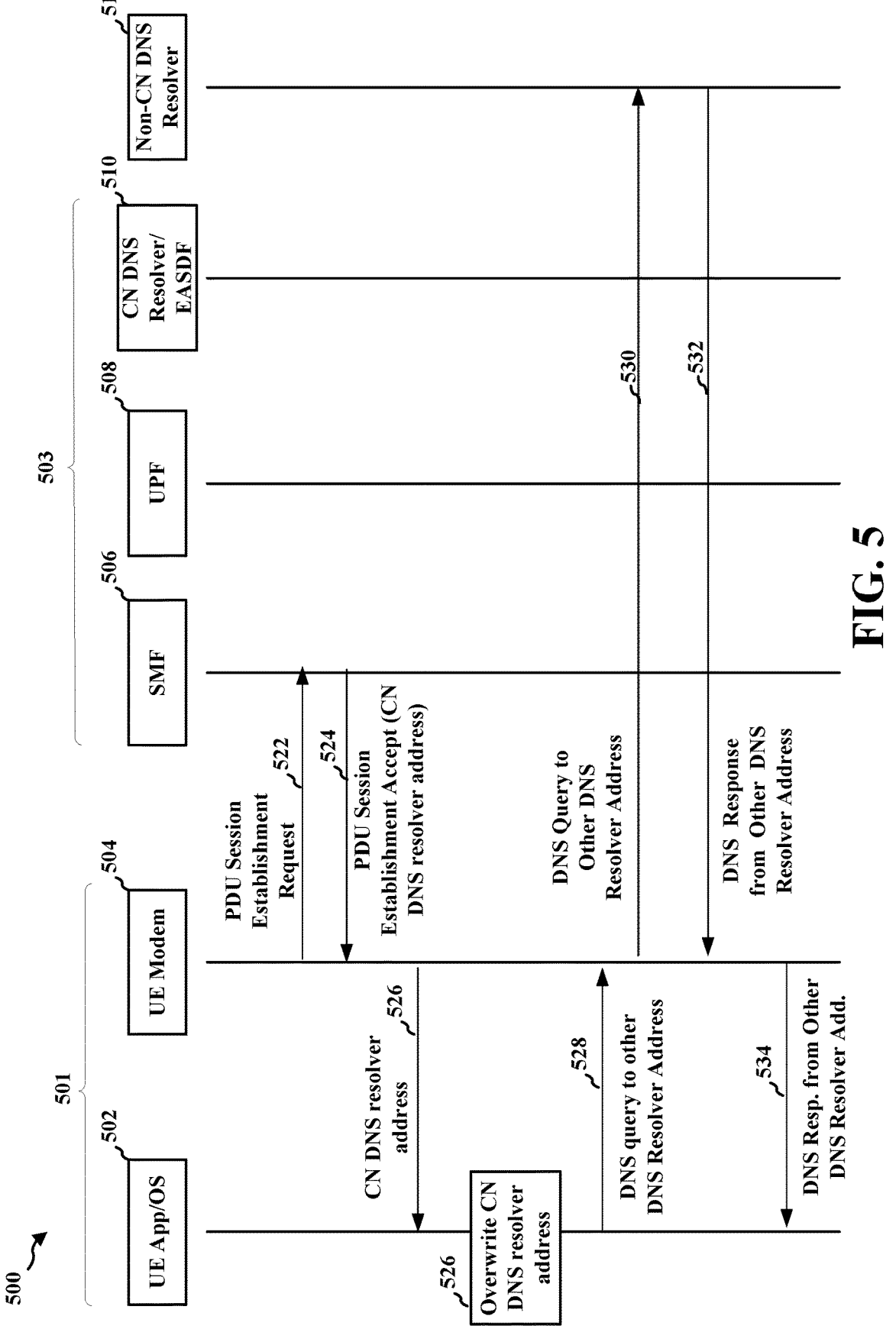
FIG. 5 illustrates an example communication flow including a DNS query having a DNS setting that is different than the DNS setting provided to the UE by the network.

The network, e.g., a core network entity such as the SMF 414, may provide the UE (e.g., a modem of the UE) 402 with one or more DNS settings for the UE 402 to use when sending a DNS query for discovering an EAS IP address for an application service based on edge computing. FIG. 5 illustrates an example communication flow 500 between a UE 501 and a core network 503 (e.g., including an SMF 506, a UPF 508, and/or a DNS resolver/EASDF 510) including a DNS query. As one example of a DNS setting that may be provided by the network, the SMF 506 may indicate the EASDF, or DNS resolver, 510 to which the UE 501 is to direct the DNS query. As illustrated in FIG. 5, the UE may establish a PDU session with the network via the UE modem 504 by transmitting a PDU session establishment request 522 to the SMF. In response to the request, the UE modem 504 may receive a PDU session establishment accept message 524 that may indicate a CN DNS resolver address (e.g., an EASDF IP address) for the UE to use when sending DNS queries. The UE modem 504 may provide the CN DNS resolver address/EASDF IP address to UE operating system or an application at the UE, e.g., 502. However, in some aspects, a different component than the modem 504 of the UE 501, such as an operating system, application, user interface, etc. may apply a different DNS setting for a DNS query, the DNS setting being different than the DNS settings received from the SMF 506, e.g., as illustrated at 526. For example, the application may use a different DNS server by changing the DNS setting or using a different DNS as a target IP for the DNS query. FIG. 5 illustrates the example application/operating system 502 overwriting the DNS resolver address provided by the network at 524. At 528, the application or operating system 502 may initiate a DNS query to a different DNS resolver address than the one provided from the core network, e.g., at 524. The UE modem 504 may transmit the DNS query to the other DNS resolver address (e.g., of the non-CN DNS resolver 512) via the core network, at 530. The non-CN DNS resolver 512 may respond by providing the UE 501 with an EAS IP address, at 532, which the UE modem 504 may forward to the application/operating system 502 in a response message 534. By not using the EASDF/DNS resolver of the core network, the UE may not be provided with the EAS IP address for the EAS that is closest in IP forwarding distance to the UE 501. The overwriting of the CN DNS resolver address may result in additional delays and may lead the UE to operate in a manner that is different from the mobile network operator's indication at 524.

Aspects presented herein may help enable the UE to accurately discover the closest/most appropriate EAS. As described in connection with FIG. 5, an EAS discovery or rediscovery mechanism may be based on a DNS query or request from the UE. The network may assume that the UE will send the DNS query to the appropriate DNS resolver that can be placed within the mobile network operator (MNO) domain (e.g., the CN DNS resolver/EASDF 510), which may provide the UE with an IP address result of the best or most appropriate EAS for the particular UE and/or for a particular application. The network may also provide the EAS IP address in combination with an update of related PDU session routing. However, if the DNS query is not sent to the appropriate DNS resolver (e.g., not sent to the CN DNS resolver/EASDF 510), the EAS discovery/rediscovery mechanism may not provide an optimal result, e.g. and may instead provide an EAS IP address that is more distant from the UE and may result in additional delays. For example, the UE may experience delays in discovering the EAS, when the UE edge application and the network Edge application exchange user plane data, etc. Aspects presented herein may help the UE to generate a DNS query toward the DNS resolver indicated in the DNS settings provided by the SMF 506 and/or to make the core network aware that such DNS settings are not used when the DNS query is sent, which may enable the core network to perform potential counteractions.

In some aspects, the SMF may instruct the UPF to change the target IP information to the EASDF IP information. In some aspects, the DNS query may follow a request path from the UE to the UPF/SMF to the EASDF and then to the DNS server indicated by the UE, which may lead to the same result while crossing the EASDF as part of the route to the different DNS server indicated by the UE. In some aspects, the UE, e.g., at the modem, may change the target IP information from the different DNS server to the EASDF IP information for the EASDF indicated to the UE in the network DNS settings. In some aspects, the UE may receive a notification (e.g., an internal notification) that the DNS setting from the network is not used or has been changed by the UE or an application at the UE. The UE may send a notification to the network so that the network may choose to block the DNS query. In some aspects, the UPF, rather than the UE, may detect that the UE is sending a DNS query using a different DNS setting than the settings provided by the network.

In some aspects, the UE may indicate to the network its capability to monitor and/or modify DNS queries relative to the DNS settings provided by the network, and the network may instruct the UE based on the UE capabilities. For example, the network may be aware if the UE does not support DNS monitoring or modifications. If the UE supports the DNS monitoring feature, the network may instruct the UE to notify the core network if an action is to be taken by the network. For example, if a DNS query is modified by the UE, the UE may notify the network, and the network may block or redirect the DNS query. If encrypted DNS queries are used between the UE and the network, the UE may notify the network, and the network may take an action to address a DNS query that is not directed to the EASDF for the network. If the UE supports DNS modification, the network may instruct the UE to modify a DNS query, e.g., to apply the network indicated DNS settings. In some aspects, the network may indicate for the UPF to modify the DNS query to direct the query to the EASDF for the network.

Figure 6:
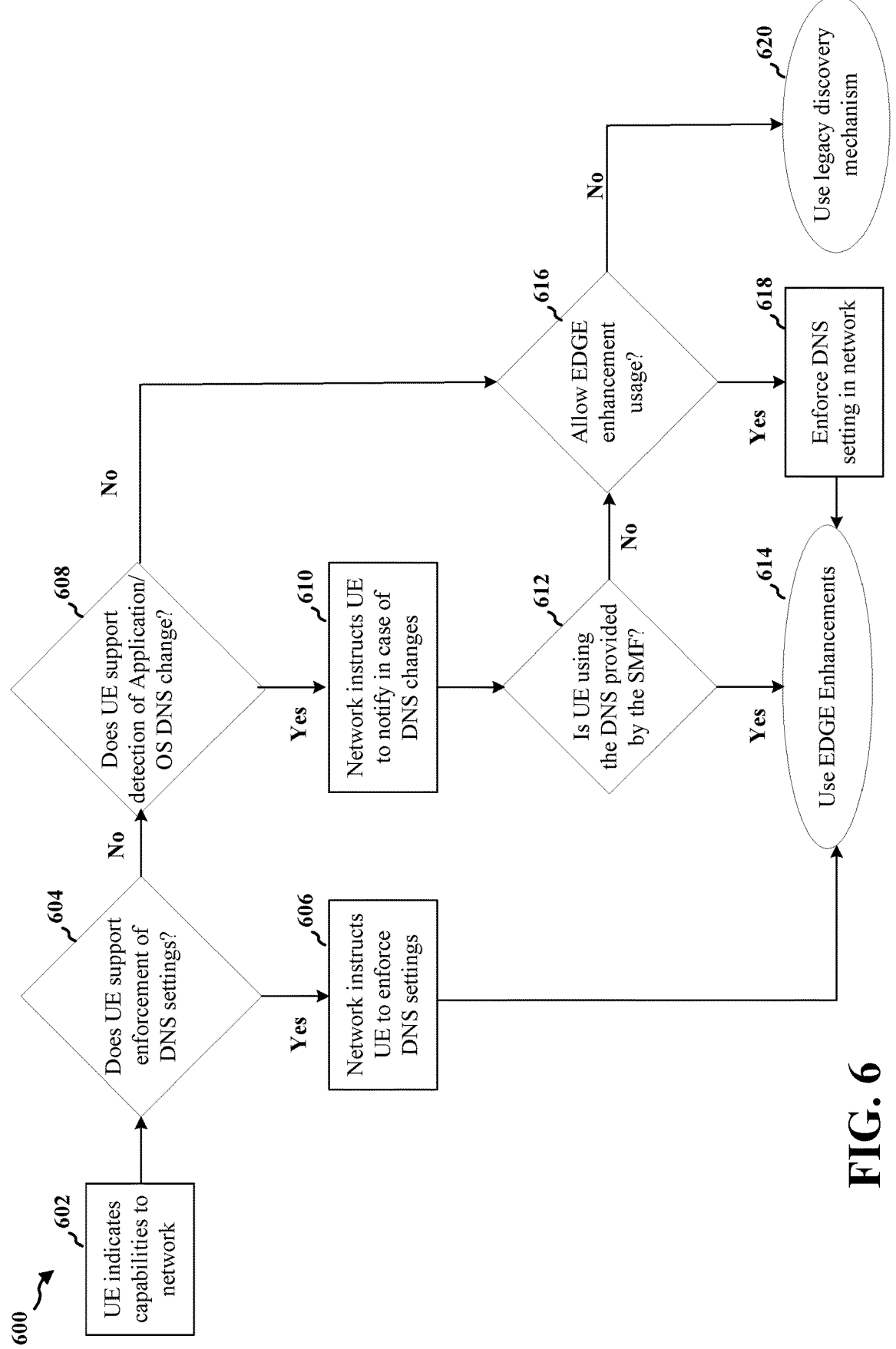
FIG. 6 illustrates an example flow chart for a network to handle DNS queries from a UE based on various possible capabilities for detection and enforcement.

FIG. 6 illustrates an example flowchart 600 including the network instruction of a UE based on the UE capability to detect and/or enforce DNS settings. At 602, the network may receive an indication of one or more capabilities from a UE. At 604, the network may determine whether the UE supports enforcement of DNS settings, e.g., based on the capabilities indicated at 602. If so, the network may instruct the UE to enforce DNS settings, at 606, e.g., by changing the DNS resolver address in a DNS query to the network's DNS resolver/EASDF address. Then, at 614, the network can use Edge enhancements, e.g., by responding to the UE's DNS query by providing an EAS IP address for a closest applicable EAS for the particular UE or application at the UE. If the UE does not support enforcement of DNS settings, the network may determine, at 608, whether the UE supports detection of changes to the DNS settings, e.g., by an application, OS, user interface, etc. If so, at 610, the network may instruct the UE to notify the network if the UE detects a DNS change. If the UE is instructed to notify the network, at 612, the network may determine whether the UE is using the DNS provided by the network, e.g., based on whether any notifications have been received from the UE. If the UE is using the DNS provided by the network, the network may use the Edge enhancement, at 614, with the UE. If the UE is not using the DNS provided by the network, e.g., as indicated in a notification from the UE, at 616, the network may determine whether to allow edge enhancement usage. If the network determines to allow the Edge network usage, the network may enforce the DNS setting at the network at 618, e.g., by directing the DNS query from the UE to the DNS resolver of the network rather than the DNS resolver indicated in the query. The network may then proceed to use the Edge enhancement, at 614. If the UE does not support detection of a DNS change, the network may proceed to the determination at 616. If the network determines not to allow the Edge enhancement usage, the network may use a legacy discovery mechanism, e.g., a non-Edge specific discovery mechanism, at 620.

A UE may indicate its capabilities to a core network in terms of support for detection of usage of DNS parameters that are different than, e.g., different from, the DNS settings that were previously received from the network. In some aspects, the UE may indicate a capability in terms of support for enforcement of previously received network DNS settings. The UE may indicate one or more capabilities relating to DNS queries, e.g., detection and/or enforcement, in a PDU session establishment request message, e.g., via a protocol configuration option (PCO) or extended PCO (ePCO).

Depending on the capabilities indicated by the UE, an SMF may indicate an action setting and/or a notification setting for the UE. In some aspects, the base station may indicate the settings in a PCO of a PDU session establishment accept message and/or a PDU session modification command message. The action setting may indicate for the UE to monitor for the DNS change, e.g., detect only, without indicating an action for the UE to take if a DNS change is detected. The action setting may indicate for the UE to put the DNS query on hold and to wait for an indication from the SMF to release the DNS query. The action setting may indicate for the UE to redirect the DNS query from the DNS resolver selected by the OS or application at the UE to the EASDF or core network DNS resolver that was indicated to the UE by the network. The action setting may indicate for the UE to block the DNS query, e.g., to not forward the DNS query to the network and to skip a report or indication to the OS/application that the DNS query is blocked. The action setting may indicate for the UE to reject the DNS query, e.g., to not forward the DNS query to the network and to send a report or indication to the OS/application that the DNS query is rejected.

The notification setting may indicate for a type of notification for the UE to send to the SMF. The notification setting may indicate for the UE not to notify the network of a DNS query having different DNS settings than those provided by the network. The notification setting may indicate for the UE to notify the network of a DNS query having different DNS settings than those provided by the network, e.g., without specifying a particular corrective action for the UE to take. The notification setting may indicate for the UE to notify the network of a DNS query having different DNS settings than those provided by the network and to put the DNS query on hold until a release is indicated to the UE by the network. The notification setting may indicate for the UE to notify the network upon successful redirection of a DNS query having different DNS settings than those provided by the network. The notification setting may indicate for the UE to notify the network upon a failed redirection of a DNS query having different DNS settings than those provided by the network, e.g., if encryption was used for the DNS query. The notification setting may indicate for the UE to notify the network if/when the UE blocks a DNS query having different DNS settings than those provided by the network. The notification setting may indicate for the UE to notify the network if/when the UE rejects a DNS query having different DNS settings than those provided by the network. The notification setting may indicate for the UE to notify the network of each detection of DNS query having different DNS settings than those provided by the network and to notify the network of the action taken by the UE in response to the detection (e.g., redirection, blocking, rejection, hold, etc.).

An example combination of an action setting and a notification setting may include an indication for no notification and an action setting to redirect, block, or reject the DNS setting. Another example combination of an action setting and a notification setting may include an indication to send a notification of detection without specifying an action. Another example combination of an action setting and a notification setting may include an indication to send a notification of detection and an action setting to put the DNS query on hold. Another example combination of an action setting and a notification setting may include an indication to send a notification of detection and an action setting to redirect the DNS query. In some aspects, the notification setting may indicate for the UE to send the notification upon successful redirection or upon failed redirection. Another example combination of an action setting and a notification setting may include an indication to send a notification of detection and an action setting to block the DNS query. The notification setting may indicate for the UE to notify the network that the UE has blocked the detected DNS query. Another example combination of an action setting and a notification setting may include an indication to send a notification of detection and an action setting to reject the DNS query. The notification setting may indicate for the UE to notify the network that the UE has rejection the detected DNS query. If the UE blocks the DNS query, the UE may not send a message to the OS/application, whereas if the UE rejects the DNS query, the UE may notify the OS/application that the DNS query was rejected. As described in connection with the examples in FIGS. 6-15, the UE applies the instructions from the network in the action setting and/or notification setting.

Each notification, which the UE transmits to the network about a detected DNS query having different DNS settings than those received from the network, may include a PDU session ID and/or a destination IP address of the DNS query. The notification may further include an FQDN of the DNS query, e.g., if available, a rest of a 5-tuple, and/or an application ID associated with the DNS query.

Figure 7:
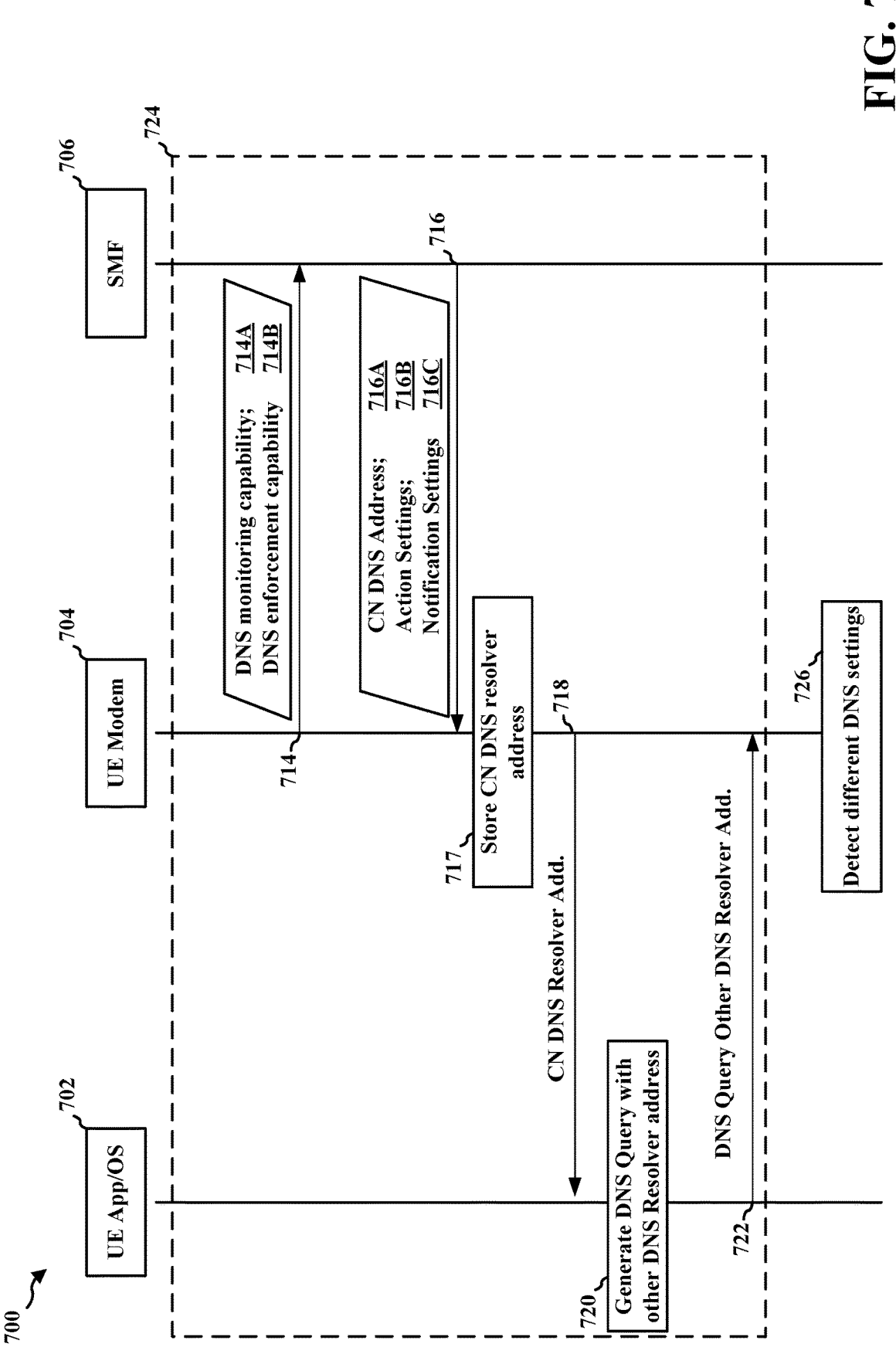
FIG. 7 is a call flow diagram illustrating communication between a session management function (SMF) of a core network (CN), a UE modem, and a UE application or operating system (OS) relating to a domain name server (DNS) query.

FIG. 7 is a call flow diagram 700 illustrating communication between an SMF 706 of a CN, a UE modem 704, and a UE application or OS, e.g., 702, relating to a DNS query. The UE modem 704 may transmit an indication, e.g., in message 714, of a DNS monitoring capability 714A and/or a DNS enforcement capability 714B. The indication may be transmitted in a PDU session establishment request message via PCO. The SMF 706 may receive the indication, e.g., in message 714, and, based on the indicated DNS monitoring capability 714A and/or the indicated DNS enforcement capability 714B, may transmit DNS settings 716. The DNS settings 716 may be transmitted via PCO of a PDU session establishment accept message. The DNS settings 716 may indicate a CN DNS resolver network address 716A (e.g., an internet protocol (IP) address and a port and/or media access control (MAC) address), which the UE modem 704 may store at 717.

The DNS settings 716 may also include an action setting 716B that indicates to the UE modem 704 to do one or more of (1) detect a DNS address in a DNS query from the UE application, e.g., 702, that is not the indicated CN DNS resolver network address 716A, (2) put a DNS query on hold (e.g., when the DNS address change is detected), (3) redirect a DNS query to an edge application server discovery function (EASDF) at the indicated CN DNS resolver network address 716A, (4) block a DNS query (e.g., without sending a response), and/or (5) reject a DNS query and send a negative response. The DNS settings 716 may further include a notification setting 716C. The notification setting 716C may indicate for the UE modem 704 to do one or more of (1) notify the SMF 706 on detection of a DNS address in a DNS query from the UE application, e.g., 702, that is not the indicated CN DNS resolver network address 716A, (2)

notify the SMF 706 of an action taken by the UE modem 704 (e.g., based on the action settings 716B), or (3) provide no notification of a detection or an action by the UE modem 704.

The UE modem 704 may transmit the CN DNS resolver network address 718 to the UE application/OS, e.g., 702. The UE application or OS 702 may generate 720 a DNS query with a DNS resolver address that is not the CN DNS resolver network address 716A. The UE application/OS, e.g., 702, may then initiate transmission of a DNS query 722 with a DNS resolver address that is not the CN DNS resolver network address 716A to the UE modem 704. The DNS resolver address may be associated with a DNS resolver address that is not associated with the CN or with an edge appliance providing edge services for the CN. The communications, e.g., 714 through 722, may be grouped into a set of communications related to a DNS capability indication, a DNS settings message, and a related DNS query, e.g., as shown at 724. At 726, the UE modem 704 may detect that the DNS query 722 has one or more different settings than those provided by the core network, at 716, and stored at 717. For example, the UE modem 704 may compare the DNS settings received at the PDU session establishment, e.g., at 716, with those in the DNS query 722. The UE modem 704 may detect that the DNS query 722 is directed to a different DNS resolver than the core network DNS resolver/EASDF indicated by the network. In some aspects, the UE modem 704 may detect the different DNS settings for non-encrypted DNS queries. The UE modem 704 may detect different DNS settings in the DNS query 722 based on encrypted targeting of known ports. The UE modem 704 may receive a notification from the UE application/OS 702 that the DNS query 722 has DNS settings that are different than those provided at 718.

Figure 8:
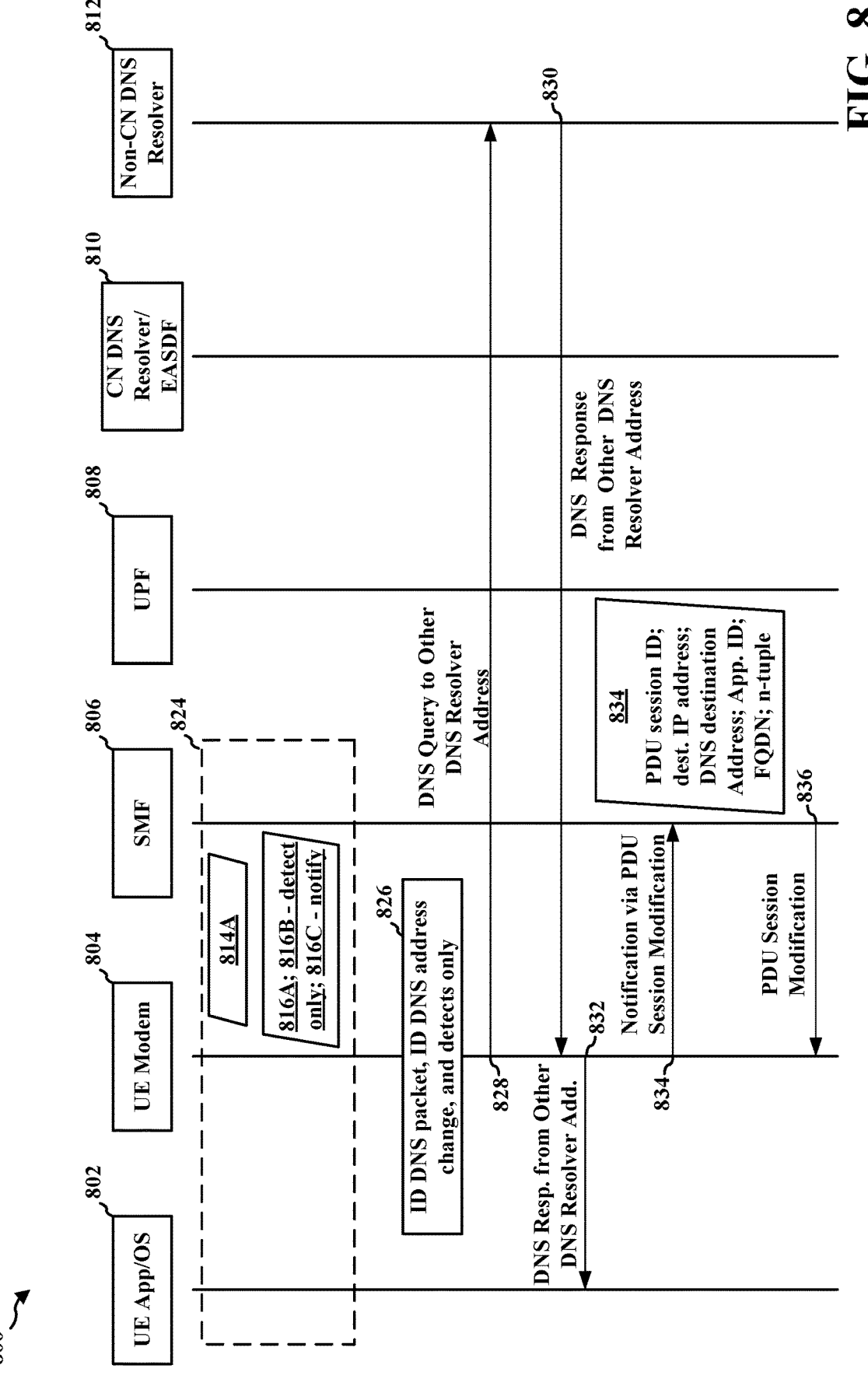
FIG. 8 is a call flow diagram illustrating a UE modem configured to notify the SMF of a detected change to a DNS resolver address.

FIG. 8 is a diagram 800 illustrating a call flow associated with a UE modem 804 configured to notify the SMF 806 of a detected change to a DNS resolver address. Diagram 800 illustrates a set of elements in communication with each other including a UE application/OS 802, a UE modem 804, an SMF 806, a UPF 808, a CN DNS resolver/EASDF 810, and a non-CN DNS resolver 812. Diagram 800 illustrates a set of communications related to a DNS capability indication, a DNS settings message, and a related DNS query 824 (as described in relation to the set of communications 724 of FIG. 7). Diagram 800 indicates that the UE modem 804 transmits a capability indication 814A that indicates that the UE (e.g., the UE modem 804) is capable of detecting that an address in a DNS query is different from a DNS address indicated by the SMF 806. Diagram 800 further indicates that the SMF 806 may transmit to the UE modem 804, (1) a CN DNS network address 816A associated with CN DNS resolver/EASDF 810, (2) an indication (e.g., 816B) for the UE modem 804 to detect a DNS address in a DNS query from the UE application/OS 802 that is not the indicated CN DNS resolver network address at 816A, and (3) a notification setting 816C for the UE modem 804 to notify the SMF 806 on detection of a DNS address in a DNS query from the UE application/OS 802 that is not the indicated CN DNS resolver network address, e.g., 816A.

For a DNS query (e.g., query 722) with a DNS resolver address that is not the CN DNS resolver network address 816A, the UE modem 804 may identify 826 that a transmission from the UE application/OS 802 is a DNS query and that the destination network (e.g., IP) address of the DNS query is not the CN DNS network address 816A. The identification that the transmission from the UE application/OS 802 is a DNS query may be based on the content of the transmission, a destination network address, and/or a port number (e.g., 53/853) in a header of the DNS query that is associated with a DNS operation, e.g., for a non-encrypted DNS query. In some aspects, the transmission from the UE application/OS 802 may be determined to be a DNS query even if the transmission is encrypted based on the destination address or destination port in a header of the transmission (e.g., packet).

The UE modem 804 may also allow (i.e., detect only) 826 the DNS query with the destination address that is not the CN DNS network address 816A. The UE modem 804 may transmit a DNS query 828 to a non-CN DNS resolver 812 based on the destination network address of a query (e.g., query 722). The non-CN DNS resolver 812 may receive the query 828 and may transmit a DNS response 830 (e.g., with an IP address corresponding to a fully qualified domain name (FQDN) included the in the DNS query 828). The UE modem 804 may receive the DNS response 830 and may transmit a DNS response 832 to the UE application/OS 802 (e.g., provide the UE OS with the information in the DNS response 830). The UE modem 804 may transmit, based on the indication such as 816C, a notification 834 to the SMF 806. The SMF 806 may receive the notification 834. The notification 834 may include an indication of one or more of a PDU session identifier, a destination IP address (associated with the FQDN), the destination network (e.g., IP) address of the DNS query 828, an application identifier, an FQDN associated with the query 828, and/or other addresses or information in an n-tuple (e.g., a 5-tuple including a source IP address, source port, destination IP address, destination port, and transport protocol) in a header of the DNS response.

The SMF 806 may transmit, and UE modem 804 may receive, a PDU session modification 836. The PDU session modification 836 may include a retransmission of the DNS setting from the network (e.g., SMF 806). In some aspects, the PDU session modification 836 may include a network notification to reinstate a previously received DNS setting (e.g., DNS setting such as 816A).

Figure 9:
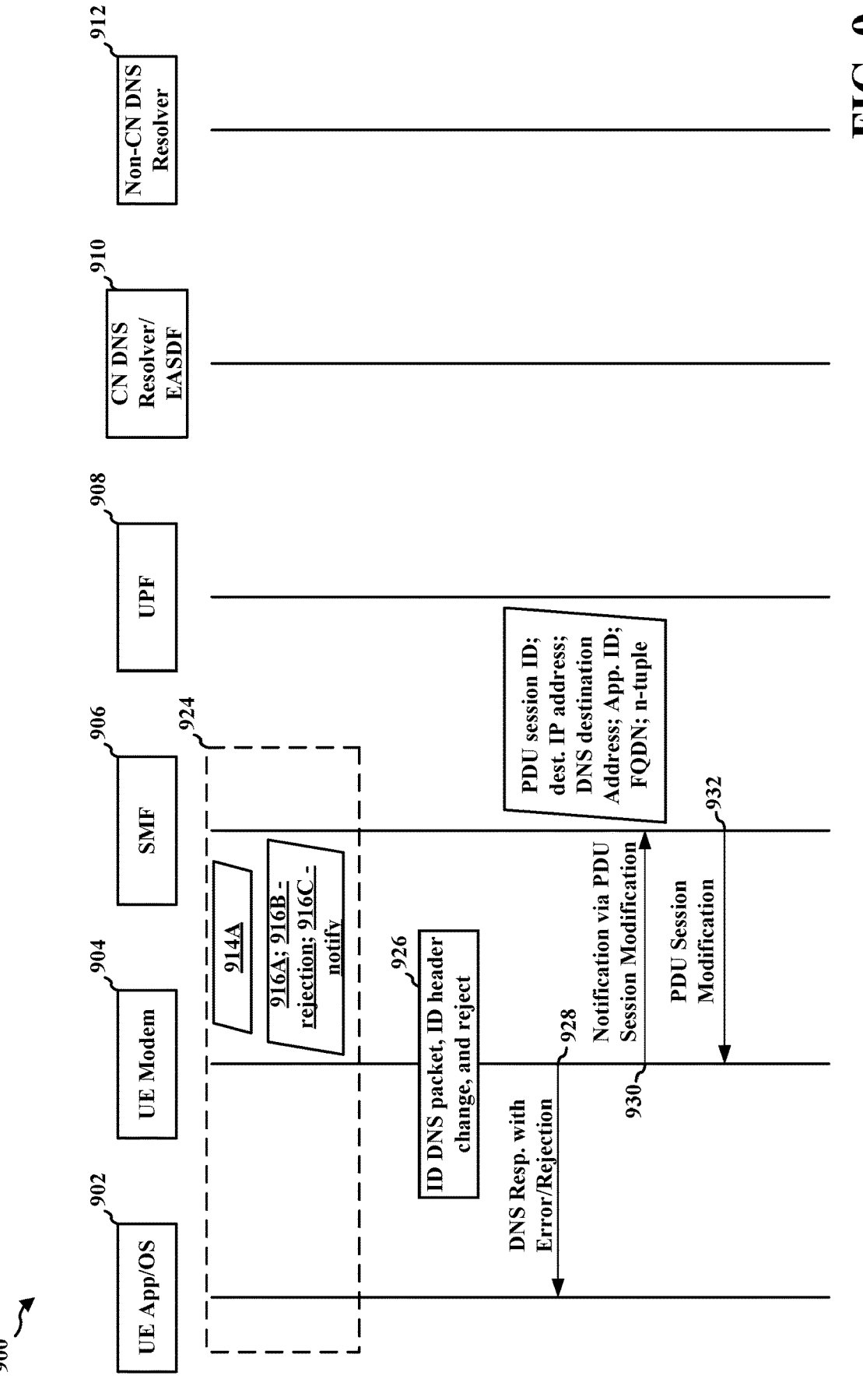
FIG. 9 is a call flow diagram illustrating a UE modem configured to notify the SMF of a detected change to a DNS resolver address and reject the associated DNS query.

FIG. 9 is a diagram 900 illustrating a call flow associated with a UE modem 904 configured to notify the SMF 906 of a detected change to a DNS resolver address and reject the associated DNS query. Diagram 900 illustrates a set of elements in communication with each other including a UE application/OS 902, a UE modem 904, an SMF 906, a UPF 908, a CN DNS resolver/EASDF 910, and a non-CN DNS resolver 912. Diagram 900 illustrates a set of communications related to a DNS capability indication, a DNS settings message, and a related DNS query 924 (as described in relation to the set of communications 724 of FIG. 7). Diagram 900 indicates that the UE modem 904 may transmit a capability indication 914A that indicates that the UE (e.g., the UE modem 904) is capable of detecting that an address in a DNS query is different from a DNS address indicated by the SMF 906. Diagram 900 further indicates that the SMF 906 may transmit to the UE modem 904, (1) a CN DNS network address 916A associated with CN DNS resolver/EASDF 910, (2) an indication (e.g., 916B) for the UE modem 904 to reject (and send a DNS reply for) a DNS request for which the UE modem 904 detects a DNS address in a DNS query from the UE application/OS 902 that is not the indicated CN DNS resolver network address 916A, and (3) a notification setting 916C for the UE modem 904 to notify the SMF 906 on detection and rejection of a DNS query from the UE application/OS 902 with a DNS address that is not the indicated CN DNS resolver network address 916A.

Based on a DNS query (e.g., query 722) with a DNS resolver address that is not the CN DNS resolver network address 916A, the UE modem 904 may identify 926 that a transmission from the UE application/OS 902 is a DNS query and that the destination network (e.g., IP) address of the DNS query is not the CN DNS network address 916A. The identification that the transmission from the UE application/OS 902 is a DNS query may be based on the content of the transmission, a destination network address, and/or a port number (e.g., 53/853) in a header of the DNS query that is associated with a DNS operation, e.g., for a non-encrypted DNS query. In some aspects, the transmission from the UE application/OS 902 may be determined to be a DNS query based on the destination address or destination port in a header of the transmission (e.g., packet).

The UE modem 904 may also reject 926 the DNS query with the destination address that is not the CN DNS network address 916A. The UE modem 904 may transmit a DNS query response 928 of the rejection of the DNS query (e.g., query 722 of FIG. 7) to the UE application/OS 902. The UE modem 904 may transmit, based on the indication such as at 916C, a notification 930 to the SMF 906. The SMF 906 may receive the notification 930. The notification 930 may include an indication of one or more of a PDU session identifier, a destination IP address (associated with the FQDN), the destination network (e.g., IP) address of the rejected DNS query (e.g., query 722 of FIG. 7), an application identifier, an FQDN associated with the DNS query, and/or other addresses or information in an n-tuple (e.g., a 5-tuple including a source IP address, source port, destination IP address, destination port, and transport protocol) in a header of the rejected DNS query. The notification 930 may also include an indication that the DNS query was rejected.

The SMF 906 may transmit, and UE modem 904 may receive, a PDU session modification 932. The PDU session modification 932 may include a retransmission of the DNS setting from the network (e.g., SMF 906). In some aspects, the PDU session modification 932 may include a network notification to reinstate a previously received DNS setting (e.g., 916A).

Figure 10:
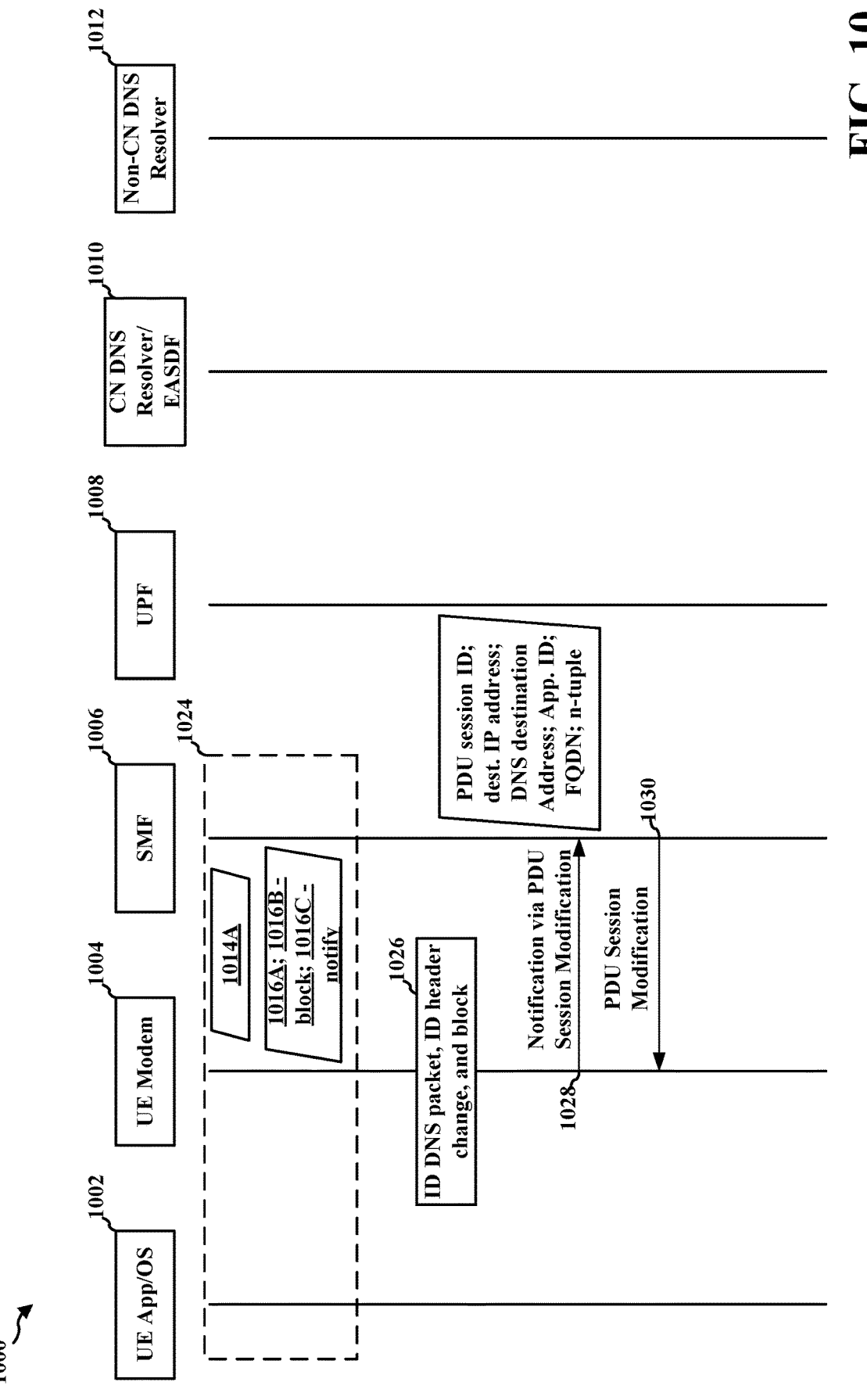
FIG. 10 is a call flow diagram illustrating a UE modem configured to notify the SMF of a detected change to a DNS resolver address and block the associated DNS query.

FIG. 10 is a diagram 1000 illustrating a call flow associated with a UE modem 1004 configured to notify the SMF 1006 of a detected change to a DNS resolver address and block the associated DNS query. Diagram 1000 illustrates a set of elements in communication with each other including a UE application/OS 1002, a UE modem 1004, an SMF 1006, a UPF 1008, a CN DNS resolver/EASDF 1010, and a non-CN DNS resolver 1012. Diagram 1000 illustrates a set of communications related to a DNS capability indication, a DNS settings message, and a related DNS query 1024 (as described in relation to the set of communications 724 of FIG. 7). Diagram 1000 indicates that the UE modem 1004 may transmit a capability indication 1014A that indicates that the UE (e.g., the UE modem 1004) is capable of detecting that an address in a DNS query is different from a DNS address indicated by the SMF 1006. Diagram 1000 further indicates that the SMF 1006 may transmit to the UE modem 1004, (1) a CN DNS network address 1016A associated with CN DNS resolver/EASDF 1010, (2) an indication, e.g., 1016B, for the UE modem 1004 to block a DNS request for which the UE modem 1004 detects a DNS address in a DNS query from the UE application 1002 that is not the indicated CN DNS resolver network address 1016A, and/or (3) a notification setting 1016C for the UE modem 1004 to notify the SMF 1006 on detection and blocking of a DNS query from the UE application 1002 with a DNS address that is not the indicated CN DNS resolver network address 1016A.

Based on a DNS query (e.g., query 722) with a DNS resolver address that is not the CN DNS resolver network address 1016A, the UE modem 1004 may identify, e.g., at 1026, that a transmission from the UE application 1002 is a DNS query and that the destination network (e.g., IP) address of the DNS query is not the CN DNS network address 1016A. The identification that the transmission from the UE application 1002 is a DNS query may be based on the content of the transmission, a destination network address, and/or a port number (e.g., 53/853) in a header of the DNS query that is associated with a DNS operation, e.g., for a non-encrypted DNS query. In some aspects, the transmission from the UE application 1002 may be determined to be a DNS query even if the transmission is encrypted based on the destination address or destination port in a header of the transmission (e.g., packet).

The UE modem 1004 may also block 1026 the DNS query with the destination address that is not the CN DNS network address 1016A. The UE modem 1004 may transmit, based on the indication such as at 1016C, a notification 1028 to the SMF 1006. The SMF 1006 may receive the notification 1028. The notification 1028 may include an indication of one or more of a PDU session identifier, a destination IP address (associated with the FQDN), the destination network (e.g., IP) address of the blocked DNS query (e.g., query 722 of FIG. 7), an application identifier, an FQDN associated with the DNS query, and/or other addresses or information in an n-tuple (e.g., a 5-tuple including a source IP address, source port, destination IP address, destination port, and transport protocol) in a header of the blocked DNS query. The notification 1028 may also include an indication that the DNS query was blocked.

The SMF 1006 may transmit, and UE modem 1004 may receive, a PDU session modification 1030. The PDU session modification 1030 may include a retransmission of the DNS setting from the network (e.g., SMF 1006). In some aspects, the PDU session modification 1030 may include a network notification to reinstate a previously received DNS setting (e.g., DNS setting such as 1016A).

Figure 11:
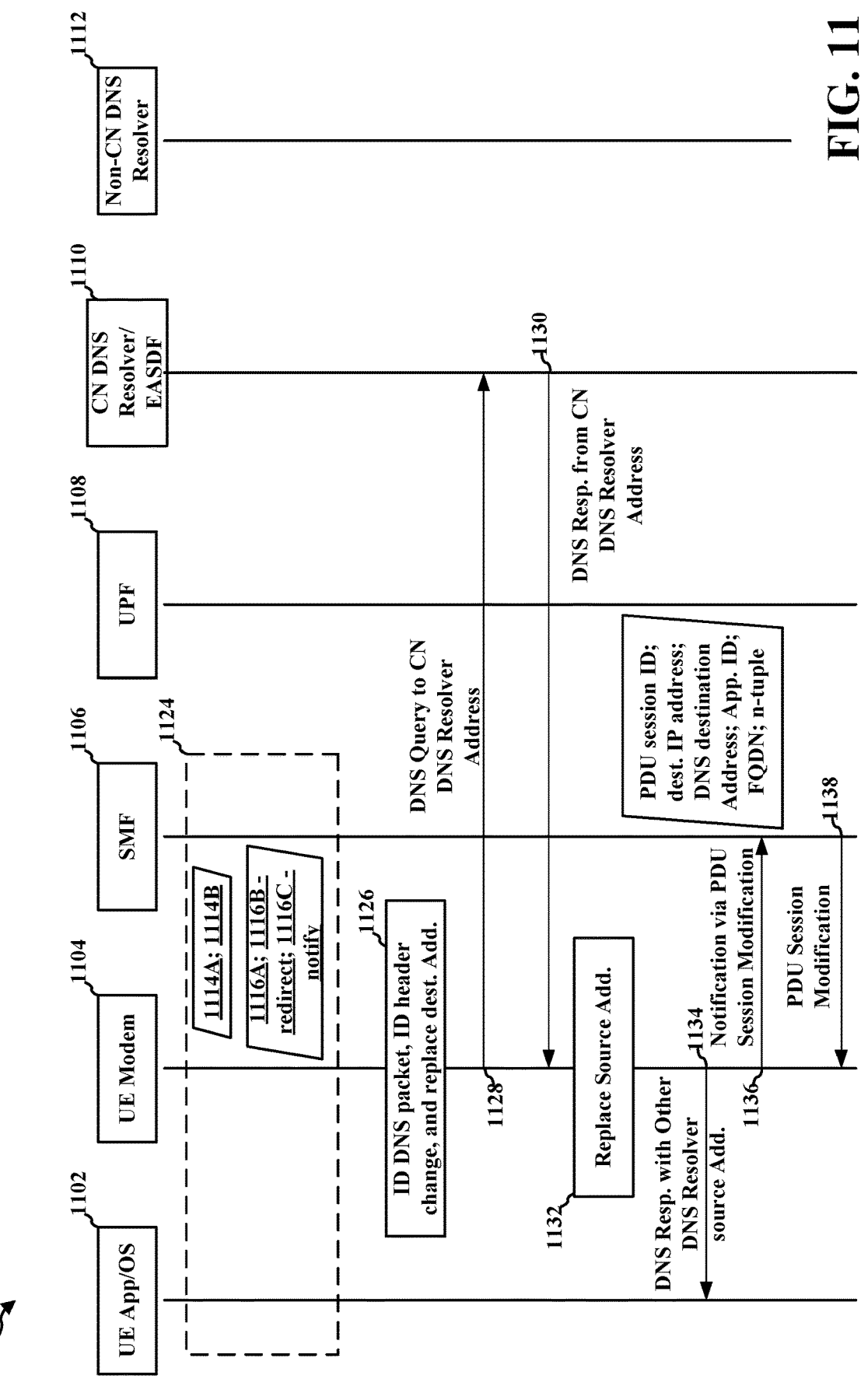
FIG. 11 is a call flow diagram illustrating a UE modem configured (1) to notify the SMF of a detected change to a DNS resolver address and (2) to modify the DNS resolver address to be an address associated with a CN DNS resolver/ Edge Application Server Discovery Function (EASDF).

FIG. 11 is a diagram 1100 illustrating a call flow associated with a UE modem 1104 configured (1) to notify the SMF 1106 of a detected change to a DNS resolver address and (2) to modify the DNS resolver address to be an address associated with a CN DNS resolver/EASDF 1110. Diagram 1100 illustrates a set of elements in communication with each other including a UE application/OS 1102, a UE modem 1104, an SMF 1106, a UPF 1108, a CN DNS resolver/EASDF 1110, and a non-CN DNS resolver 1112. Diagram 1100 illustrates a set of communications related to a DNS capability indication, a DNS settings message, and a related DNS query 1124 (as described in relation to the set of communications 724 of FIG. 7). Diagram 1100 indicates that the UE modem 1104 transmits a capability indication 1114A that indicates that the UE (e.g., the UE modem 1104) is capable of detecting that an address in a DNS query is different from a DNS address indicated by the SMF 1106. Diagram 1100 indicates that the UE modem 1104 may also transmit a capability indication 1114B that indicates that the UE (e.g., the UE modem 1104) is capable of enforcing a DNS address (e.g., replacing a DNS address with a CN DNS address) when an address in a DNS query is different from a DNS address indicated by the SMF 1106. Diagram 1100 further indicates that the SMF 1106 may transmit to the UE modem 1104, (1) a CN DNS network address 1116A associated with CN DNS resolver/EASDF 1110, (2) an indication, e.g., 1116B, for the UE modem 1104 to detect a DNS address in a DNS query from the UE application/OS 1102 that is not the indicated CN DNS resolver network address 1116A and to redirect the DNS query to the CN DNS address 1116A, and (3) a notification setting 1116C for the UE modem 1104 to notify the SMF 1106 on detection and redirection of a DNS address in a DNS query from the UE application/OS 1102 that is not the indicated CN DNS resolver network address 1116A.

Based on a DNS query (e.g., query 722) with a DNS resolver address that is not the CN DNS resolver network address 1116A, the UE modem 1104 may identify 1126 that a transmission from the UE application/OS 1102 is a DNS query and that the destination network (e.g., IP) address of the DNS query is not the CN DNS network address 1116A. The identification that the transmission from the UE application/OS 1102 is a DNS query may be based on the content of the transmission, a destination network address, and/or a port number (e.g., 53/853) in a header of the DNS query that is associated with a DNS operation, e.g., for a non-encrypted DNS query. In some aspects, the transmission from the UE application/OS 1102 may be determined to be a DNS query based on a known destination address or destination port in a header of the transmission (e.g., packet).

The UE modem 1104 may also redirect (e.g., change a destination address) 1126 the DNS query with the destination address that is not the CN DNS network address 1116A to the CN DNS network address 1116A. The UE modem 1104 may transmit a DNS query 1128 to the CN DNS resolver/EASDF 1110 based on the replaced destination network address of the query. The CN DNS resolver/EASDF 1110 may receive the query 1128 and may transmit a DNS response 1130 (e.g., with an IP address corresponding to a FQDN included the in the DNS query 1128). The UE modem 1104 may receive the DNS response 1130 and may replace 1132 the source address (e.g., the CN DNS network address 1116A) of the received DNS response 1130 with the destination address that is not the CN DNS network address 1116A. The UE modem 1104 may transmit the modified DNS Response 1134 to the UE application/OS 1102 (e.g., provide the UE application/OS 1102 with the information in the DNS response 1130). The source address may be replaced to match an expectation of the UE application/OS 1102 for the response to come from the original destination (e.g., to make the DNS enforcement transparent to the UE application/OS 1102).

The UE modem 1104 may transmit, based on the indication such as 1116C, a notification 1136 to the SMF 1106. The SMF 1106 may receive the notification 1136. The notification 1136 may include an indication of one or more of a PDU session identifier, a destination IP address (associated with the FQDN), the destination network (e.g., IP) address of the DNS query 1128. The notification 1136 may also include at least one of an application identifier associated with the DNS query 1128, an FQDN associated with the query 1128, and/or at least a portion of an n-tuple (e.g., a 5-tuple including a source IP address, source port, destination IP address, destination port, and transport protocol) for the DNS query 1128, the response 1130, or the response 1134 (e.g., an n-tuple in a packet header).

The SMF 1106 may transmit, and UE modem 1104 may receive, a PDU session modification 1138. The PDU session modification 1138 may include a retransmission of the DNS setting from the network (e.g., SMF 1106). In some aspects, the PDU session modification 1138 may include a network notification to reinstate a previously received DNS setting (e.g., DNS setting such as 1116A).

Additionally, or alternatively, the SMF may set a UPF action and notification setting, similar to one or more of the example settings described for the UE. The UPF may be configured, or otherwise indicated, to perform a subset of the actions/notifications described for the UE. The SMF may set the action/notification setting for the UPF via an N4 session establishment request message or an N4 session modification request message. The action setting for the UPF may indicate for the UPF to block the DNS query having different DNS settings than the network DNS settings, e.g., to block the query and not send a negative response to the UE. The action setting for the UPF may indicate for the UPF to reject the DNS query having different DNS settings than the network DNS settings, e.g., to reject the query and send a negative response to the UE. The notification setting may indicate for the UPF to notify the SMF upon blocking a DNS query having different DNS settings than the network DNS settings. The notification setting may indicate for the UPF to notify the SMF upon rejecting a DNS query having different DNS settings than the network DNS settings. The notification setting may indicate for the UPF to notify the SMF upon any action taken for a DNS query having different DNS settings than the network DNS settings.

An example combination of an action setting and a notification setting for the UPF may include an indication for no notification and an action setting to redirect, block, or reject the DNS setting. Another example combination of an action setting and a notification setting may include an indication to send a notification of detection and an action setting to block the DNS query. The notification setting may indicate for the UPF to notify the SMF that the UPF has blocked the detected DNS query. Another example combination of an action setting and a notification setting may include an indication to send a notification of detection and an action setting to reject the DNS query. The notification setting may indicate for the UPF to notify the SMF that the UPF has rejection the detected DNS query. If the UPF blocks the DNS query, the UPF may not send a negative message to the UE, whereas if the UPF rejects the DNS query, the UPF may notify the UE that the DNS query was rejected.

Each notification that the UPF transmits to the SMF about a detected DNS query having different DNS settings than those received from the network may include a PDU session ID and/or a destination IP address of the DNS query. The notification may further include an FQDN of the DNS query, e.g., if available, a rest of a 5-tuple, and/or an application ID associated with the DNS query.

Figure 12:
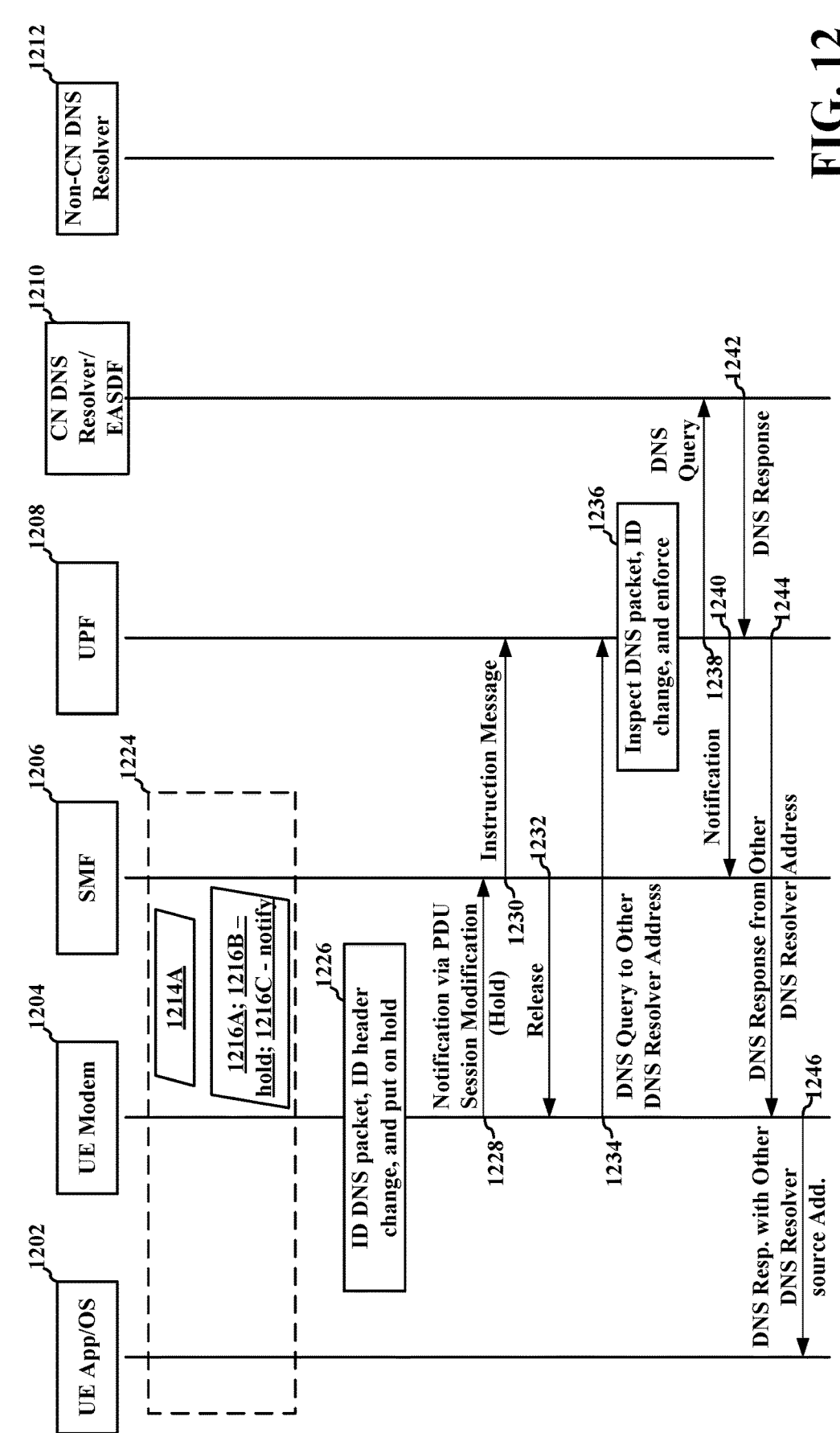
FIG. 12 is a call flow diagram illustrating a UE modem configured to notify the SMF of a detected change to a DNS resolver address and put the associated DNS query on hold.

FIG. 12 is a diagram 1200 illustrating a call flow associated with a UE modem 1204 configured to notify the SMF 1206 of a detected change to a DNS resolver address and put the associated DNS query on hold. Diagram 1200 illustrates a set of elements in communication with each other including a UE application/OS 1202, a UE modem 1204, an SMF 1206, a UPF 1208, a CN DNS resolver/EASDF 1210, and a non-CN DNS resolver 1212. Diagram 1200 also illustrates that a user plane function (UPF) 1208 may be configured to enforce a DNS configuration (e.g., CN DNS network address 1216A). Diagram 1200 illustrates a set of communications related to a DNS capability indication, a DNS settings message, and a related DNS query 1224 (as described in relation to the set of communications 724 of FIG. 7). Diagram 1200 indicates that the UE modem 1204 may transmit a capability indication 1214A that indicates that the UE (e.g., the UE modem 1204) is capable of detecting that an address in a DNS query is different from a DNS address indicated by the SMF 1206. Diagram 1200 further indicates that the SMF 1206 may transmit to the UE modem 1204, (1) a CN DNS network address 1216A associated with CN DNS resolver/EASDF 1210, (2) an indication, e.g., at 1216B, for the UE modem 1204 to hold a DNS request for which the UE modem 1204 detects a DNS address in a DNS query from the UE application such as 1202 that is not the indicated CN DNS resolver network address 1216A, and (3) a notification setting 1216C for the UE modem 1204 to notify the SMF 1206 on detection and blocking of a DNS query from the UE application, e.g., 1202, with a DNS address that is not the indicated CN DNS resolver network address 1216A.

Based on a DNS query (e.g., query 722) with a DNS resolver address that is not the CN DNS resolver network address 1216A, the UE modem 1204 may identify 1226 that a transmission from the UE application, e.g., 1202, is a DNS query and that the destination network (e.g., IP) address of the DNS query is not the CN DNS network address 1216A. The identification that the transmission from the UE application (e.g., 1202) is a DNS query may be based on the content of the transmission, a destination network address, and/or a port number (e.g., 53/853) in a header of the DNS query that is associated with a DNS operation, e.g., of a non-encrypted DNS query. In some aspects, the transmission from the UE application, e.g., 1202, may be determined to be a DNS query based on a known destination address or destination port in a header of the transmission (e.g., packet).

The UE modem 1204 may also hold (e.g. put a hold on) 1226 the DNS query with the destination address that is not the CN DNS network address 1216A. The UE modem 1204 may transmit, based on the indication, e.g., 1216C, a notification 1228 to the SMF 1206. The SMF 1206 may receive the notification 1228. The notification 1228 may include an indication of one or more of a PDU session identifier, a destination IP address (associated with the FQDN), the destination network (e.g., IP) address of the held DNS query (e.g., query 722 of FIG. 7), an application identifier, an FQDN associated with the DNS query, and/or other addresses or information in an n-tuple (e.g., a 5-tuple including a source IP address, source port, destination IP address, destination port, and transport protocol) in a header of the held DNS query. The notification 1228 may also include an indication that the DNS query is on hold.

The SMF 1206 may transmit, and UPF 1208 may receive, an instruction message 1230 (e.g., via an N4 session establishment request message or an N4 session modification request message). The instruction message 1230 may include an indication of one or more of a PDU session identifier, a destination IP address (associated with the FQDN), the destination network (e.g., IP) address of the held DNS query (e.g., query 722 of FIG. 7), an application identifier, an FQDN associated with the DNS query, and/or other addresses or information in an n-tuple (e.g., a 5-tuple including a source IP address, source port, destination IP address, destination port, and/or transport protocol) in a header of the held DNS query. The instruction message 1230 may also include (1) the CN DNS resolver/EASDF network address (e.g., 1216A), (2) an instruction to redirect DNS queries to CN DNS resolver/EASDF network address (e.g., 1216A), and/or (3) an instruction to notify the SMF 1206 of any detected and redirected DNS queries and the action taken (e.g., redirection).

The SMF 1206 may transmit, and UE modem 1204 may receive, a DNS query release 1232. Based on the DNS query release 1232, the UE modem 1204 may transmit the held DNS query 1234. The DNS query 1234 may be received by the UPF 1208 and the UPF 1208 may identify 1236 that a transmission from the UE modem 1204 is a DNS query and that the destination network (e.g., IP) address of the DNS query is not the CN DNS network address 1216A. The identification that the transmission from the UE modem 1204 is a DNS query may be based on the content of the transmission, a destination network address, and/or a port number (e.g., 53/853) in a header of the DNS query that is associated with a DNS operation, e.g., of a non-encrypted DNS query. In some aspects, the transmission from the UE modem 1204 may be determined to be a DNS query based on a known destination address or destination port in a header of the transmission (e.g., packet).

The UPF 1208 may also redirect (e.g., change a destination address) 1236 the DNS query with the destination address that is not the CN DNS network address 1216A to the CN DNS network address 1216A. The UPF 1208 may transmit a DNS query 1238 to the CN DNS resolver, e.g., 1210, based on the replaced destination network address of the query. The UPF 1208 may also transmit, and SMF 1206 may receive, a notification 1240 that the DNS query 1234 was detected and that the DNS query 1234 was redirected in DNS query 1238. The notification may include an indication of one or more of a PDU session identifier, a destination IP address (associated with the FQDN), the destination network (e.g., IP) address of the redirected DNS query 1234, an application identifier, an FQDN associated with the DNS query, and/or other addresses or information in an n-tuple (e.g., a 5-tuple including a source IP address, source port, destination IP address, destination port, and/or transport protocol) in a header of the redirected DNS query. The notification 1240 may also include an indication that the DNS query was redirected (e.g., that a DNS configuration was enforced).

The CN DNS resolver, e.g., 1210, may receive the query 1234 and may transmit a DNS response 1242 (e.g., with an IP address corresponding to a FQDN included the in the DNS query 1238). The UPF 1208 may receive the DNS response 1242 and may replace the source address (e.g., the CN DNS network address 1216A) of the received DNS response 1242 with the destination address of DNS query 1234 that is not the CN DNS network address 1216A. The UPF 1208 may transmit the modified DNS Response 1244 to the UE modem 1204. The UE modem 1204 may receive the modified DNS Response 1244 and transmit the modified DNS Response 1246 to the UE application or OS 1202 (e.g., provide the UE OS, e.g., 1202, with the information in the DNS response 1244). The source address may be replaced to match an expectation of the UE application or OS 1202 for the response to come from the original destination (e.g., to make the DNS enforcement transparent to the UE application or OS 1202).

Figure 13:
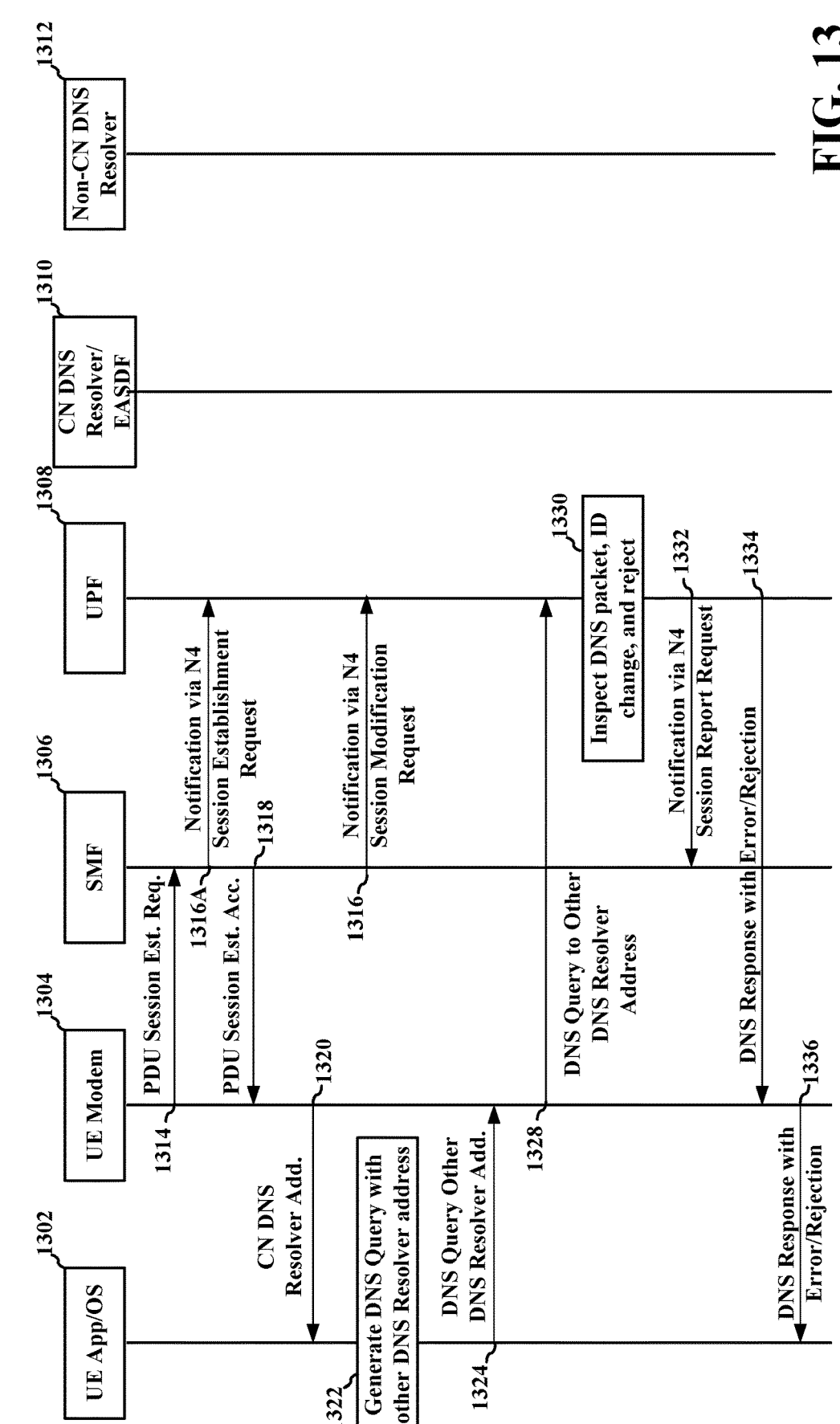
FIG. 13 is a call flow diagram illustrating a User Plane Function (UPF) configured to notify the SMF of a detected change to a DNS resolver address and reject the associated DNS query.

FIG. 13 is a diagram 1300 illustrating a call flow associated with a UPF 1308 configured to notify the SMF 1306 of a detected change to a DNS resolver address and reject the associated DNS query. Diagram 1300 illustrates a set of elements in communication with each other including a UE application/OS 1302, a UE modem 1304, an SMF 1306, a UPF 1308, a CN DNS resolver/EASDF 1310, and a non-CN DNS resolver 1312. The UE modem 1304 may transmit a PDU session establishment message 1314 including an indication of a DNS monitoring capability and/or a DNS enforcement capability. The indication, e.g., in message 1314, may be transmitted in the PDU session establishment request message via PCO.

The SMF 1306 may receive the indication, e.g., message 1314, and, based on the indicated DNS monitoring capability and/or the indicated DNS enforcement capability, may transmit DNS settings of an N4 session establishment request message, e.g., at 1316A, or an N4 session modification request message, e.g., at 1316, to a UPF 1308. The DNS settings transmitted in N4 session modification request message, e.g., 1316 or 1316A, may indicate (1) a PDU session ID, (2) a CN DNS network address associated with CN DNS resolver/EASDF 1310, (3) an indication for the UPF 1308 to reject (and send a DNS reply for) a DNS request for which the UPF 1308 detects a DNS address in a DNS query from the UE application/OS 1302 and/or the UE modem 1304 that is not the indicated CN DNS resolver network address for the CN DNS resolver/EASDF 1310, and/or (4) a notification setting for the UPF 1308 to notify the SMF 1306 on detection and rejection of a DNS query from the UE application/OS 1302 and/or the UE modem 1304 with a DNS address that is not the indicated CN DNS resolver network address. The SMF 1306 may transmit a PDU session establishment accept message 1318 including DNS settings that may be transmitted via PCO of the PDU session establishment accept message 1318. The DNS settings transmitted in PDU session establishment accept message 1318 may indicate a CN DNS resolver network address for the CN DNS resolver/EASDF 1310.

The UE modem 1304 may transmit the CN DNS resolver network address 1320 to the UE application/OS 1302. The UE application/OS 1302 may generate 1322 a DNS query with a DNS resolver address that is not the CN DNS resolver network address of the CN DNS resolver/EASDF 1310. The UE application/OS 1302 may then transmit a DNS query 1324 with a DNS resolver address that is not the CN DNS resolver network address of the CN DNS resolver/EASDF 1310 to the UE modem 1304. The DNS resolver address may be associated with a DNS resolver address for non-CN resolver 1312 that is not associated with the CN or with an edge appliance providing edge services for the CN.

UE application/OS 1302 may transmit, and UE modem 1304 may receive, the DNS query 1324 with the DNS resolver address for non-CN DNS resolver 1312. The UE modem 1304 may transmit the DNS query 1324 as DNS query 1328 towards the non-CN DNS resolver 1312 via UPF 1308. The UPF 1308 may receive the DNS query 1328 and may identify 1330 that the DNS query 1328 is a DNS query and that the destination network (e.g., IP) address of the DNS query is not the CN DNS network address of the CN DNS resolver/EASDF 1310. The identification that the DNS query 1328 is a DNS query may be based on the content of the transmission, a destination network address, and/or a port number (e.g., 53/853) in a header of the DNS query 1328 that is associated with a DNS operation, e.g., for a non-encrypted DNS query. In some aspects, the DNS query 1328 may be determined to be a DNS query even if the transmission is encrypted based on the destination address or destination port in a header of the transmission (e.g., packet).

The UPF 1308 may also reject 1330 the DNS query 1328. The UPF 1308 may transmit, based on the action and notification indication received from SMF 1306, a notification 1332 (e.g., an N4 session report request message) to the SMF 1306. The SMF 1306 may receive the notification 1332. The notification 1332 may include an indication of one or more of a PDU session identifier, a destination IP address (associated with the FQDN), the destination network (e.g., IP) address of the rejected DNS query 1328, an application identifier, an FQDN associated with the DNS query, and/or other addresses or information in an n-tuple (e.g., a 5-tuple including a source IP address, source port, destination IP address, destination port, and transport protocol) in a header of the rejected DNS query 1328. The notification 1332 may also include an indication that the DNS query was rejected. The UPF 1308 may also transmit a DNS query response 1334 of the rejection of the DNS query 1328 to the UE application/OS 1302 (e.g., provided as message 1336 via UE modem 1304).

Figure 14:
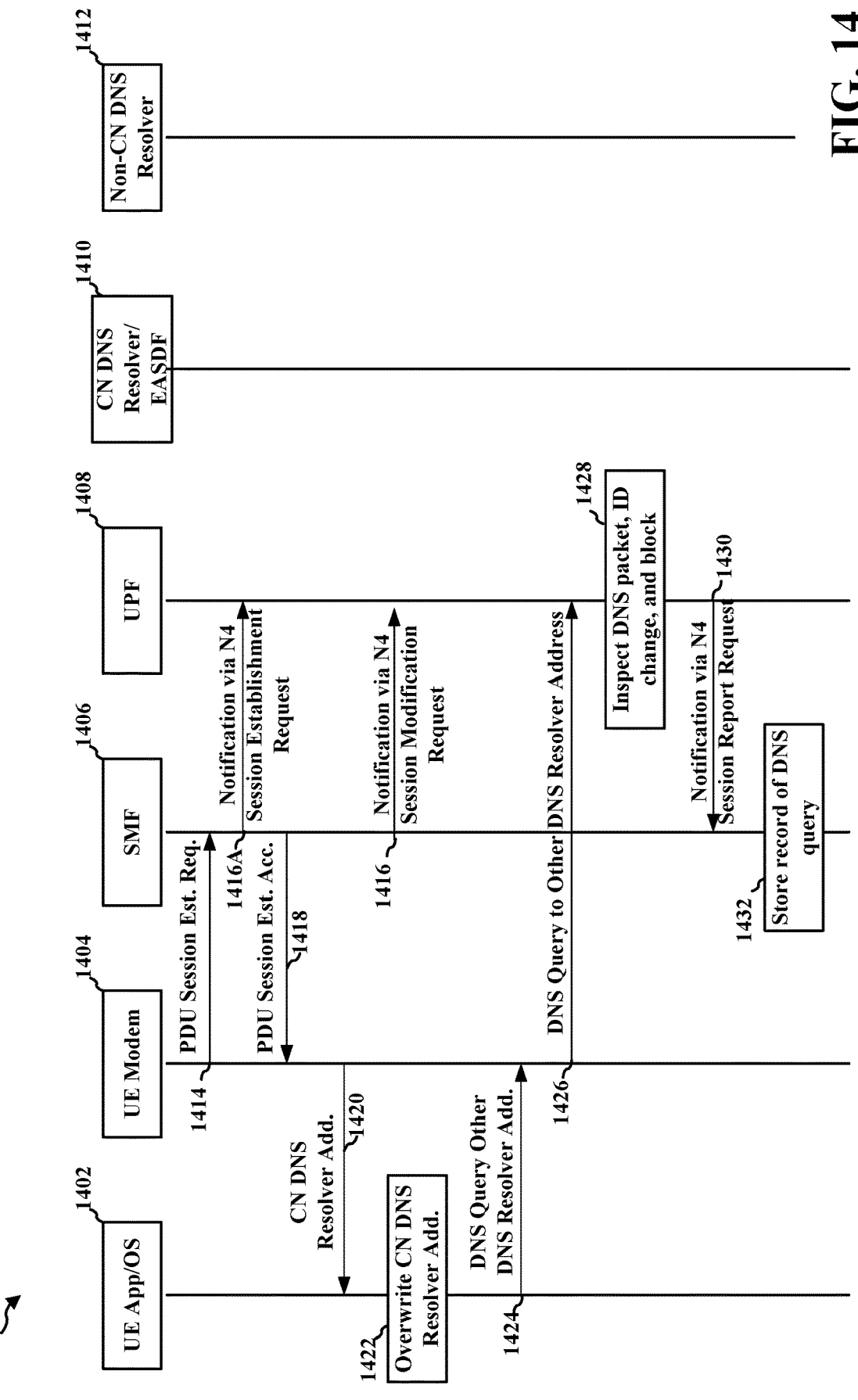
FIG. 14 is a call flow diagram illustrating a UPF configured to notify the SMF of a detected change to a DNS resolver address and block the associated DNS query.

FIG. 14 is a diagram 1400 illustrating a call flow associated with a UPF 1408 configured to notify the SMF 1406 of a detected change to a DNS resolver address and block the associated DNS query. Diagram 1400 illustrates a set of elements in communication with each other including a UE application/OS 1402, a UE modem 1404, an SMF 1406, a UPF 1408, a CN DNS resolver/EASDF 1410, and a non-CN DNS resolver 1412. The UE modem 1404 may transmit a PDU session establishment message 1414 including an indication of a DNS monitoring capability and/or a DNS enforcement capability. The indication, e.g., 1414, may be transmitted in the PDU session establishment request message via PCO.

The SMF 1406 may receive the indication, e.g., 1414, and, based on the indicated DNS monitoring capability and/or the indicated DNS enforcement capability, may transmit DNS settings via an N4 session establishment request message, e.g., at 1416A, or an N4 session modification request message, e.g., at 1416, to a UPF 1408. The DNS settings transmitted in the N4 session establishment request message, e.g., at 1416A, or the N4 session modification request message, e.g., at 1416, may indicate (1) a PDU session ID, (2) a CN DNS network address associated with CN DNS resolver/EASDF 1410, (3) an indication for the UPF 1408 to block a DNS request for which the UPF 1408 detects a DNS address in a DNS query from the UE application/OS 1402 and/or the UE modem 1404 that is not the indicated CN DNS resolver network address for the CN DNS resolver/EASDF 1410, and/or (4) a notification setting for the UPF 1408 to notify the SMF 1406 on detection and blocking of a DNS query from the UE application/OS 1402 and/or the UE modem 1404 with a DNS address that is not the indicated CN DNS resolver network address. The SMF 1406 may transmit a PDU session establishment accept message 1418 including DNS settings that may be transmitted via PCO of the PDU session establishment accept message 1418. The DNS settings transmitted in PDU session establishment accept message 1418 may indicate a CN DNS resolver network address for the CN DNS resolver/EASDF 1410.

The UE modem 1404 may transmit the CN DNS resolver network address 1420 to the UE application/OS 1402. The UE application/OS 1402 may generate 1422 a DNS query with a DNS resolver address that is not the CN DNS resolver network address of the CN DNS resolver/EASDF 1410. The UE application/OS 1402 may then transmit a DNS query 1424 with a DNS resolver address that is not the CN DNS resolver network address of the CN DNS resolver/EASDF 1410 to the UE modem 1404. The DNS resolver address may be associated with a DNS resolver address for non-CN resolver 1412 that is not associated with the CN or with an edge appliance providing edge services for the CN.

UE application/OS 1402 may transmit, and UE modem 1404 may receive, the DNS query 1424 with the DNS resolver address for DNS resolver 1412. The UE modem 1404 may transmit the DNS query 1424 as DNS query 1426 towards the DNS resolver 1412 via UPF 1408. The UPF 1408 may receive the DNS query 1426 and may identify 1428 that the DNS query 1426 is a DNS query and that the destination network (e.g., IP) address of the DNS query is not the CN DNS network address of the CN DNS resolver/EASDF 1410. The identification 1428 that the DNS query 1426 is a DNS query may be based on the content of the transmission, a destination network address, and/or a port number (e.g., 53/853) in a header of the DNS query 1426 that is associated with a DNS operation, e.g., for a non-encrypted DNS query. In some aspects, the DNS query 1426 may be determined to be a DNS query even if the transmission is encrypted based on the destination address or destination port in a header of the transmission (e.g., packet).

The UPF 1408 may also block the DNS query 1426, e.g., at 1428 based on the identification. The UPF 1408 may transmit, based on the action and notification indication received from SMF 1406, a notification 1430 (e.g., an N4 session report request message) to the SMF 1406. The SMF 1406 may receive the notification 1430. The notification 1430 may include an indication of one or more of a PDU session identifier, a destination IP address (associated with the FQDN), the destination network (e.g., IP) address of the blocked DNS query 1426, an application identifier, an FQDN associated with the DNS query, and/or other addresses or information in an n-tuple (e.g., a 5-tuple including a source IP address, source port, destination IP address, destination port, and/or transport protocol), in particular in a header of the blocked DNS query 1426. The notification 1430 may also include an indication that the DNS query was blocked. The SMF 1406 may store 1432 a record of the attempt by the UE to use the non-CN DNS resolver address.

Figure 15:
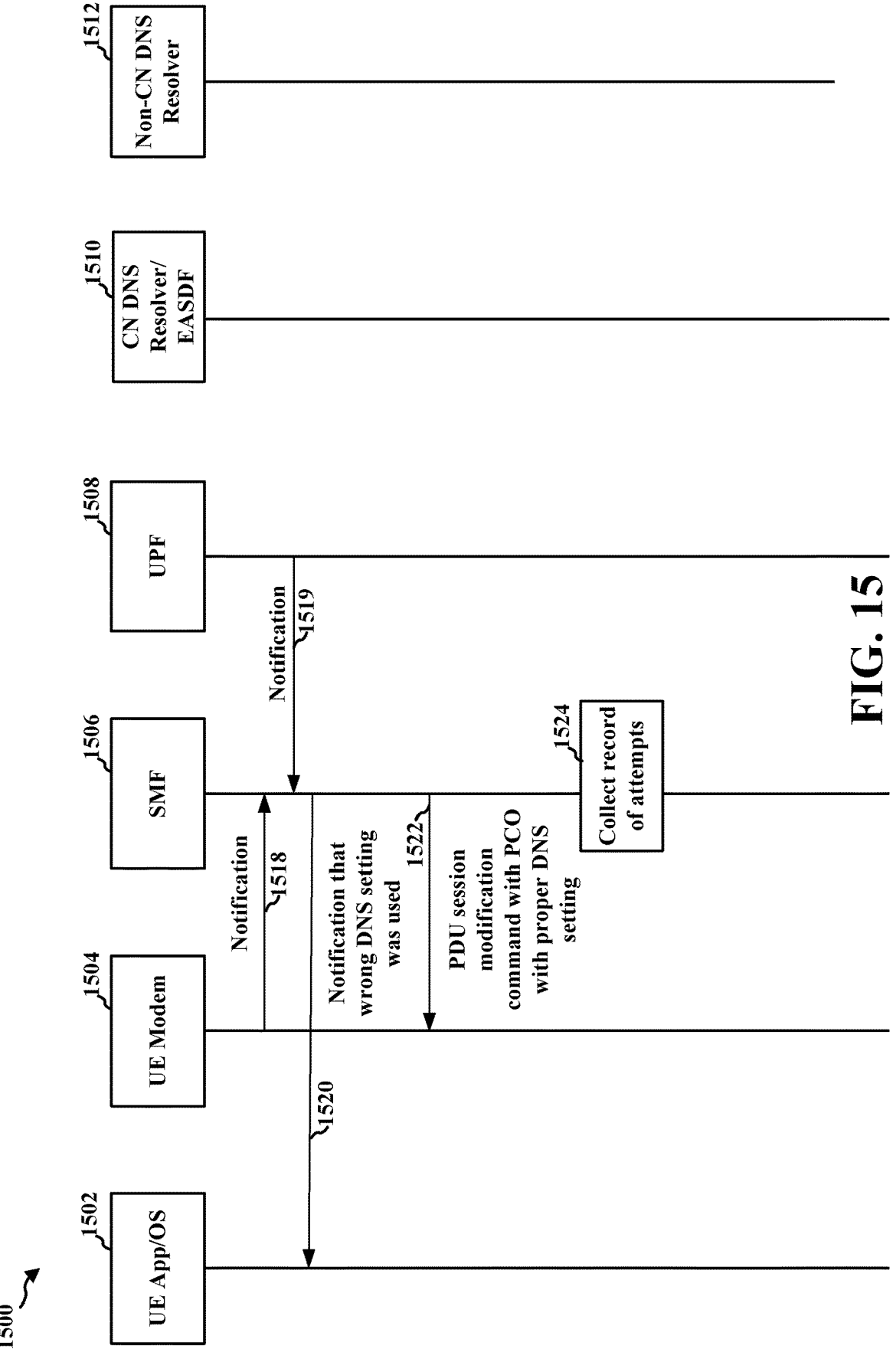
FIG. 15 is a call flow diagram illustrating example aspects of an SMF reaction to a notification about an DNS query.

In FIGS. 8-14, an SMF (e.g., the SMF 806, 906, 1006, 1106, 1206, 1306, and 1406) may be configured to take different actions upon receiving a notification 1518 or 1519 (or multiple notifications) from the UE Modem 1504 or the UPF 1508 regarding a DNS query with a non-CN DNS resolver address (e.g., the address of non-CN DNS resolver 1512 rather than the CN DNS resolver/EASDF 1510) (e.g., which may correspond to any of notifications such as 834, 930, 1028, 1136, 1238, 1332, and 1430). FIG. 15 illustrates an example communication flow 1500 showing examples of various actions that the SMF 1506 may take based on a UE initiating a DNS query using different DNS settings than those provided to the UE by the network. As illustrated at 1520, the SMF 1506 may send a notification 1520, such as an SMS message to the UE (e.g., UE application or OS 1502 or the UE modem 1504) indicating that the UE attempted to use an incorrect DNS setting for a DNS query. The notification 1520 may indicate for the UE to correct the DNS settings for the DNS query, e.g., to change the DNS setting to the DNS setting provided by the network. The SMF may be configured to resend DNS settings to the UE in response to receiving a notification from the UPF and/or the UE. The SMF may be configured to send a notification (e.g., a short messaging service (SMS)) to a UE indicating that the DNS setting (e.g., the DNS address) was incorrect. In some aspects, the SMF 1506 may be configured to send a PDU session modification command 1522 to the UE (e.g., UE modem 1504) with PCO (or ePCO) having the DNS address configured for the CN DNS resolver. In some aspects, the SMF may be configured to collect a record, at 1524, of the attempt(s) to use the DNS address of a non-CN DNS resolver. For example, an SMS notification may be sent to a user of the UE that made the reported DNS query indicating that the recently used DNS settings were "incorrect" (e.g., not using the CN DNS resolver associated with an edge application server/service) and for the user to fix the DNS settings. In some aspects, the records may be collected to identify an application or UE that attempts to use a non-CN DNS resolver address a threshold number of times and take an appropriate action (e.g., block future DNS queries from a particular application or UE, redirect future messages to a malware detection application, etc.).

The SMF may combine instructions to the UE and the UPF in some aspects.

Although FIGS. 7-14 illustrate various examples showing the UE providing an indication of a capability regarding detection and/or direction of a DNS query that is provided in a PDU session establishment request message, the indication may similarly be included in a PDU session modification request, e.g., as described in connection with 1604 and 1704.

Figure 16:
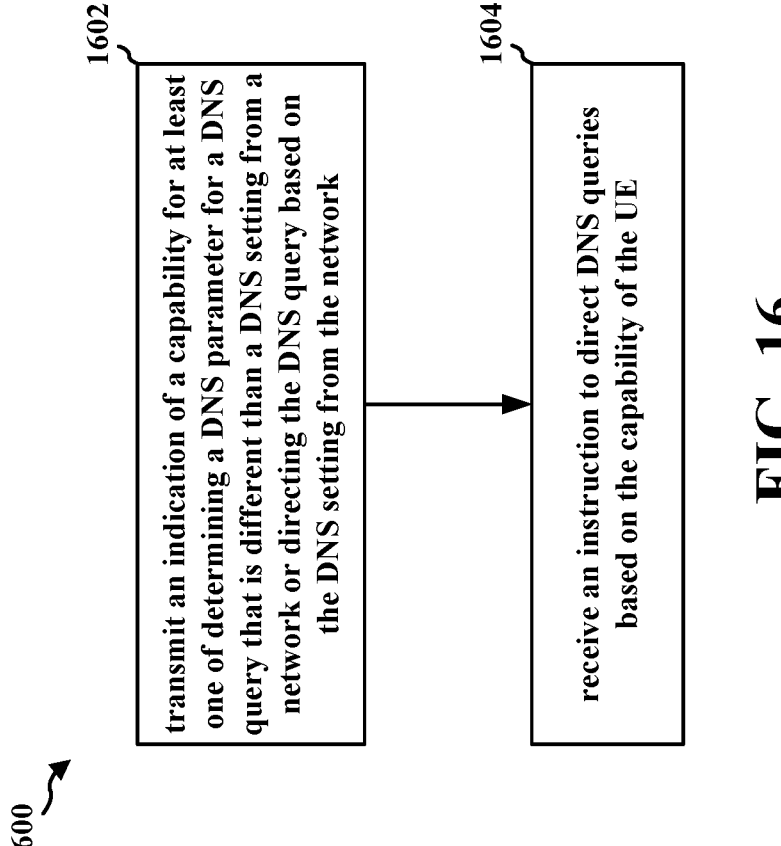
FIG. 16 is a flowchart of a method of wireless communication at a UE.

FIG. 16 is a flowchart 1600 of a method of wireless communication. The method may be performed by a UE (e.g., UE 104; UE components 702/704, 802/804, 902/904, 1002/1004, 1102/1104, 1202/1204, 1302/1304, 1402/1404). At 1602, the UE may transmit, to a network (e.g., an SMF of the network), an indication of a capability for at least one of (1) determining, detecting, or monitoring for, a DNS parameter for a DNS query that is different than a DNS setting from a network or (2) directing the DNS query based on the DNS setting from the network. Directing or redirecting, as used herein, refers to enforcing a DNS setting from the network. The UE may transmit the indication via a PCO of a PDU session establishment message. For example, referring to FIGS. 7-14, the UE (e.g., the UE modem 704, 804, 904, 1004, 1104, 1204, 1304, and 1404) may transmit a PDU session establishment request message (e.g., message 714, 1314, or 1414) including a capability indication (e.g., indication 714A/714B, 814A, 914A, 1014A, 1114A/1114B, and 1214A) for at least one of (1) determining, detecting, or monitoring for, a DNS parameter for a DNS query that is different than a DNS setting from a network and (2) redirecting the DNS query, which may be referred to as DNS setting enforcement, based on the DNS setting from the network. For example, 1602 may be performed by DNS capability indication component 2340.

At 1604, the UE may receive an instruction to direct DNS queries based on the indicated capability of the UE. After receiving the instruction, the UE may direct DNS queries according to the instructions from the network. In some aspects, the UE may monitor DNS queries to check or look for, or attempt to detect, DNS queries having different DNS settings than the settings provided by the network. The instruction may include one or more of an action setting or a notification setting based on a determination, e.g., a detection, of the DNS parameter for the DNS query that is different than the DNS setting from the network. The action setting may indicate an action for the UE to take when the UE determines, e.g., detects, based on the monitoring, a DNS query having different DNS settings than those provided by the network. The UE may receive the instruction, at 1604, in a PDU session establishment accept message or a PDU session modification command message. In some aspects, the instruction may include an action setting that indicates for the UE to do one or more of: (1) monitor DNS queries to attempt determine or detect different DNS parameters from the DNS setting from the network, (2) hold the DNS query having the DNS parameter that is different than the DNS setting from the network, (3) redirect the DNS query, e.g., enforce DNS settings, to an EASDF/MNO's DNS resolver based on the DNS setting from the network, (4) block the DNS query having the DNS parameter that is different than the DNS setting from the network (e.g. without a reply message or notification to the application/OS that initiated the DNS query), or (5) reject the DNS query having the DNS parameter that is different than the DNS setting from the network (e.g., with transmission of a rejection message or other notification to the application/OS that initiated the DNS query). For example, referring to FIGS. 7-14, the UE (e.g., the UE modem 704, 804, 904, 1004, 1104, 1204, 1304, and 1404) may receive an action instruction (e.g., action setting 716B, 816B, 916B, 1016B, 1116B, and 1216B) from a network (e.g., the SMF 706, 806, 906, 1006, 1106, 1206, 1306, and 1406). The action instruction (e.g., action setting 716B, 816B, 916B, 1016B, 1116B, and 1216B) may include an instruction to: (1) monitor to determine or detect different DNS parameters from the DNS setting from the network (e.g., 716B, 816B, 916B, 1016B, 1116B, and 1216B), (2) hold the DNS query having the DNS parameter that is different than the DNS setting from the network (e.g., 1216B), (3) redirect the DNS query to an EASDF/MNO's DNS resolver based on the DNS setting from the network (e.g., 1116B), (4) block the DNS query having the DNS parameter that is different than the DNS setting from the network (e.g., without a reply) (e.g., 1016B), or (5) reject the DNS query having the DNS parameter that is different than the DNS setting from the network (e.g., with a reply) (e.g., 916B).

In some aspects, the instruction may also include a notification setting that includes at least one of: (1) skipping transmission of a notification to the network, (2) notifying the network, with an indication that no corrective action was specified, of the DNS query having the DNS parameter that is different than the DNS setting from the network, (3) notifying the network that the DNS query having the DNS parameter that is different than the DNS setting from the network is put on hold, (4) notifying the network after a successful redirection of the DNS query having the DNS parameter that is different than the DNS setting from the network, (5) notifying the network after a failed redirection of the DNS query having the DNS parameter that is different than the DNS setting from the network, (6) notifying the network after blocking the DNS query having the DNS parameter that is different than the DNS setting from the network, (7) notifying the network after rejecting the DNS query having the DNS parameter that is different than the DNS setting from the network, or (8) notifying the network of the DNS query having the DNS parameter that is different than the DNS setting from the network and the corrective action taken by the UE.

For example, referring to FIGS. 7-14, the UE (e.g., the UE modem 704, 804, 904, 1004, 1104, 1204, 1304, and 1404) may receive a notification setting (e.g., notification setting 716C, 816C, 916C, 1016C, 1116C, and 1216C) from a network (e.g., the SMF 706, 806, 906, 1006, 1106, 1206, 1306, and 1406). The notification setting (e.g., notification setting 716C, 816C, 916C, 1016C, 1116C, and 1216C) may include an instruction to: (1) skip transmission of a notification to the network, (2) notify the network, without a corrective action, of the DNS query having the DNS parameter that is different than the DNS setting from the network (e.g., 816C), (3) notify the network after holding the DNS query having the DNS parameter that is different than the DNS setting from the network (e.g., 1216C), (4) notify the network after a successful redirection of the DNS query having the DNS parameter that is different than the DNS setting from the network (e.g., 1116C), (5) notify the network after a failed redirection of the DNS query having the DNS parameter that is different than the DNS setting from the network, (6) notify the network after blocking the DNS query having the DNS parameter that is different than the DNS setting from the network (e.g., 1016C), (7) notify the network after rejecting the DNS query having the DNS parameter that is different than the DNS setting from the network (e.g., 916C), or (8) notify the network of the DNS query having the DNS parameter that is different than the DNS setting from the network and the corrective action taken by the UE (e.g., 916C, 1016C, 1116C, 1216C). For example, 1604 may be performed by DNS change detection component 2342, e.g., as described in connection with FIG. 23.

FIG. 17 is a flowchart 1700 of a method of wireless communication. The method may be performed by a UE (e.g., UE 104; UE components 702/704, 802/804, 902/904, 1002/1004, 1102/1104, 1202/1204, 1302/1304, 1402/1404). At 1702, the UE may transmit, to a network (e.g., an SMF of the network) an indication of a capability for at least one of (1) determining, detecting, or monitoring for, a DNS parameter for a DNS query that is different than a DNS setting from a network or (2) directing the DNS query based on the DNS setting from the network. Redirecting, as used herein, refers to enforcing a DNS setting from the network. The UE may transmit the indication via a PCO of a PDU session establishment message. For example, referring to FIGS. 7-14, the UE (e.g., the UE modem 704, 804, 904, 1004, 1104, 1204, 1304, and 1404) may transmit a PDU session establishment request message (e.g., message 714, 1314, or 1414) including a capability indication (e.g., indication 714A/714B, 814A, 914A, 1014A, 1114A/1114B, and 1214A) for at least one of (1) determining, e.g., detecting, a DNS parameter for a DNS query that is different than a DNS setting from a network (e.g., different from a DNS setting from the network) and (2) redirecting the DNS query based on the DNS setting from the network. For example, 1702 may be performed by DNS capability indication component 2340 in FIG. 23.

At 1704, the UE may receive an instruction to direct DNS queries based on the indicated capability of the UE. The instruction may include one or more of an action setting or a notification setting based on a determination, e.g., a detection, of the DNS parameter for the DNS query that is different than the DNS setting from the network. The UE may receive the instruction, at 1704, in a PDU session establishment accept message or a PDU session modification command message. In some aspects, the instruction includes an action setting that indicates for the UE to do one or more of: (1) monitor DNS queries to attempt to determine, e.g., detect, different DNS parameters from the DNS setting from the network, (2) hold the DNS query that is determined, e.g., detected, as having the DNS parameter that is different than the DNS setting from the network, (3) redirect the DNS query to an EASDF/MNO's DNS resolver based on the DNS setting from the network (e.g., which may be referred to as DNS setting enforcement), (4) block the DNS query having the DNS parameter that is different than the DNS setting from the network (e.g. without a reply message or notification to the application/OS that initiated the DNS query), and/or (5) reject the DNS query having the DNS parameter that is different than the DNS setting from the network (e.g., with transmission of a rejection message or other notification to the application/OS that initiated the DNS query). For example, referring to FIGS. 7-14, the UE (e.g., the UE modem 704, 804, 904, 1004, 1104, 1204, 1304, and 1404) may receive an action instruction (e.g., action setting 716B, 816B, 916B, 1016B, 1116B, and 1216B) from a network (e.g., the SMF 706, 806, 906, 1006, 1106, 1206, 1306, and 1406). The action instruction (e.g., action setting 716B, 816B, 916B, 1016B, 1116B, and 1216B) may include an instruction to: (1) monitor to detect different DNS parameters from the DNS setting from the network (e.g., 716B, 816B, 916B, 1016B, 1116B, and 1216B), (2) hold the DNS query having the DNS parameter that is different than the DNS setting from the network (e.g., 1216B), (3) redirect the DNS query to an EASDF based on the DNS setting from the network (e.g., 1116B), (4) block the DNS query having the DNS parameter that is different than the DNS setting from the network (e.g., 1016B), or (5) reject the DNS query having the DNS parameter that is different than the DNS setting from the network (e.g., 916B).

In some aspects, the instruction may also include a notification setting that includes at least one of: (1) skipping transmission of a notification to the network, (2) notifying the network, with an indication that no corrective action was specified, of the DNS query having the DNS parameter that is different than the DNS setting from the network, (3) notifying the network that the DNS query having the DNS parameter that is different than the DNS setting from the network is put on hold, (4) notifying the network after a successful redirection of the DNS query having the DNS parameter that is different than the DNS setting from the network, (5) notifying the network after a failed redirection of the DNS query having the DNS parameter that is different than the DNS setting from the network, (6) notifying the network after blocking the DNS query having the DNS parameter that is different than the DNS setting from the network, (7) notifying the network after rejecting the DNS query having the DNS parameter that is different than the DNS setting from the network, and/or (8) notifying the network of the DNS query having the DNS parameter that is different than the DNS setting from the network and the corrective action taken by the UE.

For example, referring to FIGS. 7-14, the UE (e.g., the UE modem 704, 804, 904, 1004, 1104, 1204, 1304, and 1404) may receive a notification setting (e.g., notification setting 716C, 816C, 916C, 1016C, 1116C, and 1216C) from a network (e.g., the SMF 706, 806, 906, 1006, 1106, 1206, 1306, and 1406). The notification setting (e.g., notification setting 716C, 816C, 916C, 1016C, 1116C, and 1216C) may include an instruction to: (1) skip transmission of a notification to the network, (2) notify the network, without a corrective action, of the DNS query having the DNS parameter that is different than the DNS setting from the network (e.g., 816C), (3) notify the network after holding the DNS query having the DNS parameter that is different than the DNS setting from the network (e.g., 1216C), (4) notify the network after a successful redirection of the DNS query having the DNS parameter that is different than the DNS setting from the network (e.g., 1116C), (5) notify the network after a failed redirection of the DNS query having the DNS parameter that is different than the DNS setting from the network (e.g., 1016C), (6) notify the network after blocking the DNS query having the DNS parameter that is different than the DNS setting from the network (e.g., 1016C), (7) notify the network after rejecting the DNS query having the DNS parameter that is different than the DNS setting from the network (e.g., 916C), or (8) notify the network of the DNS query having the DNS parameter that is different than the DNS setting from the network and the corrective action taken by the UE (e.g., 816C, 916C, 1016C, 1116C, 1216). For example, 1704 may be performed by DNS configuration component 2342.

At 1706, the UE may determine, e.g. detect, a DNS query having the DNS parameter (e.g., a DNS network address) that is different than the DNS setting from the network (e.g., a DNS parameter that is different from the DNS setting from the network). For example, DNS query having the DNS parameter that is different than the DNS setting from the network may be detected based on the content of the DNS query, a destination network address, and/or a port number (e.g., 53/853) in a header of the DNS query that is associated with a DNS operation, e.g., for a non-encrypted DNS query. In some aspects, the DNS query from the UE may be determined to be a DNS query even if the DNS query is encrypted based on the destination address or destination port in a header of the DNS query (e.g., packet). For example, referring to FIGS. 7-12, the UE (e.g., the UE modem 704, 804, 904, 1004, 1104, and 1204) may identify (e.g., determine or detect) (e.g., 826, 926, 1026, 1126, 1226) a DNS query (e.g., DNS query 722) having the DNS parameter that is different than the DNS setting from the network. For example, 1706 may be performed by DNS detection component 2343 in FIG. 23.

At 1708, the UE may transmit a notification to the network indicating a PDU session ID and a destination IP address of the DNS query. The notification to the network may further indicate a FQDN of the DNS query, at least a portion of an n-tuple (e.g., a 5-tuple) for the DNS query, or an application identifier (ID) associated with the DNS query. The notification may be transmitted to an SMF, e.g., in a PDU session modification message. For example, referring to FIGS. 8-12, the UE (e.g., the UE modem 804, 904, 1004, 1104, and 1204) may transmit a notification (e.g., the notification 834, 930, 1028, 1136, and 1228) to the SMF that may include an indication of one or more of a PDU session identifier, a destination IP address (associated with the FQDN), the destination network (e.g., IP) address of the DNS query, an application ID, an FQDN associated with the DNS query, and/or other addresses or information in an n-tuple (e.g., a 5-tuple including a source IP address, source port, destination IP address, destination port, and/or transport protocol) in a header of the DNS response. For example, 1708 may be performed by DNS notification component 2344 in FIG. 23.

In some aspects, the UE may direct one or more DNS queries based on the instruction received from the network at 1704. As illustrated at 1709, the UE may take the action indicated by the network, e.g., holding, blocking, rejecting, and/or redirecting the DNS query that is determined, e.g., detected, at 1706, e.g., as described in connection with any of FIGS. 8-10. The UE may reject the DNS query including any of the aspects described in connection with FIG. 9. The UE may block the DNS query including any of the aspects described in connection with FIG. 10. The UE may redirect the DNS query including any of the aspects described in connection with FIG. 11. The UE may put the DNS query on hold including any of the aspects described in connection with FIG. 12. As illustrated at 1710, the UE may further receive an indication (e.g., 1232) from the network to release the DNS query, e.g., following 1709. For example, 1709 may be performed by the DNS configuration component 2342.

At 1711 the UE may receive at least one of a transmission of the DNS setting from the network or a network notification to reinstate a previously received DNS setting. The transmission may be a PDU session modification message. For example, referring to FIGS. 8-11, the UE (e.g., the UE modem 804, 904, 1004, 1104, and 1204) may receive a notification (e.g., the notification, such as 836, 932, 1030, and 1138) including one of a transmission of the DNS setting from the network or a network notification to reinstate a previously received DNS setting (e.g., 816A, 916A, 1016A, and 1116A) from an SMF (e.g., the SMF 806, 906, 1006, 1106). For example, 1711 may be performed by DNS configuration component 2342.

Figure 18:
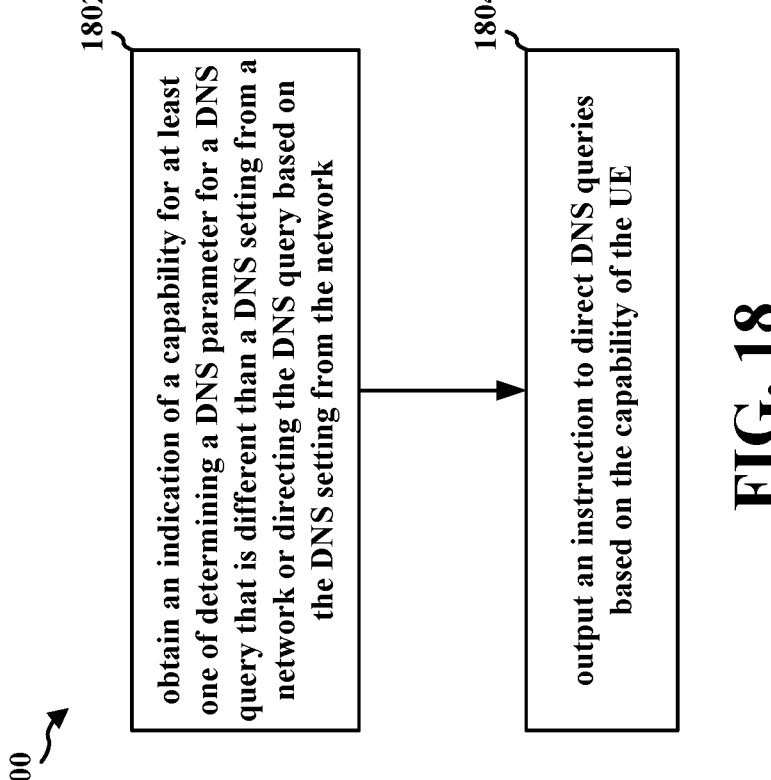
FIG. 18 is a flowchart of a method of wireless communication at a network entity, such as an SMF.

FIG. 18 is a flowchart 1800 of an example method of wireless communication. The method may be performed by a network entity of a core network (e.g., SMF 194; the SMF 706, 806, 906, 1006, 1106, 1206, 1306, and 1406). At 1802, the SMF may obtain (e.g., receive), from a UE, an indication of a capability for at least one of (1) determining, detecting, or monitor for, a DNS parameter for a DNS query that is different than a DNS setting from a network and (2) directing the DNS query, e.g., DNS setting enforcement, based on the DNS setting from the network. The SMF may receive the indication via a PCO of a PDU session establishment message. For example, referring to FIGS. 7-14, the SMF (e.g., the SMF 706, 806, 906, 1006, 1106, 1206, 1306, and 1406) may receive a PDU session establishment request message (e.g., message 714, 1314, or 1414) including a capability indication (e.g., indication 714A/714B, 814A, 914A, 1014A, 1114A/1114B, and 1214A) for at least one of (1) determining or detecting a DNS parameter for a DNS query that is different than a DNS setting from a network or (2) redirecting the DNS query based on the DNS setting from the network. For example, 1802 may be performed by DNS setting component 2440.

At 1804, the SMF may output (e.g., transmit) an instruction to direct DNS queries based on the indicated capability of the UE to attempt to determine, e.g., detect, a DNS query having a different DNS setting than those provided by the network. The instruction may include one or more of an action setting or a notification setting based on a determination, e.g., a detection, of the DNS parameter for the DNS query that is different than the DNS setting from the network. For example, the action setting may indicate an action for a UE to take if the UE determines, e.g., detects, a DNS query having different DNS settings while monitoring the DNS queries. The SMF may transmit the instruction, at 1804, in a PDU session establishment accept message or a PDU session modification command message. In some aspects, the instruction includes an action setting that indicates for the UE to do one or more of: (1) monitor to determine, e.g., detect, different DNS parameters from the DNS setting from the network, (2) hold the DNS query having the DNS parameter that is different than the DNS setting from the network, (3) redirect the DNS query to an EASDF/MNO's DNS resolver based on the DNS setting from the network, (4) block the DNS query having the DNS parameter that is different than the DNS setting from the network (e.g. without a reply message or notification to the application/OS that initiated the DNS query), or (5) reject the DNS query having the DNS parameter that is different than the DNS setting from the network (e.g., with transmission of a rejection message or other notification to the application/OS that initiated the DNS query). For example, referring to FIGS. 7-14, the SMF (e.g., the SMF 706, 806, 906, 1006, 1106, 1206, 1306, and 1406) may transmit an action instruction (e.g., action setting 716B, 816B, 916B, 1016B, 1116B, and 1216B) to a UE (e.g., the UE modem 704, 804, 904, 1004, 1104, 1204, 1304, and 1404). The action instruction (e.g., action setting 716B, 816B, 916B, 1016B, 1116B, and 1216B) may include an instruction to: (1) monitor to detect different DNS parameters from the DNS setting from the network (e.g., 716B, 816B, 916B, 1016B, 1116B, and 1216B), (2) hold the DNS query having the DNS parameter that is different than the DNS setting from the network (e.g., 1216B), (3) redirect the DNS query to an EASDF based on the DNS setting from the network (e.g., 1116B), (4) block the DNS query having the DNS parameter that is different than the DNS setting from the network (e.g., 1016B), and/or (5) reject the DNS query having the DNS parameter that is different than the DNS setting from the network (e.g., 916B).

In some aspects, the instruction may also include a notification setting that includes at least one of: (1) skipping transmission of a notification to the network, (2) notifying the network, with an indication that no corrective action was specified, of the DNS query having the DNS parameter that is different than the DNS setting from the network, (3) notifying the network that the DNS query having the DNS parameter that is different than the DNS setting from the network is put on hold, (4) notifying the network after a successful redirection of the DNS query having the DNS parameter that is different than the DNS setting from the network, (5) notifying the network after a failed redirection of the DNS query having the DNS parameter that is different than the DNS setting from the network, (6) notifying the network after blocking the DNS query having the DNS parameter that is different than the DNS setting from the network, (7) notifying the network after rejecting the DNS query having the DNS parameter that is different than the DNS setting from the network, or (8) notifying the network of the DNS query having the DNS parameter that is different than the DNS setting from the network and the corrective action taken by the UE.

For example, referring to FIGS. 7-14, the SMF (e.g., the SMF 706, 806, 906, 1006, 1106, 1206, 1306, and 1406) may transmit a notification setting (e.g., notification setting 716C, 816C, 916C, 1016C, 1116C, and 1216C) to the UE (e.g., the UE modem 704, 804, 904, 1004, 1104, 1204, 1304, and 1404). The notification setting (e.g., notification setting 716C, 816C, 916C, 1016C, 1116C, and 1216C) may include an instruction to: (1) skip transmission of a notification to the network, (2) notify the network, without a corrective action, of the DNS query having the DNS parameter that is different than the DNS setting from the network (e.g., 816C), (3) notify the network after holding the DNS query having the DNS parameter that is different than the DNS setting from the network (e.g., 1216C), (4) notify the network after a successful redirection of the DNS query having the DNS parameter that is different than the DNS setting from the network (e.g., 1116C), (5) notify the network after a failed redirection of the DNS query having the DNS parameter that is different than the DNS setting from the network, (6) notify the network after blocking the DNS query having the DNS parameter that is different than the DNS setting from the network (e.g., 1016C), (7) notify the network after rejecting the DNS query having the DNS parameter that is different than the DNS setting from the network (e.g., 916C), and/or (8) notify the network of the DNS query having the DNS parameter that is different than the DNS setting from the network and the corrective action taken by the UE (e.g., 916C, 1016C, 1116C, 1216C). For example, 1804 may be performed by DNS setting component 2440.

FIG. 19 is a flowchart 1900 of an example method of wireless communication. The method may be performed by a network entity of a core network (e.g., SMF 194; the SMF 706, 806, 906, 1006, 1106, 1206, 1306, and 1406). At 1902, the SMF may obtain (e.g., receive), from a UE, an indication of a capability for at least one of (1) determining or detecting, or monitor for, a DNS parameter for a DNS query that is different than a DNS setting from a network (e.g., is different from a DNS setting from the network or (2) directing the DNS query based on the DNS setting from the network, which may be referred to as DNS setting enforcement. The SMF may receive the indication via a PCO of a PDU session establishment message. For example, referring to FIGS. 7-14, the SMF (e.g., the SMF 706, 806, 906, 1006, 1106, 1206, 1306, and 1406) may receive a PDU session establishment request message (e.g., message 714, 1314, or 1414) including a capability indication (e.g., indication 714A/714B, 814A, 914A, 1014A, 1114A/1114B, and 1214A) for at least one of (1) determining, e.g., detecting, a DNS parameter for a DNS query that is different than a DNS setting from a network and (2) directing, which may include redirecting, the DNS query based on the DNS setting from the network. For example, 1902 may be performed by DNS setting component 2440.

At 1904, the SMF may output (e.g., transmit) an instruction to direct DNS queries based on the indicated capability of the UE. The instruction may include one or more of an action setting or a notification setting based on a determination, e.g., a detection, of the DNS parameter for the DNS query that is different than the DNS setting from the network. The SMF may transmit the instruction, at 1904, in a PDU session establishment accept message or a PDU session modification command message. In some aspects, the instruction includes an action setting that indicates for the UE to do one or more of: (1) monitor to detect different DNS parameters from the DNS setting from the network, (2) hold the DNS query having the DNS parameter that is different than the DNS setting from the network, (3) redirect the DNS query to an EASDF/MNO's DNS resolver based on the DNS setting from the network, (4) block the DNS query having the DNS parameter that is different than the DNS setting from the network (e.g. without a reply message or notification to the application/OS that initiated the DNS query), and/or (5) reject the DNS query having the DNS parameter that is different than the DNS setting from the network (e.g., with transmission of a rejection message or other notification to the application/OS that initiated the DNS query). For example, referring to FIGS. 7-14, the SMF (e.g., the SMF 706, 806, 906, 1006, 1106, 1206, 1306, and 1406) may output (e.g., transmit) an action instruction (e.g., action setting 716B, 816B, 916B, 1016B, 1116B, and 1216B) to a UE (e.g., the UE modem 704, 804, 904, 1004, 1104, 1204, 1304, and 1404). The action instruction (e.g., action setting 716B, 816B, 916B, 1016B, 1116B, and 1216B) may include an instruction to: (1) monitor to detect different DNS parameters from the DNS setting from the network (e.g., 716B, 816B, 916B, 1016B, 1116B, and 1216B), (2) hold the DNS query having the DNS parameter that is different than the DNS setting from the network (e.g., 1216B), (3) redirect the DNS query to an EASDF based on the DNS setting from the network (e.g., 1116B), (4) block the DNS query having the DNS parameter that is different than the DNS setting from the network (e.g., 1016B), and/or (5) reject the DNS query having the DNS parameter that is different than the DNS setting from the network (e.g., 916B).

In some aspects, the instruction may also include a notification setting that includes at least one of: (1) skipping transmission of a notification to the network, (2) notifying the network, with an indication that no corrective action was specified, of the DNS query having the DNS parameter that is different than the DNS setting from the network, (3) notifying the network that the DNS query having the DNS parameter that is different than the DNS setting from the network is put on hold, (4) notifying the network after a successful redirection of the DNS query having the DNS parameter that is different than the DNS setting from the network, (5) notifying the network after a failed redirection of the DNS query having the DNS parameter that is different than the DNS setting from the network, (6) notifying the network after blocking the DNS query having the DNS parameter that is different than the DNS setting from the network, (7) notifying the network after rejecting the DNS query having the DNS parameter that is different than the DNS setting from the network, and/or (8) notifying the network of the DNS query having the DNS parameter that is different than the DNS setting from the network and the corrective action taken by the UE.

For example, referring to FIGS. 7-14, the SMF (e.g., the SMF 706, 806, 906, 1006, 1106, 1206, 1306, and 1406) may output (e.g., transmit) a notification setting (e.g., notification setting 716C, 816C, 916C, 1016C, 1116C, and 1216C) to the UE (e.g., the UE modem 704, 804, 904, 1004, 1104, 1204, 1304, and 1404). The notification setting (e.g., notification setting 716C, 816C, 916C, 1016C, 1116C, and 1216C) may include an instruction to: (1) skip transmission of a notification to the network, (2) notify the network, without a corrective action, of the DNS query having the DNS parameter that is different than the DNS setting from the network (e.g., 816C), (3) notify the network after holding the DNS query having the DNS parameter that is different than the DNS setting from the network (e.g., 1216C), (4) notify the network after a successful redirection of the DNS query having the DNS parameter that is different than the DNS setting from the network (e.g., 1116C), (5) notify the network after a failed redirection of the DNS query having the DNS parameter that is different than the DNS setting from the network, (6) notify the network after blocking the DNS query having the DNS parameter that is different than the DNS setting from the network (e.g., 1016C), (7) notify the network after rejecting the DNS query having the DNS parameter that is different than the DNS setting from the network (e.g., 916C), and/or (8) notify the network of the DNS query having the DNS parameter that is different than the DNS setting from the network and the corrective action taken by the UE (e.g., 916C, 1016C, 1116C, 1216C). For example, 1904 may be performed by DNS change detection component 2442.

At 1906, the SMF may obtain (e.g., receive) a notification from the UE indicating a PDU session ID and a destination IP address of the DNS query having the DNS parameter that is different than the DNS setting from the network. The notification may further indicate a FQDN of the DNS query, at least a portion of an n-tuple (e.g., a 5-tuple) for the DNS query, or an application identifier (ID) associated with the DNS query. For example, referring to FIGS. 8-12, the SMF (e.g., the SMF 706, 806, 906, 1006, 1106, 1206, 1306, and 1406) may receive a notification (e.g., the notification 834, 930, 1028, 1136, and 1228) from the UE (e.g., the UE modem 804, 904, 1004, 1104, and 1204) that may include an indication of one or more of a PDU session identifier, a destination IP address (associated with the FQDN), the destination network (e.g., IP) address of the DNS query, an application ID, an FQDN associated with the DNS query, and/or other addresses or information in an n-tuple (e.g., a 5-tuple including a source IP address, source port, destination IP address, destination port, and/or transport protocol) in a header of the DNS response. For example, 1906 may be performed by DNS notification component 2442. If the SMF instructs for the DNS query to be put on hold, the SMF may later transmit a release message (e.g., 1232 in FIG. 12) that the DNS can be released and transmitted to the DNS resolver, e.g., as illustrated at 1907.

At 1908, the SMF may output (e.g., transmit), in response to the notification received at 1906, at least one of a retransmission of the DNS setting or a network notification to reinstate a previously received DNS setting to at least one of the UE and a UPF. The transmission may be a PDU session modification message. For example, referring to FIGS. 8-11, the SMF (e.g., the SMF 806, 906, 1006, 1106, 1206, 1306, and 1406) may transmit a notification (e.g., the notification, such as 836, 932, 1030, and 1138) including one of a transmission of the DNS setting from the network or a network notification to reinstate a previously received DNS setting (e.g., 816A, 916A, 1016A, and 1116A) to the UE (e.g., the UE modem 804, 904, 1004, 1104, and 1204). For example, 1908 may be performed by DNS notification component 2442.

At 1910, the SMF may, in response to the notification received at 1906, store a record of attempts by the UE to use the DNS parameter that is different than the DNS setting (e.g., different from the DNS setting). The records may include the identity of the application associated with (e.g., generating) the query, the non-CN DNS resolver address, the identity of a UE associated with the reported DNS query, and may be associated with a number of times similar DNS queries have been reported. The records may be stored for analysis and may trigger certain actions by the SMF. For example, after storing a threshold number of reported DNS queries from an application (or UE), the SMF may configure the UE or a UPF to block/reject future DNS queries from the same application (or UE). In some aspects, the SMF may trigger different responses based on different threshold numbers of reported DNS queries. For example, a first number of reported DNS queries may trigger a PDU session modification message with network-configured DNS settings and a second (smaller or larger) number of reported DNS queries may trigger a notification (e.g., a SMS message) to a user of a UE to manually input the correct DNS settings or otherwise configure the application (or UE) to use the network-configured DNS settings. For example, referring to FIG. 14, The SMF 1406 may receive a notification 1430 from UPF 1408 and store 1432 a record of the reported DNS query 1426. For example, 1910 may be performed by DNS notification component 2442.

FIG. 20 is a flowchart 2000 of an example method of wireless communication. The method may be performed by a network entity of a core network (e.g., SMF 194; the SMF 806, 906, 1006, 1106, 1206, 1306, and 1406).

At 2006, the SMF may set, for a UPF, one or more of an action setting or a notification setting based on a determination, e.g. a detection, of the DNS parameter for the DNS query that is different than the DNS setting from the network. The SMF may transmit the one or more of the action setting or the notification setting to the UPF in an N4 session establishment request message or an N4 session modification request message. In some aspects, the action setting indicates for the UPF to do one or more of: (1) block the DNS query having the DNS parameter that is different than the DNS setting from the network, or (2) reject the DNS query having the DNS parameter that is different than the DNS setting from the network. For example, referring to FIGS. 12-14, the SMF (e.g., the SMF 1206, 1306, and 1406) may transmit an N4 session establishment/modification request message (e.g., message 1230, 1316, 1316A, 1416 and 1416A) to a UPF (e.g., the UPF 1208, 1308, and 1408). The N4 session establishment/modification request message 1230, 1316, 1316A, 1416 or 1416A may include an action instruction to do one or more of (1) blocking the DNS query having the DNS parameter that is different than the DNS setting from the network without a reply notification to the UE, or (2) rejecting the DNS query having the DNS parameter that is different than the DNS setting from the network with a rejection message to the UE.

In some aspects, the notification setting may include at least one of: (1) notifying the SMF, with an indication that no corrective action was specified, of the DNS query having the DNS parameter that is different than the DNS setting from the network, (2) notifying the network after blocking the DNS query having the DNS parameter that is different than the DNS setting from the network, (3) notifying the network after rejecting the DNS query having the DNS parameter that is different than the DNS setting from the network, or (4) notifying the network of the DNS query having the DNS parameter that is different than the DNS setting from the network and the corrective action taken by the UPF.

For example, referring to FIGS. 12-14, the SMF (e.g., the SMF 1206, 1306, and 1406) may transmit a notification setting to a UPF (e.g., the UPF 1208, 1308, and 1408) in an N4 session establishment/modification request message (e.g., message 1230, 1316, 1316A, 1416 and 1416A). The notification setting included in the N4 session establishment/modification request message (e.g., message 1230, 1316, 1316A, 1416 and 1416A) may include a setting for at least one of an instruction to: (1) notify the SMF, without a corrective action, of the DNS query having the DNS parameter that is different than the DNS setting from the network, (2) notify the network after blocking the DNS query having the DNS parameter that is different than the DNS setting from the network, (3) notify the network after rejecting the DNS query having the DNS parameter that is different than the DNS setting from the network, or (4) notify the network of the DNS query having the DNS parameter that is different than the DNS setting from the network and the corrective action taken by the UPF. For example, 2006 may be performed by DNS setting component 2440.

At 2008, the SMF may receive a notification from the UPF indicating a PDU session ID and a destination IP address of the DNS query having the DNS parameter that is different than the DNS setting from the network. The notification may further indicate a FQDN of the DNS query, at least a portion of an n-tuple (e.g., a 5-tuple) for the DNS query, or an application identifier (ID) associated with the DNS query. For example, referring to FIGS. 12-14, the SMF (e.g., the SMF 1206, 1306, and 1406) may receive a notification (e.g., 1240, 1332, 1430) from the UPF (e.g., the UPF 1208, 1308, and 1408) that may include an indication of one or more of a PDU session identifier, a destination IP address (associated with the FQDN), the destination network (e.g., IP) address of the DNS query, an application ID, an FQDN associated with the DNS query, and/or other addresses or information in an n-tuple (e.g., a 5-tuple including a source IP address, source port, destination IP address, destination port, and/or transport protocol) in a header of the DNS response. For example, 2008 may be performed by DNS notification component 2442.

Based on the notification received at 2008 the SMF may transmit at least one of a retransmission of the DNS setting or a network notification to reinstate a previously received DNS setting to at least one of the UE and a UPF. In some aspects, the SMF may, in response to the notification received at 2008, store a record of attempts by the UE to use the DNS parameter that is different than the DNS setting. The records may include the identity of the application associated with (e.g., generating) the query, the non-CN DNS resolver address, the identity of a UE associated with the reported DNS query, and may be associated with a number of times similar DNS queries have been reported.

The records may be stored for analysis and may trigger certain actions by the SMF. For example, after storing a threshold number of reported DNS queries from an application (or UE), the SMF may configure the UE or a UPF to block/reject future DNS queries from the same application (or UE). In some aspects, the SMF may trigger different responses based on different threshold numbers of reported DNS queries. For example, a first number of reported DNS queries may trigger a PDU session modification message with network-configured DNS settings and a second (smaller or larger) number of reported DNS queries may trigger a notification (e.g., a SMS message) to a user of a UE to manually input the correct DNS settings or otherwise configure the application (or UE) to use the network-configured DNS settings.

Figure 21:
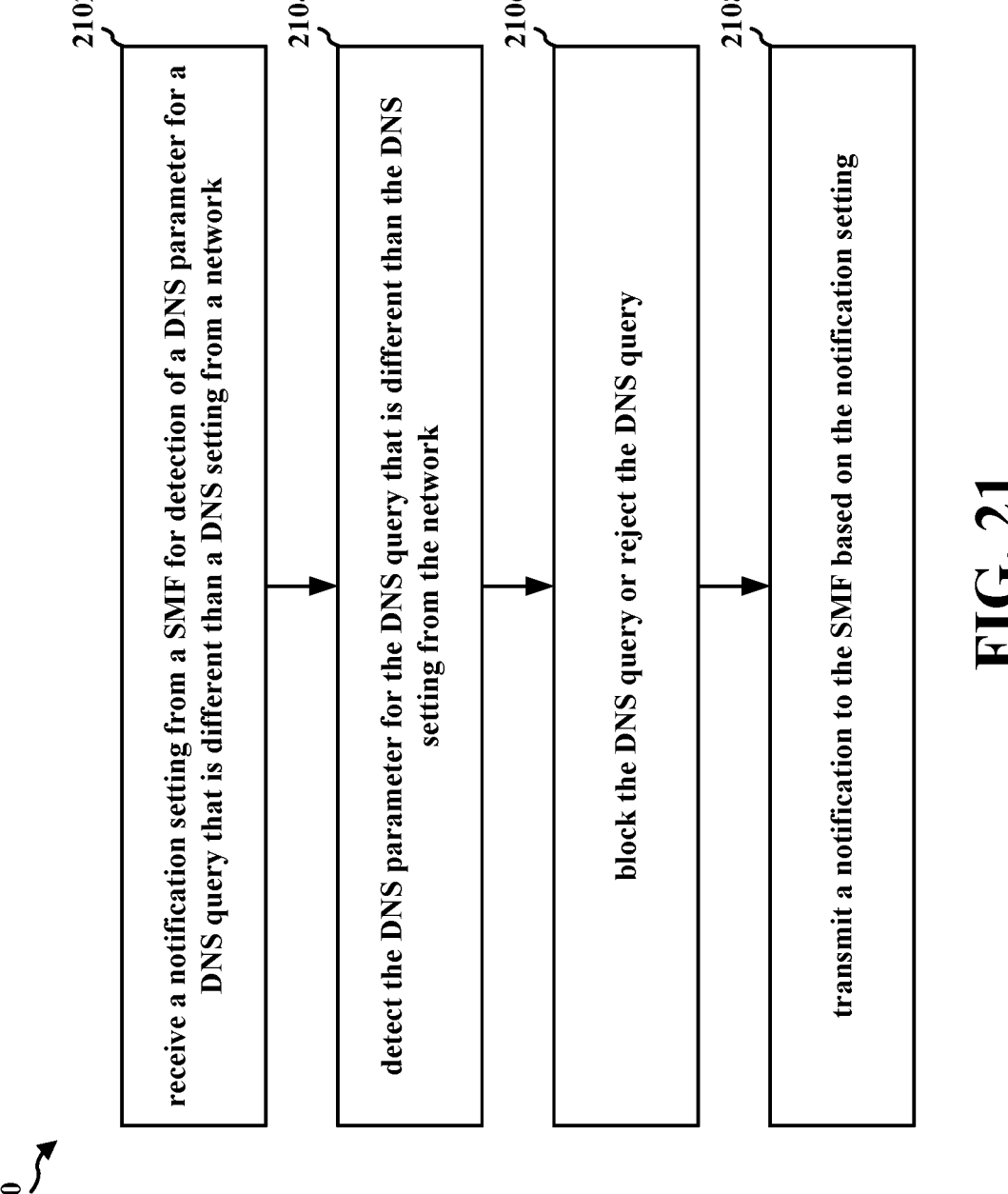
FIG. 21 is a flowchart of a method of wireless communication at a UPF.

FIG. 21 is a flowchart 2100 of an example method of wireless communication. The method may be performed by a UPF (e.g., UPF 195; the UPF 1208, 1308, and 1408). At 2102, the UPF may receive a notification setting from an SMF for a determination, e.g., detection, of a DNS parameter for a DNS query that is different than a DNS setting from a network. The notification setting may be received by the UPF via an N4 session establishment request message or an N4 session modification request message. In some aspects, the notification setting may include at least one of: (1) notifying the network after blocking the DNS query having the DNS parameter that is different than the DNS setting from the network (e.g., without a reply to the UE), (2) notifying the network after rejecting the DNS query having the DNS parameter that is different than the DNS setting from the network (e.g., with a rejection message to the UE, or (3) notifying the network of the DNS query having the DNS parameter that is different than the DNS setting from the network and the corrective action taken by the UPF.

At 2104, the UPF may determine, e.g., detect, a DNS query having the DNS parameter (e.g., a DNS network address) that is different than the DNS setting from the network. For example, DNS query having the DNS parameter that is different than the DNS setting from the network may be detected based on the content of the DNS query, a destination network address, and/or a port number (e.g., 53/853) in a header of the DNS query that is associated with a DNS operation, e.g., for a non-encrypted DNS query. In some aspects, the DNS query may be determined to be a DNS query even if the DNS query is encrypted based on the destination address or destination port in a header of the DNS query (e.g., packet). For example, referring to FIGS. 12-14, the UPF (e.g., the UPF 1208, 1308, and 1408) may inspect (and determine or detect) (e.g., 1236, 1330, and 1428) a DNS query (e.g., DNS query 1234, 1328, and 1426) having the DNS parameter that is different than the DNS setting from the network. For example, 2104 may be performed by DNS detection component 2541.

At 2106, the UPF, based on determining or detecting the DNS query having the DNS parameter that is different than the DNS setting from the network, the UPF may block the DNS query or the UPF may reject the DNS query. In some aspects, rejecting the DNS query at 2106 may include blocking the DNS query and sending an indication of the rejection or of an error. For example, referring to FIGS. 13 and 14, the UPF (e.g., the UPF 1308 and 1408) may block (e.g., at 1428) or reject (e.g., at 1330) a DNS query (e.g., DNS query 1328 and 1426) having the DNS parameter that is different than the DNS setting from the network. For example, 2106 may be performed by DNS notification component 2542.

At 2108, the UPF may transmit a notification from the UPF indicating a PDU session ID and a destination IP address of the DNS query having the DNS parameter that is different than the DNS setting from the network. The notification may further indicate a FQDN of the DNS query, at least a portion of an n-tuple (e.g., a 5-tuple) for the DNS query, or an application identifier (ID) associated with the DNS query. For example, referring to FIGS. 13 and 14, the UPF (e.g., the UPF 1308 and 1408) may transmit a notification (e.g., 1332, 1430) from the UPF (e.g., the UPF 1308 and 1408) that may include an indication of one or more of a PDU session identifier, a destination IP address (associated with the FQDN), the destination network (e.g., IP) address of the DNS query, an application ID, an FQDN associated with the DNS query, and/or other addresses or information in an n-tuple (e.g., a 5-tuple including a source IP address, source port, destination IP address, destination port, and/or transport protocol) in a header of the DNS response. For example, 2108 may be performed by DNS notification component 2542.

FIG. 22 is a flowchart 2200 of an example method of wireless communication. The method may be performed by a UPF (e.g., UPF 195; the UPF 1208, 1308, and 1408). At 2202, the UPF may receive a notification setting from an SMF for a determination, e.g., a detection, of a DNS parameter for a DNS query that is different than a DNS setting from a network. The notification setting may be received by the UPF via an N4 session establishment request message or an N4 session modification request message. In some aspects, the notification setting may include at least one of: (1) notifying the SMF, with an indication that no corrective action was specified, of the DNS query having the DNS parameter that is different than the DNS setting from the network, (2) notifying the network after blocking the DNS query having the DNS parameter that is different than the DNS setting from the network, (3) notifying the network after rejecting the DNS query having the DNS parameter that is different than the DNS setting from the network, or (4) notifying the network of the DNS query having the DNS parameter that is different than the DNS setting from the network and the corrective action taken by the UPF. For example, referring to FIGS. 12-14, the UPF (e.g., the UPF 1208, 1308, and 1408) may receive notification (e.g., 1230, 1316, 1316A, 1416 or 1416A) including a notification setting. For example, 2204 may be performed by DNS notification component 2542.

At 2204, the UPF may receive an action setting from the SMF including at least one of: a first setting to block the DNS query having the DNS parameter that is different than the DNS setting from the network, or a second setting to reject the DNS query having the DNS parameter that is different than the DNS setting from the network. The action setting may be received by the UPF via an N4 session establishment request message or an N4 session modification request message. For example, referring to FIGS. 12-14, the UPF (e.g., the UPF 1208, 1308, and 1408) may receive notification (e.g., 1230, 1316, 1316A, 1416 or 1416A) including an action setting. The action setting may include at least one of a first setting to block the DNS query having the DNS parameter that is different than the DNS setting from the network, a second setting to reject the DNS query having the DNS parameter that is different than the DNS setting from the network, or a third setting to redirect the DNS query having the DNS parameter that is different than the DNS setting from the network to the CN DNS resolver. For example, 2204 may be performed by DNS Setting component 2540.

At 2206, the UPF may determine, e.g., detect, a DNS query having the DNS parameter (e.g., a DNS network address) that is different than the DNS setting from the network. For example, DNS query having the DNS parameter that is different than the DNS setting from the network may be based on the content of the DNS query, a destination network address, and/or a port number (e.g., 53/853) in a header of the DNS query that is associated with a DNS operation, e.g., for a non-encrypted DNS query. In some aspects, the DNS query may be determined to be a DNS query even if the DNS query is encrypted based on the destination address or destination port in a header of the DNS query (e.g., packet). For example, referring to FIGS. 12-14, the UPF (e.g., the UPF 1208, 1308, and 1408) may inspect (and determine or detect) (e.g., 1236, 1330, and 1428) a DNS query (e.g., DNS query 1234, 1328, and 1426) having the DNS parameter that is different than the DNS setting from the network. For example, 2204 may be performed by DNS notification component 2542.

At 2208, the UPF, based on the action setting received from the network (e.g., the SMF) may determine 2208 to block, reject, or redirect the DNS query determined, e.g., detected, as having a DNS parameter that is different than the DNS setting from the network. At 2210, based on the determination, e.g., detection, at 2206, the UPF may block the DNS query and transmit a notification to the SMF. For example, referring to FIG. 14, the UPF (e.g., the UPF 1408) may block (e.g., at 1428) a DNS query (e.g., DNS query 1426) having the DNS parameter that is different than the DNS setting from the network (e.g., without a reply to the UE). The UPF may transmit a notification from the UPF indicating a PDU session ID and a destination IP address of the DNS query having the DNS parameter that is different than the DNS setting from the network. The notification may further indicate a FQDN of the DNS query, at least a portion of an n-tuple (e.g., a 5-tuple) for the DNS query, and/or an application identifier (ID) associated with the DNS query. For example, 2210 may be performed by DNS notification component 2542.

At 2212, based on the determination, e.g., detection, at 2206, the UPF may reject the DNS query and transmit a notification to the SMF (e.g., with a rejection message to the UE). In some aspects, rejecting the DNS query at 2212 may include blocking the DNS query and sending an indication of the rejection or of an error. For example, referring to FIG. 13, the UPF (e.g., the UPF 1308) may reject 1330 a DNS query (e.g., DNS query 1328) having the DNS parameter that is different than the DNS setting from the network and transmitting a DNS response 1334 indicating that the DNS query 1328 was rejected or generated an error. The UPF may transmit a notification from the UPF indicating a PDU session ID and a destination IP address of the DNS query having the DNS parameter that is different than the DNS setting from the network. The notification may further indicate a FQDN of the DNS query, at least a portion of an n-tuple (e.g., a 5-tuple) for the DNS query, or an application identifier (ID) associated with the DNS query. For example, 2212 may be performed by DNS notification component 2542.

At 2214, based on the determination, e.g., detection, at 2206, the UPF may redirect the DNS query and transmit a notification to the SMF. In some aspects, redirecting the DNS query at 2214 may include changing the destination address to redirect the DNS query to a CN DNS resolver. For example, referring to FIG. 12, the UPF (e.g., the UPF 1208) may redirect 1236 a DNS query (e.g., DNS query 1234) having the DNS parameter that is different than the DNS setting from the network. The UPF may transmit a notification from the UPF indicating a PDU session ID and a destination IP address of the DNS query having the DNS parameter that is different than the DNS setting from the network. The notification may further indicate a FQDN of the DNS query, at least a portion of an n-tuple (e.g., a 5-tuple) for the DNS query, or an application identifier (ID) associated with the DNS query. For example, 2214 may be performed by DNS notification component 2542.

Figure 23:
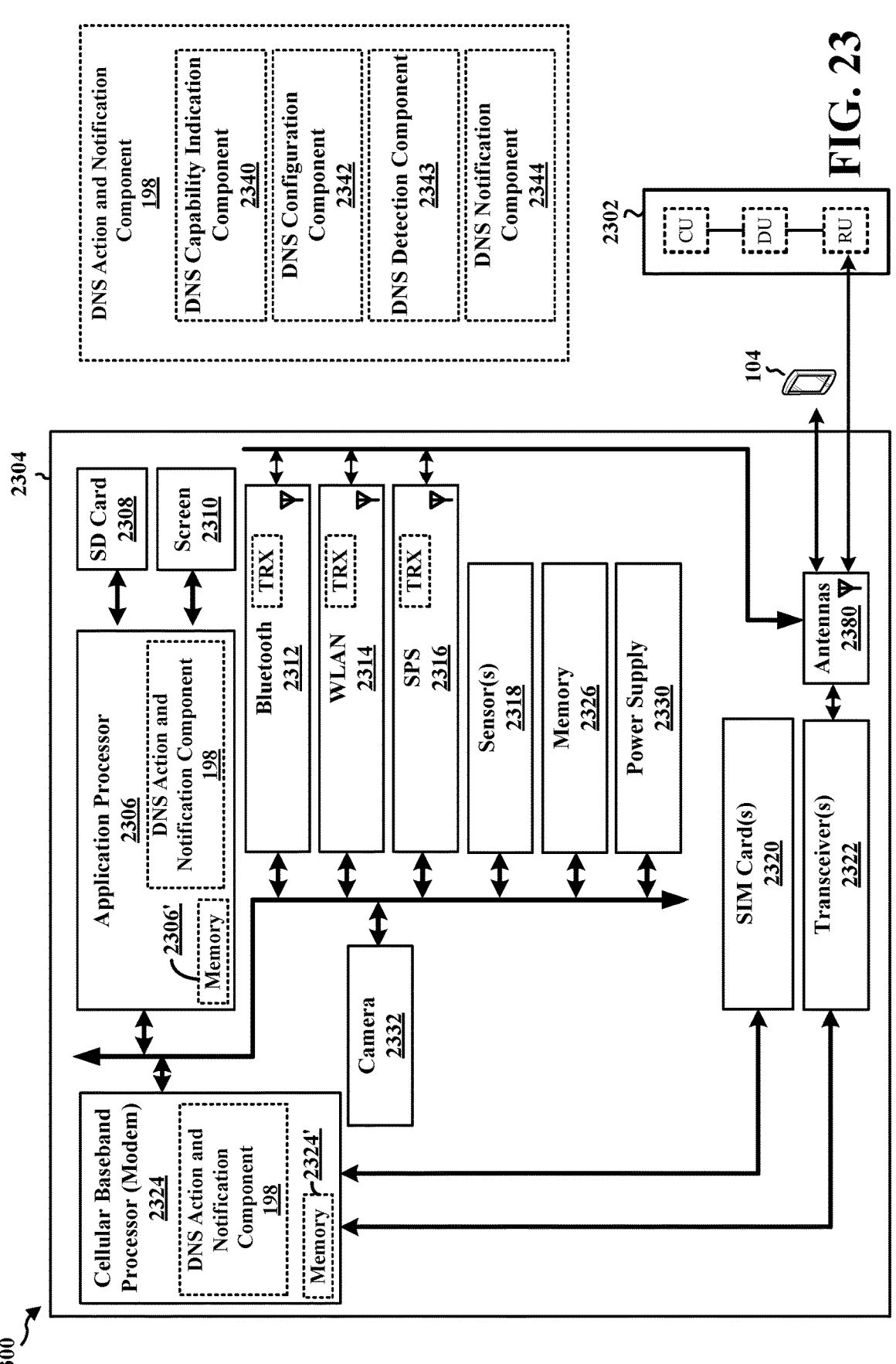
FIG. 23 is a diagram illustrating an example of a hardware implementation for an example UE apparatus.

FIG. 23 is a diagram 2300 illustrating an example of a hardware implementation for an apparatus 2304. The apparatus 2304 may be a UE, a component of a UE, or may implement UE functionality. In some aspects, the apparatus 2304 may include a cellular baseband processor 2324 (also referred to as a modem) coupled to one or more transceivers 2322 (e.g., cellular RF transceiver). The cellular baseband processor 2324 may include on-chip memory 2324'. In some aspects, the apparatus 2304 may further include one or more subscriber identity modules (SIM) cards 2320 and an application processor 2306 coupled to a secure digital (SD) card 2308 and a screen 2310. The application processor 2306 may include on-chip memory 2306'. In some aspects, the apparatus 2304 may further include a Bluetooth module 2312, a WLAN module 2314, an SPS module 2316 (e.g., GNSS module), one or more sensor modules 2318 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2326, a power supply 2330, and/or a camera 2332. The Bluetooth module 2312, the WLAN module 2314, and the SPS module 2316 may include an on-chip transceiver (TRX) (or in some cases, just a receiver (RX)). The Bluetooth module 2312, the WLAN module 2314, and the SPS module 2316 may include their own dedicated antennas and/or utilize the antennas 2380 for communication. The cellular baseband processor 2324 communicates through the transceiver(s) 2322 via one or more antennas 2380 with the UE 104 and/or with an RU associated with a network entity 2302. The cellular baseband processor 2324 and the application processor 2306 may each include a computer-readable medium/memory 2324', 2306', respectively. The additional memory modules 2326 may also be considered a computer-readable medium/memory. Each computer-readable medium/memory 2324', 2306', 2326 may be non-transitory. The cellular baseband processor 2324 and the application processor 2306 are each responsible for general processing, including the execution of software stored on the computer-readable medium/memory. The software, when executed by the cellular baseband processor 2324/application processor 2306, causes the cellular baseband processor 2324/application processor 2306 to perform the various functions described supra. The computer-readable medium/memory may also be used for storing data that is manipulated by the cellular baseband processor 2324/application processor 2306 when executing software. The cellular baseband processor 2324/application processor 2306 may be a component of the UE 350 and may include the memory 360 and/or at least one of the TX processor 368, the RX processor 356, and the controller/processor 359. In one configuration, the apparatus 2304 may be a processor chip (modem and/or application) and include just the cellular baseband processor 2324 and/or the application processor 2306, and in another configuration, the apparatus 2304 may be the entire UE (e.g., see 350 of FIG. 3) and include the additional modules of the apparatus 2304.

The DNS action and notification component 198 may be configured to transmit an indication of a capability for at least one of determining, e.g., detecting, a DNS parameter for a DNS query that is different than a DNS setting from a network or directing the DNS query based on the DNS setting from the network and to receive, from the network, an instruction to direct DNS queries based on the capability of the UE, e.g., as described in connection with FIG. 16 or 17. The DNS action and notification component 198 may be further configured to detect the DNS query having the DNS parameter that is different than the DNS setting from the network, e.g., as described in connection with 1706 in FIG. 17. The DNS action and notification component 198 may be further configured to apply an action based on the configuration and determination or detection, e.g., as described in connection with 1709 in FIG. 17. The DNS action and notification component 198 may be further configured to transmit the notification to the network indicating a PDU session ID and a destination IP address of the DNS query, e.g., as described in connection with 1708 in FIG. 17. The DNS action and notification component 198 may be further configured to receive, in response to the notification, at least one of a retransmission of the DNS setting from the network or a network notification to reinstate a previously received DNS setting, e.g., as described in connection with 1711 in FIG. 17

In some aspects, the DNS action and notification component 198 may include a DNS capability indication component 2340 configured to transmit an indication of a capability for at least one of determining, e.g., detecting, a DNS parameter for a DNS query that is different than a DNS setting from a network and redirecting the DNS query based on the DNS setting from the network, e.g., as described in connection with 1602 or 1702 in FIG. 16 or 17. The DNS action and notification component 198 may further include a DNS configuration component 2342 configured to receive, from the network, an instruction to monitor DNS queries based on the capability of the UE, e.g., as described in connection with 1602 or 1702 in FIG. 16 or 17. The DNS action and notification component 198 may further include a DNS detection component 2343 configured to detect the DNS query having the DNS parameter that is different than the DNS setting from the network, e.g., as described in connection with 1706 in FIG. 17. The DNS configuration component 2342 may be further configured to apply an action based on the configuration and detection, e.g., as described in connection with 1709 in FIG. 17. The DNS action and notification component 198 may further include a DNS notification component 2344 configured to transmit the notification to the network indicating a PDU session ID and a destination IP address of the DNS query, e.g., as described in connection with 1708 in FIG. 17. The DNS configuration component 2342 may be further configured to receive, in response to the notification, at least one of a retransmission of the DNS setting from the network or a network notification to reinstate a previously received DNS setting, e.g., as described in connection with 1711 in FIG. 17.

The network entity 2302 may include additional components that perform each of the blocks of the algorithm in the flowcharts of FIGS. 16 and 17, and/or the aspects performed by the UE in any of FIGS. 8-14. As such, each block in the flowcharts of FIGS. 16 and 17, and/or the aspects performed by the UE in any of FIGS. 8-14, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2304 may include a variety of components configured for various functions. In one configuration, the apparatus 2304, and in particular the cellular baseband processor 2324, includes means for transmitting an indication of a capability for at least one of determining, e.g., detecting, a DNS parameter for a DNS query that is different than a DNS setting from a network and directing the DNS query based on the DNS setting from the network. The apparatus 2304 may include means for receiving, from the network, an instruction to direct DNS queries based on the capability of the UE. The apparatus 2304 may further include means for detecting, e.g., determining, the DNS query having the DNS parameter that is different than the DNS setting from the network. The apparatus 2304 may further include means for transmitting the notification to the network indicating a PDU session ID and a destination IP address of the DNS query. The apparatus 2304 may further include means for receiving, in response to the notification, at least one of a retransmission of the DNS setting from the network or a network notification to reinstate a previously received DNS setting. The apparatus 2304 may include means for performing any of the aspects of the flowcharts of FIGS. 16 and 17, and/or the aspects performed by the UE in any of FIGS. 8-14. The means may be one or more of the components of the apparatus 2304 configured to perform the functions recited by the means. As described supra, the apparatus 2304 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 24:
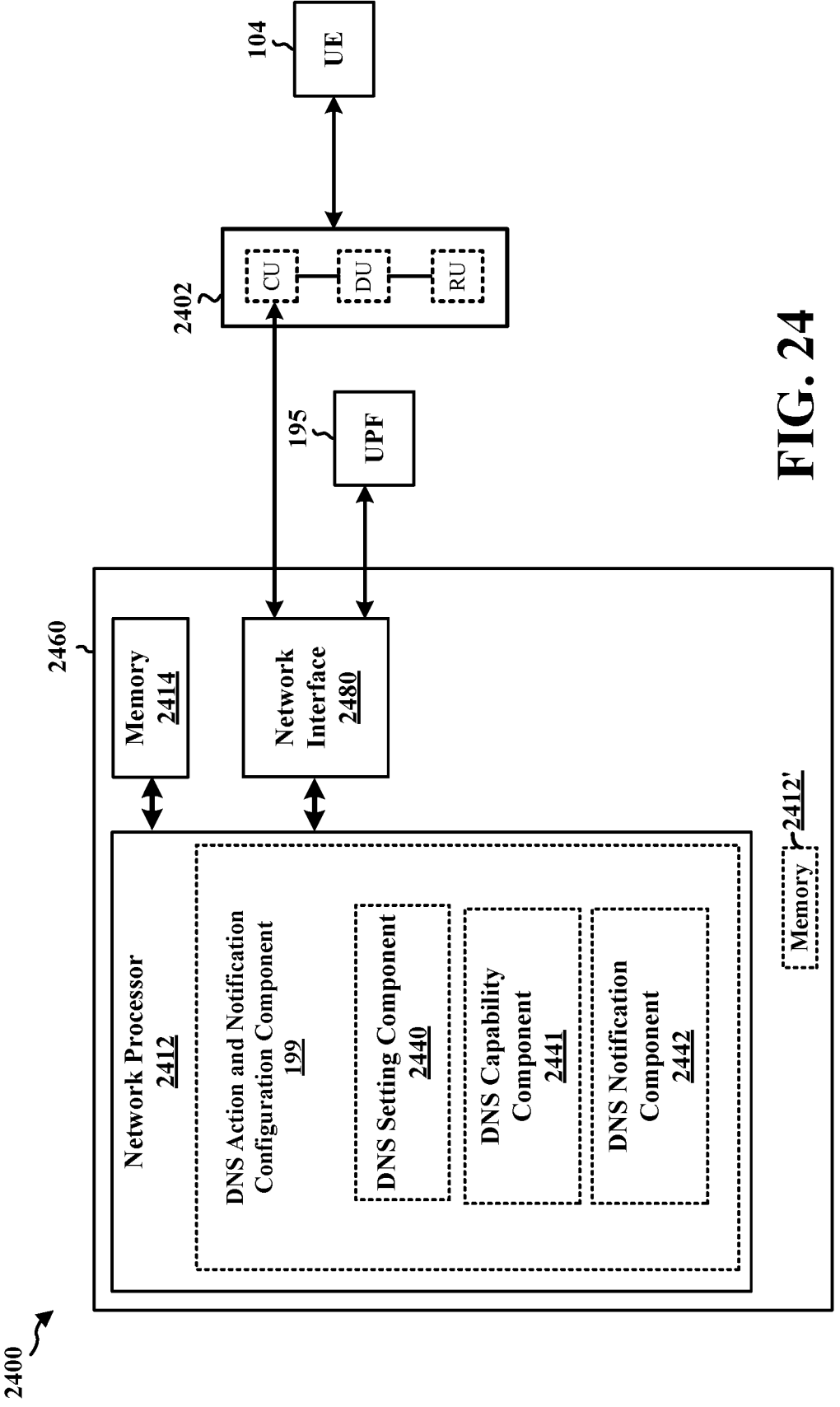
FIG. 24 is a diagram illustrating an example of a hardware implementation for an example SMF apparatus.

FIG. 24 is a diagram 2400 illustrating an example of a hardware implementation for a network entity 2460. The network entity 2460 may be a component of a core network, such as an SMF, or may implement SMF functionality. In one example, the network entity 2460 may be within the core network 120. The network entity 2460 may include a network processor 2412. The network processor 2412 may include on-chip memory 2412'. In some aspects, the network entity 2460 may further include additional memory modules 2414. The network entity 2460 communicates via the network interface 2480 directly (e.g., backhaul link) or indirectly (e.g., through a MC) with the CU 2402. The on-chip memory 2412' and the additional memory modules 2414 may each be considered a computer-readable medium/memory. Each computer-readable medium/memory may be non-transitory. The processor 2412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software. The network entity 2460 may be the SMF 194, or the SMF described in connection with any of FIGS. 4-15, and may include the memory 376 and/or at least one of the TX processor 316, the RX processor 370, and the controller/processor 375.

The network entity 2460 includes a DNS action and notification configuration component 199 configured to receive, from a UE, an indication of a capability for at least one of detecting, e.g., determining, a DNS parameter for a DNS query that is different than a DNS setting from a network or directing the DNS query based on the DNS setting from the network and to transmit to the UE or UPF, an instruction to direct DNS queries. The DNS action and notification configuration component 199 may be further configured to transmit instructions to the UE to monitor DNS queries based on the capability of the UE. The DNS action and notification configuration component 199 may be further configured to receive the notification from the UE indicating a PDU session ID and a destination IP address of the DNS query having the DNS parameter that is different than the DNS setting from the network, e.g., as described in connection with 1906 or 2008 in FIG. 19 or 20. The DNS action and notification configuration component 199 may be further configured to store a record of attempts by the UE to use the DNS parameter that is different than the DNS setting, e.g., as described in connection with 1910 in FIG. 19.

The DNS action and notification configuration component 199 may include a DNS capability component 2441 configured to receive, from a UE, an indication of a capability for at least one of detecting, e.g., determining, a DNS parameter for a DNS query that is different than a DNS setting from a network and redirecting the DNS query based on the DNS setting from the network, e.g., as described in connection with 1802 or 1902 or 2002 in FIG. 18, 19, or 20. The DNS action and notification configuration component 199 may include a DNS setting component 2440 configured to transmit to the UE or UPF, an instruction to monitor DNS queries, e.g., as described in connection with any of 1804, 1904, 1908, 2004, 2006 of FIG. 18, 19, or 20. For example, the means for transmitting may transmit instructions to the UE to monitor DNS queries based on the capability of the UE. The DNS action and notification configuration component 199 may include a DNS notification component 2442 configured to receive the notification from the UE indicating a PDU session ID and a destination IP address of the DNS query having the DNS parameter that is different than the DNS setting from the network, e.g., as described in connection with 1906 or 2008 in FIG. 19 or 20. The DNS notification component 2442 may be further configured to store a record of attempts by the UE to use the DNS parameter that is different than the DNS setting, e.g., as described in connection with 1910 in FIG. 19.

The network entity 2460 may include additional components that perform each of the blocks of the algorithm in the flowcharts of FIGS. 18, 19, and/or 20 and/or any aspects performed by the SMF in any of FIGS. 8-14. As such, each block in the flowcharts of FIGS. 18, 19, and/or 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the network entity 2460 may include a variety of components configured for various functions. In one configuration, the network entity 2460, and in particular the network processor 2412, includes means for receiving, from a UE, an indication of a capability for at least one of detecting, e.g., determining, a DNS parameter for a DNS query that is different than a DNS setting from a network and directing the DNS query based on the DNS setting from the network. The network entity 2460 includes means for transmitting, to the UE or UPF, an instruction to direct DNS queries. For example, the means for transmitting may transmit instructions to the UE to monitor DNS queries based on the capability of the UE. The network entity 2460 may further include means for receiving the notification from the UE indicating a PDU session ID and a destination IP address of the DNS query having the DNS parameter that is different than the DNS setting from the network. The network entity 2460 may further include means for transmitting, in response to the notification, at least one of a retransmission of the DNS setting or a network notification to reinstate a previously received DNS setting to at least one of the UE and a UPF. The network entity 2460 may further include means for storing a record of attempts by the UE to use the DNS parameter that is different than the DNS setting. The network entity 2460 may further include means for setting, for a UPF one or more of an action setting or a notification setting based on a determination, e.g., a detection, of the DNS parameter for the DNS query that is different than the DNS setting from the network. The network entity 2460 may further include means for receiving a notification from the UPF indicating a PDU session ID and a destination IP address of the DNS query having the DNS parameter that is different than the DNS setting from the network. The network entity 2460 may include means for performing any of the additional aspects in the flowcharts of FIGS. 18, 19, and/or 20 and/or any aspects performed by the SMF in any of FIGS. 8-14. The means may be one or more of the components of the network entity 2460 configured to perform the functions recited by the means. The network entity 2460 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 25:
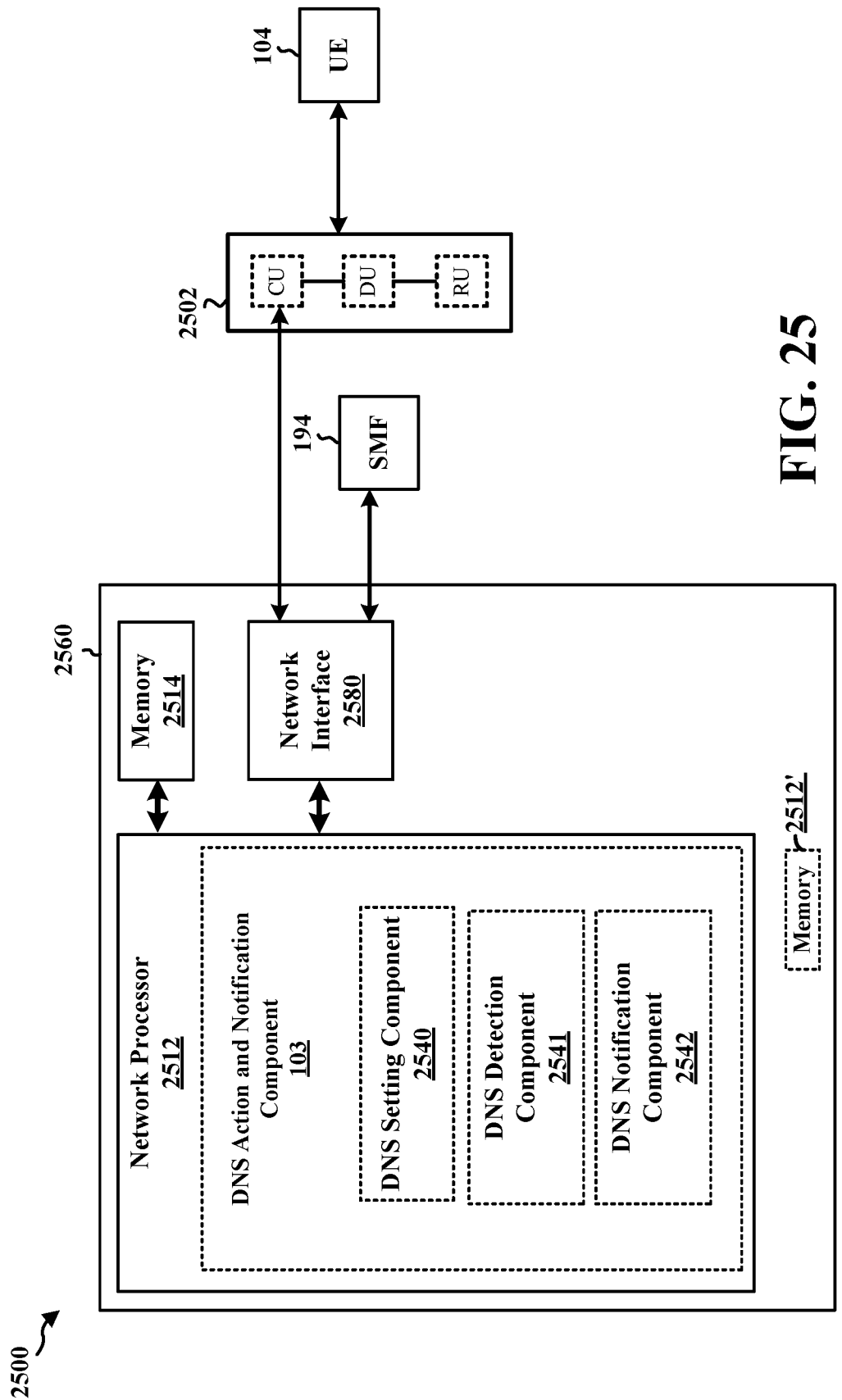
FIG. 25 is a diagram illustrating an example of a hardware implementation for an example SMF apparatus.

FIG. 25 is a diagram 2500 illustrating an example of a hardware implementation for a network entity 2560. In one example, the network entity 2560 may be a component of a core network, such as a UPF 195, or may implement UPF functionality.

The network entity 2560 may include a network processor 2512. The network processor 2512 may include on-chip memory 2512'. In some aspects, the network entity 2560 may further include additional memory modules 2514. The network entity 2560 communicates via the network interface 2580 directly (e.g., backhaul link) or indirectly (e.g., through a RIC) with the CU 2502. The on-chip memory 2512' and the additional memory modules 2514 may each be considered a computer-readable medium/memory. Each computer-readable medium/memory may be non-transitory. The processor 2512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software. The network entity 2560 may be the UPF 195, or a component of the UPF, such as the UPF described in connection with any of FIG. 1 or 4-15, and may include the memory 376 and/or at least one of the TX processor 316, the RX processor 370, and the controller/processor 375.

The network entity 2560 includes a DNS action and notification component 103 configured to receive a notification setting from an SMF, for detection, e.g., determination, of a DNS parameter for a DNS query that is different than a DNS setting from a network, to detect, e.g., determination, the DNS parameter for the DNS query that is different than the DNS setting from the network, block the DNS query or reject the DNS query, and receive an action setting from the SMF. The DNS action and notification component 103 may be configured to transmit a notification to the SMF based on the notification setting, e.g., as described in connection with 2108 in FIGS. 21 and/or 2210, 2212, or 2214 in FIG. 22.

The DNS action and notification component 103 may include a DNS notification component 2542 configured to receive a notification setting from an SMF, for detection, e.g., determination, of a DNS parameter for a DNS query that is different than a DNS setting from a network, e.g., as described in connection with 2102 or 2202 in FIG. 21 or 22. The DNS action and notification component 103 may include a DNS detection component 2541 configured to detect, e.g., determine, the DNS parameter for the DNS query that is different than the DNS setting from the network, e.g., as described in connection with 2104 or 2206 in FIG. 21 or 22. The DNS action and notification component 103 may include a DNS setting component 2540 configured to block the DNS query or reject the DNS query, e.g., as described in connection with 2106, 2208, 2210, 2212 or 2214 of FIGS. 21 and 22. The DNS setting component may be further configured to receive an action setting from the SMF, e.g., as described in connection with 2204 in FIG. 22. The DNS notification component 2542 is configured to transmit a notification to the SMF based on the notification setting, e.g., as described in connection with 2108 in FIGS. 21 and/or 2210, 2212, or 2214 in FIG. 22.

The network entity 2560 may include additional components that perform each of the blocks of the algorithm in the flowcharts of FIG. 21 or 22. As such, each block in the flowcharts of FIG. 21 or 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the network entity 2560 may include a variety of components configured for various functions. In one configuration, the network entity 2560, and in particular the network processor 2512, may include means for receiving a notification setting from an SMF, for detection, e.g., determination, of a DNS parameter for a DNS query that is different than a DNS setting from a network. The network entity 2560 includes means for detecting, e.g., determining, the DNS parameter for the DNS query that is different than the DNS setting from the network. The network entity 2560 includes means for blocking the DNS query or rejecting the DNS query and means for transmitting a notification to the SMF based on the notification setting. The network entity 2560 may further include means for performing any of the aspects described in connection with the flowchart in FIG. 21 and/or the aspects performed by the UPF in any of FIGS. 8-15. The means may be one or more of the components of the network entity 2560 configured to perform the functions recited by the means. The network entity 2560 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is for a method of wireless communication including: transmitting an indication of a capability for at least one of determining, e.g., detecting, a DNS parameter for a DNS query that is different than a DNS setting from a network or directing the DNS query based on the DNS setting from the network; and receiving, from the network, an instruction to monitor DNS queries based on the capability of the UE.

Aspect 2 is the method of aspect 1, where the indication is in a PDU session establishment request message or a PDU session modification request.

Aspect 3 is the method of any of aspects 1 or 2, where the instruction comprises one or more of an action setting or a notification setting based on a determination, e.g., a detection, of the DNS parameter for the DNS query that is different than the DNS setting from the network.

Aspect 4 is the method of any of aspects 1 to 3, where the instruction is in a PDU session establishment accept message or a PDU session modification command message.

Aspect 5 is the method of any of aspects 3 or 4, further including: monitoring to detect, e.g., determine, different DNS parameters from the DNS setting from the network; holding the DNS query having the DNS parameter that is different than the DNS setting from the network; directing the DNS query to an EASDF or a MNO's DNS resolver based on the DNS setting from the network; blocking the DNS query having the DNS parameter that is different than the DNS setting from the network without a reply message; or rejecting the DNS query having the DNS parameter that is different than the DNS setting from the network including transmitting a rejection message.

Aspect 6 is the method of aspect 5, where the instruction further comprises the notification setting, which includes at least one of: skipping transmission of a notification to the network; notifying the network, with an indication that no corrective action was specified, of the DNS query having the DNS parameter that is different than the DNS setting from the network; notifying the network that the DNS query having the DNS parameter that is different than the DNS setting from the network is put on hold; notifying the network after a successful direction of the DNS query having the DNS parameter that is different than the DNS setting from the network; notifying the network after a failed direction of the DNS query having the DNS parameter that is different than the DNS setting from the network; notifying the network after blocking the DNS query having the DNS parameter that is different than the DNS setting from the network; notifying the network after rejecting the DNS query having the DNS parameter that is different than the DNS setting from the network; or notifying the network of the DNS query having the DNS parameter that is different than the DNS setting from the network and the corrective action taken by the UE.

Aspect 7 is the method of aspect 6, further including: detecting, e.g., determining, the DNS query having the DNS parameter that is different than the DNS setting from the network; and transmitting the notification to the network indicating a PDU session ID and a destination IP address of the DNS query.

Aspect 8 is the method of aspect 7, where the notification further indicates at least one of: a FQDN of the DNS query; at least a portion of a 5-tuple for the DNS query; or an application ID associated with the DNS query.

Aspect 9 is the method of any of aspects 7 or 8, where the notification is in a PDU session modification message to an SMF.

Aspect 10 is the method of any of aspects 7 to 9, further including: receiving, in response to the notification, at least one of a retransmission of the DNS setting from the network or a network notification to reinstate a previously received DNS setting.

Aspect 11 is the method of any of aspects 1 to 10, wherein method includes directing one or more DNS queries based on the instruction from the network.

Aspect 12 is the method of any of aspects 1 to 11 in which the DNS parameter comprises one or more of a DNS network address, a destination network address, or a port number.

Aspect 13 is for a method of wireless communication including: obtaining, from a UE, an indication of a capability for at least one of determining, e.g., detecting, a DNS parameter for a DNS query that is different than a DNS setting from a network and directing the DNS query based on the DNS setting from the network; and outputting, to the UE, an instruction to monitor DNS queries based on the capability of the UE.

Aspect 14 is the method of aspect 13, where the indication is in a PDU session establishment request message.

Aspect 15 is the method of any of aspects 13 or 14, where the instruction comprises one or more of an action setting or a notification setting based on a determination, e.g., a detection, of the DNS parameter for the DNS query that is different than the DNS setting from the network.

Aspect 16 is the method of any of aspect 13 to 15, where the instruction is in a PDU session establishment accept message or a PDU session modification command message.

Aspect 17 is the method of any of aspects 15 or 16, where the instruction comprises the action setting, which includes at least one of: monitoring to detect, e.g., determine, different DNS parameters from the DNS setting from the network; holding the DNS query having the DNS parameter that is different than the DNS setting from the network; directing the DNS query to an EASDF or a MNO's DNS resolver based on the DNS setting from the network; blocking the DNS query having the DNS parameter that is different than the DNS setting from the network without a reply message; or rejecting the DNS query having the DNS parameter that is different than the DNS setting from the network including transmitting a rejection message.

Aspect 18 is the method of aspect 17, where the instruction further comprises the notification setting, which includes at least one of: skipping transmission of a notification to the network; notifying the network, with an indication that no corrective action was specified, of the DNS query having the DNS parameter that is different than the DNS setting from the network; notifying the network that the DNS query having the DNS parameter that is different than the DNS setting from the network is put on hold; notifying the network after a successful direction of the DNS query having the DNS parameter that is different than the DNS setting from the network; notifying the network after a failed direction of the DNS query having the DNS parameter that is different than the DNS setting from the network; notifying the network after blocking the DNS query having the DNS parameter that is different than the DNS setting from the network; notifying the network after rejecting the DNS query having the DNS parameter that is different than the DNS setting from the network; or notifying the network of the DNS query having the DNS parameter that is different than the DNS setting from the network and the corrective action taken by the UE.

Aspect 19 is the method of aspect 18, further including obtaining the notification from the UE indicating a PDU session ID and a destination IP address of the DNS query having the DNS parameter that is different than the DNS setting from the network.

Aspect 20 is the method of aspect 19, where the notification further indicates at least one of: a FQDN of the DNS query; at least a portion of a 5-tuple for the DNS query; or an application ID associated with the DNS query.

Aspect 21 is the method of any of aspects 19 or 20, further including outputting, in response to the notification, at least one of a retransmission of the DNS setting or a network notification to reinstate a previously received DNS setting to at least one of the UE and a UPF.

Aspect 22 is the method of any of aspects 19 to 2, further including storing a record of attempts by the UE to use the DNS parameter that is different than the DNS setting.

Aspect 23 is the method of any of aspects 13 to 22, further including setting, for a UPF one or more of an action setting or a notification setting based on a determination, e.g., a detection, of the DNS parameter for the DNS query that is different than the DNS setting from the network.

Aspect 24 is the method of aspect 23, where the method is performed at an SMF that outputs the one or more of the action setting or the notification setting to the UPF in an N4 session establishment request message or an N4 session modification request message.

Aspect 25 is the method of aspect 24, where the SMF sets the action setting for the UPF, the action setting including at least one of: blocking the DNS query having the DNS parameter that is different than the DNS setting from the network without a reply message; or rejecting the DNS query having the DNS parameter that is different than the DNS setting from the network including transmitting a rejection message.

Aspect 26 is the method of aspect 25, where the SMF further sets the notification setting for the UPF, the notification setting including at least one of: notifying the network after blocking the DNS query the DNS parameter that is different than the DNS setting from the network; notifying the network after rejecting the DNS query the DNS parameter that is different than the DNS setting from the network; or notifying the network of the DNS query the DNS parameter that is different than the DNS setting from the network and a corrective action taken by the UPF.

Aspect 27 is the method of aspect 26, further including obtaining a notification from the UPF indicating a PDU session ID and a destination IP address of the DNS query having the DNS parameter that is different than the DNS setting from the network.

Aspect 28 is the method of aspect 27, where the notification further indicates at least one of: a FQDN of the DNS query; at least a portion of a 5-tuple for the DNS query; or an application ID associated with the DNS query.

Aspect 29 is the method of any of aspects 13 to 28, where the method is performed at an SMF.

Aspect 30 is the method of any of aspects 13 to 29 further including that the DNS parameter comprises one or more of a DNS network address, a destination network address, or a port number.

Aspect 31 is a method of wireless communication including: receiving a notification setting from an SMF, for detection, e.g., a determination, of a DNS parameter for a DNS query that is different than a DNS setting from a network; detecting, e.g., determine, the DNS parameter for the DNS query that is different than the DNS setting from the network; blocking the DNS query or rejecting the DNS query; and transmitting a notification to the SMF based on the notification setting.

Aspect 32 is the method of aspect 31, where the notification setting is in an N4 session establishment request message or an N4 session modification request message from the SMF, and the notification is in an N4 session report request to the SMF.

Aspect 33 is the method of any of aspects 31 or 32, where the notification setting includes at least one of: notifying the network after blocking the DNS query the DNS parameter that is different than the DNS setting from the network; notifying the network after rejecting the DNS query the DNS parameter that is different than the DNS setting from the network; or notifying the network of the DNS query the DNS parameter that is different than the DNS setting from the network and a corrective action taken by the UPF.

Aspect 34 is the method of any of aspects 31 to 33, further including receiving an action setting from the SMF including at least one of: a first setting to block the DNS query having the DNS parameter that is different than the DNS setting from the network; or a second setting to reject the DNS query having the DNS parameter that is different than the DNS setting from the network.

Aspect 35 is the method of any of aspects 31 to 34, where the notification indicates a PDU session ID and a destination IP address of the DNS query having the DNS parameter that is different than the DNS setting from the network.

Aspect 36 is the method of aspect 35, where the notification further indicates at least one of: a FQDN of the DNS query; at least a portion of a 5-tuple for the DNS query; or an application ID associated with the DNS query.

Aspect 37 is the method of any of aspects 31 to 36 further including that the DNS parameter comprises one or more of a DNS network address, a destination network address, or a port number.

Aspect 38 is an apparatus for wireless communication including memory and at least one processor coupled to the memory and configured, based at least in part on information stored in the memory, to perform the method of any of aspects 1 to 12.

Aspect 39 is an apparatus for wireless communication including means for performing the method of any of aspects 1 to 12.

Aspect 40 is a non-transitory computer-readable medium storing computer executable code, where the code when executed by a processor causes the processor to implement any of aspects 1 to 12.

In aspect 41, the apparatus of aspect 39 or 40 further includes at least one of a transceiver or an antenna coupled to the at least one processor.

Aspect 42 is an apparatus for wireless communication including memory and at least one processor coupled to the memory and configured, based at least in part on information stored in the memory, to perform the method any of aspects 13 to 30.

Aspect 43 is an apparatus for wireless communication including means for implementing any of aspects 13 to 30.

Aspect 44 is a non-transitory computer-readable medium storing computer executable code, where the code when executed by a processor causes the processor to implement any of aspects 13 to 30.

In aspect 45, the apparatus of aspect 40 or 41 further includes at least one of a transceiver or an antenna.

Aspect 46 is an apparatus for wireless communication including memory and at least one processor coupled to the memory and configured, based at least in part on information stored in the memory, to perform the method of any of aspects 31 to 37.

Aspect 47 is an apparatus for wireless communication including means for implementing any of aspects 31 to 37.

In aspect 48, the apparatus of aspect 44 or 45 further includes at least one of a transceiver or an antenna.

Aspect 49 is a non-transitory computer-readable medium storing computer executable code, where the code when executed by a processor causes the processor to implement any of aspects 31 to 37.

Aspect 50 is a computer program comprising instructions that, when executed by a processor, cause the processor to perform the method of aspects 1 to 12.

Aspect 51 is a computer program comprising instructions that, when executed by a processor, cause the processor to perform the method of aspects 13 to 30.

Aspect 52 is a computer program comprising instructions that, when executed by a processor, cause the processor to perform the method of aspects 31 to 37.

What is claimed is:

1. An apparatus for wireless communication at a user equipment (UE), the apparatus comprising:

memory; and at least one processor coupled to the memory and configured to:

transmit a protocol data unit (PDU) session modification request message that includes an indication of a capability of the UE for determining a domain name system (DNS) parameter for a DNS query that is different than a DNS setting from a network and a capability of the UE for directing the DNS query based on the DNS setting from the network when the DNS parameter for the DNS query is different than the DNS setting from the network;

receive, from the network, a PDU session modification command message that includes an instruction to direct DNS queries based on the capability of the UE for determining the DNS parameter for the DNS query that is different than the DNS setting from the network and the capability of the UE for directing the DNS query based on the DNS setting from the network when the DNS parameter for the DNS query is different than the DNS setting from the network;

detect the DNS query having the DNS parameter that is different than the DNS setting from the network;

transmit a notification to the network indicating a PDU session identifier (ID) and a destination address of the DNS query; and receive, in response to the notification, at least one of a retransmission of the DNS setting from the network or a network notification to reinstate a previously received DNS setting.

2. The apparatus of claim 1, wherein the at least one processor is further configured to:

direct, by the UE, one or more DNS queries based on the instruction from the network.

3. The apparatus of claim 1, wherein the instruction comprises one or more of:

an action setting based on a determination of the DNS parameter for the DNS query that is different than the DNS setting from the network, or a notification setting based on the determination of the DNS parameter for the DNS query that is different than the DNS setting from the network.

4. The apparatus of claim 3, wherein the instruction comprises the action setting, which includes at least one of:

monitor to detect different DNS parameters from the DNS setting from the network, hold the DNS query having the DNS parameter that is different than the DNS setting from the network, direct the DNS query to an Edge Application Server Discovery Function (EASDF) or a mobile network operator's (MNO's) DNS resolver based on the DNS setting from the network, block the DNS query having the DNS parameter that is different than the DNS setting from the network without a reply message, or reject the DNS query having the DNS parameter that is different than the DNS setting from the network including transmitting a rejection message.

5. The apparatus of claim 4, wherein the instruction further comprises the notification setting, which includes at least one of:

notify the network, with a second indication that no corrective action was specified, of the DNS query having the DNS parameter that is different than the DNS setting from the network, notify the network that the DNS query having the DNS parameter that is different than the DNS setting from the network is put on hold, notify the network after a successful direction of the DNS query having the DNS parameter that is different than the DNS setting from the network, notify the network after a failed direction of the DNS query having the DNS parameter that is different than the DNS setting from the network, notify the network after blocking the DNS query having the DNS parameter that is different than the DNS setting from the network, notify the network after rejecting the DNS query having the DNS parameter that is different than the DNS setting from the network, or notify the network of the DNS query having the DNS parameter that is different than the DNS setting from the network and at least one corrective action taken by the UE.

6. The apparatus of claim 5, wherein the destination address includes a destination internet protocol (IP) address of the DNS query, and wherein the notification further indicates at least one of:

a fully qualified domain name (FQDN) of the DNS query, at least a portion of a 5-tuple for the DNS query, or an application identifier (ID) associated with the DNS query.

7. The apparatus of claim 6, wherein the notification is to a session management function (SMF) of the network, and the notification is included in a PDU session modification message.

8. The apparatus of claim 1, further comprising a transceiver configured to transmit the indication and to receive the instruction to direct the DNS queries based on the capability of the UE for determining the DNS parameter for the DNS query that is different than the DNS setting from the network and the capability of the UE for directing the DNS query based on the DNS setting from the network when the DNS parameter for the DNS query is different than the DNS setting from the network.

9. The apparatus of claim 1, wherein the DNS parameter comprises one or more of a DNS network address, a destination network address, or a port number.

10. The apparatus of claim 1, wherein the at least one processor is further configured to:

direct, by the UE, a first DNS query from an application to a DNS address based on the DNS setting from the network and not the DNS parameter.

11. The apparatus of claim 1, wherein the at least one processor is further configured to:

determine that a first DNS query to be transmitted by the UE has the DNS parameter that is different than the DNS setting from the network; and direct the first DNS query based on the DNS setting from the network and not the DNS parameter.

12. An apparatus for wireless communication at a network entity, the apparatus comprising:

memory; and at least one processor coupled to the memory and configured to:

receive, from a user equipment (UE), a protocol data unit (PDU) session modification request message that includes an indication of a capability of the UE for determining a domain name system (DNS) parameter for a DNS query that is different than a DNS setting from a network and a capability of the UE for directing the DNS query based on the DNS setting from the network when the DNS parameter for the DNS query is different than the DNS setting from the network;

transmit, to the UE, a PDU session modification command message that includes an instruction to direct DNS queries based on the capability of the UE for determining the DNS parameter for the DNS query that is different than the DNS setting from the network and the capability of the UE for directing the DNS query based on the DNS setting from the network when the DNS parameter for the DNS query is different than the DNS setting from the network;

receive a notification indicating a PDU session identifier (ID) and a destination address of the DNS query having the DNS parameter that is different than the DNS setting from the network; and transmit, in response to the notification, at least one of a retransmission of the DNS setting or a network notification to reinstate a previously received DNS setting to at least one of the UE or a user plane function (UPF).

13. The apparatus of claim 12, wherein the instruction comprises one or more of:

an action setting based on a determination of the DNS parameter for the DNS query that is different than the DNS setting from the network, or a notification setting based on the determination of the DNS parameter for the DNS query that is different than the DNS setting from the network.

14. The apparatus of claim 13, wherein the instruction comprises the action setting, which includes at least one of:

monitor to detect different DNS parameters from the DNS setting from the network, hold the DNS query having the DNS parameter that is different than the DNS setting from the network, direct the DNS query to an Edge Application Server Discovery Function (EASDF) or a mobile network operator's (MNO's) DNS resolver based on the DNS setting from the network, block the DNS query having the DNS parameter that is different than the DNS setting from the network without a reply message, or reject the DNS query having the DNS parameter that is different than the DNS setting from the network including transmitting a rejection message.

15. The apparatus of claim 14, wherein the instruction further comprises the notification setting, which includes at least one of:

notify the network, with a second indication that no corrective action was specified, of the DNS query having the DNS parameter that is different than the DNS setting from the network, notify the network that the DNS query having the DNS parameter that is different than the DNS setting from the network is put on hold, notify the network after a successful direction of the DNS query having the DNS parameter that is different than the DNS setting from the network, notify the network after a failed direction of the DNS query having the DNS parameter that is different than the DNS setting from the network, notify the network after blocking the DNS query having the DNS parameter that is different than the DNS setting from the network, notify the network after rejecting the DNS query having the DNS parameter that is different than the DNS setting from the network, or notify the network of the DNS query having the DNS parameter that is different than the DNS setting from the network and at least one corrective action taken by the UE.

16. The apparatus of claim 15, wherein the notification is from the UE and the destination address is a destination IP address of the DNS query having the DNS parameter that is different than the DNS setting from the network, and wherein the notification further indicates at least one of:

a fully qualified domain name (FQDN) of the DNS query, at least a portion of a 5-tuple for the DNS query, or an application identifier (ID) associated with the DNS query.

17. The apparatus of claim 16, wherein the at least one processor is further configured to:

store a record of attempts by the UE to use the DNS parameter that is different than the DNS setting.

18. The apparatus of claim 12, wherein the at least one processor is further configured to:

set, for the UPF, one or more of an action setting or a notification setting based on a determination of the DNS parameter for the DNS query that is different than the DNS setting from the network.

19. The apparatus of claim 18, wherein the network entity is a session management function (SMF) and the at least one processor of the SMF is configured to output the one or more of the action setting or the notification setting to the UPF in an N4 session establishment request message or an N4 session modification request message.

20. The apparatus of claim 19, wherein the at least one processor of the SMF is configured to set at least one of the action setting or the notification setting for the UPF, the at least one of the action setting or the notification setting including at least one of:

block the DNS query having the DNS parameter that is different than the DNS setting from the network without a reply message, reject the DNS query having the DNS parameter that is different than the DNS setting from the network including transmitting a rejection message, notify the network after blocking the DNS query having the DNS parameter that is different than the DNS setting from the network, notify the network after rejecting the DNS query having the DNS parameter that is different than the DNS setting from the network, or notify the network of the DNS query having the DNS parameter that is different than the DNS setting from the network and a corrective action taken by the UPF.

21. The apparatus of claim 20, wherein the notification is from the UPF and the destination address is a destination IP address of the DNS query having the DNS parameter that is different than the DNS setting from the network, and wherein the notification further indicates at least one of:

a fully qualified domain name (FQDN) of the DNS query, at least a portion of a 5-tuple for the DNS query, or an application identifier (ID) associated with the DNS query.

22. The apparatus of claim 12, wherein the network entity comprises a session management function (SMF).

23. The apparatus of claim 12, further comprising a transceiver configured to receive the indication and to transmit the instruction to direct the DNS queries based on the capability of the UE for determining the DNS parameter for the DNS query that is different than the DNS setting from the network and the capability of the UE for directing the DNS query based on the DNS setting from the network when the DNS parameter for the DNS query is different than the DNS setting from the network.

24. The apparatus of claim 12, wherein the DNS parameter comprises one or more of a DNS network address, a destination network address, or a port number.

25. A method of wireless communication at a user equipment (UE), the method comprising:

transmitting a protocol data unit (PDU) session modification request message that includes an indication of a capability of the UE for determining a domain name system (DNS) parameter for a DNS query that is different than a DNS setting from a network and a capability of the UE for directing the DNS query based on the DNS setting from the network when the DNS parameter for the DNS query is different than the DNS setting from the network;

receiving, from the network, a PDU session modification command message that includes an instruction to monitor DNS queries based on the capability of the UE for determining the DNS parameter for the DNS query that is different than the DNS setting from the network and the capability of the UE for directing the DNS query based on the DNS setting from the network when the DNS parameter for the DNS query is different than the DNS setting from the network;

detecting the DNS query having the DNS parameter that is different than the DNS setting from the network;

transmitting a notification to the network indicating a PDU session identifier (ID) and a destination address of the DNS query; and receiving, in response to the notification, at least one of a retransmission of the DNS setting from the network or a network notification to reinstate a previously received DNS setting.

26. A method of wireless communication at a network entity, the method comprising:

receiving, from a user equipment (UE), a protocol data unit (PDU) session modification request message that includes an indication of a capability of the UE for determining a domain name system (DNS) parameter for a DNS query that is different than a DNS setting from a network and a capability of the UE for directing the DNS query based on the DNS setting from the network when the DNS parameter for the DNS query is different than the DNS setting from the network;

transmitting, to the UE, a PDU session modification command message that includes an instruction to direct DNS queries based on the capability of the UE for determining the DNS parameter for the DNS query that is different than the DNS setting from the network and the capability of the UE for directing the DNS query based on the DNS setting from the network when the DNS parameter for the DNS query is different than the DNS setting from the network;

receiving a notification indicating a PDU session identifier (ID) and a destination address of the DNS query having the DNS parameter that is different than the DNS setting from the network; and transmitting, in response to the notification, at least one of a retransmission of the DNS setting or a network notification to reinstate a previously received DNS setting to at least one of the UE and a user plane function (UPF).

* * * * *